(12) United States Patent
Tateno et al.

(10) Patent No.: US 10,417,576 B2
(45) Date of Patent: Sep. 17, 2019

(54) INFORMATION PROCESSING APPARATUS AND METHOD, AND PROGRAM THEREOF

(71) Applicant: SONY CORPORATION, Tokyo (JP)

(72) Inventors: Kei Tateno, Tokyo (JP); Shinya Ohtani, Tokyo (JP); Yoshiyuki Kobayashi, Tokyo (JP); Mari Saito, Tokyo (JP)

(73) Assignee: SONY CORPORATION, Tokyo (JP)

(*) Notice: Subject to any disclaimer, the term of this patent is extended or adjusted under 35 U.S.C. 154(b) by 772 days.

(21) Appl. No.: 14/104,948

(22) Filed: Dec. 12, 2013

(65) Prior Publication Data

US 2014/0108311 A1 Apr. 17, 2014

Related U.S. Application Data

(63) Continuation of application No. 13/709,957, filed on Dec. 10, 2012, now Pat. No. 8,650,140, and a
(Continued)

(30) Foreign Application Priority Data

Apr. 8, 2009 (JP) .................................. 2009-093622

(51) Int. Cl.
G06N 7/00 (2006.01)
G06N 20/00 (2019.01)
(Continued)

(52) U.S. Cl.
CPC .......... G06N 20/00 (2019.01); G06F 16/435 (2019.01); G06F 16/4387 (2019.01);
(Continued)

(58) Field of Classification Search
None
See application file for complete search history.

(56) References Cited

U.S. PATENT DOCUMENTS 7,444,660 B2* 10/2008 Dudkiewicz ........... H04N 7/163
725/45
2002/0152474 A1* 10/2002 Dudkiewicz ...... G06F 17/30817
725/136
(Continued)

FOREIGN PATENT DOCUMENTS

GB 2 402 779 12/2004
JP 11-238079 8/1999
(Continued)

OTHER PUBLICATIONS

Kibria, Functionalities of Geo-virtual Environments to Visualize Urban Projects, Geographical Information Management & Applications (GIMA), 2008, pp. 1-101.
(Continued)

*Primary Examiner* — Wilbert L Starks
(74) *Attorney, Agent, or Firm* — Xsensus, LLP

(57) ABSTRACT

There is provided an information processing apparatus including: evaluation information extracting means extracting evaluation information from evaluation of every user for an item; preference information creating means for creating preference information indicating a preference of every user on the basis of the evaluation information extracted by the evaluation information extracting means and an item characteristic amount indicating a characteristic of the item; space creating means for creating a space in which the user is located, according to the preference information; and display control means for controlling display of the user located in the space, according to the space created by the space creating means and the preference information. The apparatus may be applied to, for example, an image display apparatus which displays server images for providing a variety of items and information.

17 Claims, 52 Drawing Sheets

Related U.S. Application Data continuation of application No. 12/730,678, filed on Mar. 24, 2010, now Pat. No. 8,341,098.

(51) Int. Cl.
*G06F 16/64* (2019.01)
*G06F 16/435* (2019.01)
*G06F 16/635* (2019.01)
*G06F 16/48* (2019.01)
*G06F 16/438* (2019.01)

(52) U.S. Cl.
CPC ............ *G06F 16/48* (2019.01); *G06F 16/635* (2019.01); *G06F 16/64* (2019.01); *G06N 7/00* (2013.01)

(56) References Cited

U.S. PATENT DOCUMENTS

| | | |
|---|---|---|
| 2004/0172267 A1 | 9/2004 | Patel et al. |
| 2014/0316934 A1* | 10/2014 | Villegas Nunez ........................... G06Q 10/06393 705/26.7 |

FOREIGN PATENT DOCUMENTS

| | | |
|---|---|---|
| JP | 2001-014349 | 1/2001 |
| JP | 2001-034625 | 2/2001 |
| JP | 2004-126975 | 4/2004 |
| JP | 2008-217311 | 9/2008 |
| JP | 2008-217312 | 9/2008 |
| WO | WO 02/079942 A2 | 10/2002 |

OTHER PUBLICATIONS

J. Tatemura et al., "Visual Querying and Explanation of Recommendations from Collaborative Filtering Systems," 1999 International Conference on Intelligent User Interfaces, p. 189 (Jan. 5-8, 1999).

Y. Lv et al., "An Integrated Approach for Market Segmentation and Visualization Based on Consumers' Preference Data," Proceedings of the Third International Conference on Machine Learning and Cybernetics, vol. 3, pp. 1701-1710 (Aug. 2004).

K. Yu et al., "Feature Weighting and Instance Selection for Collaborative Filtering," Database and Expert Systems Applications Proceedings, 12th International Workshop, pp. 285-290 (Sep. 2001).

European Search Report in EP 10 25 0316 (dated Jun. 17, 2010).

P. Resnick et al., "GroupLens: An Open Architecture for Collaborative Filtering of Netnews", Conference on Computer Supported Cooperative Work, pp. 175-186 (1994).

T. Hofmann, "Latent Semantic Models for Collaborative Filtering", ACM Transactions on Information Systems, vol. 22, No. 1, pp. 89-115 (2004).

N. Kobayashi, et al., "Opinion Mining from Web Documents: Extraction and Structurization", The Japanese Society for Artificial Intelligence, Collection of Papers, vol. 22, No. 2, pp. 227-238 (2007).

K. Sugiyama et al., "Graph Drawing by the Magnetic-Spring model", Journal of Visual Languages and computing, 6(3), pp. 217-231 (1995).

S.C. Deerwester et al., "Indexing by latent semantic analysis", Journal of the American Society of Information Science, 41 (6), pp. 391-407 (1990).

J. Tenenbaum et al., "A global geometric framework for nonlinear dimensionality reduction", Science, 290 (5500), pp. 2319-2323 (2000).

Qi, et al., Sound Database Retrieved by Sound, Acoust. Sci. & Tech. 23, 6, pp. 293-300 (2002).

* cited by examiner

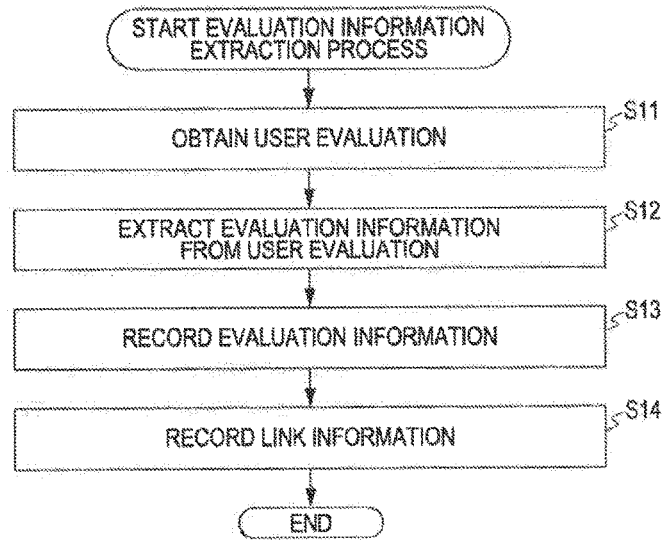

FIG. 4

| USER | ITEM | ATTRIBUTE | EVALUATION TYPE | P/N | INTENSITY | TIME |
|---|---|---|---|---|---|---|
| USER 1 | SONG A | — | COOL | P | 1 | 12/01/2008 12:00:00 |
| USER 1 | SONG A | — | LIKE | P | 1 | 12/03/2008 10:00:00 |
| USER 1 | ARTIST α | LOOKS | HANDSOME | P | −3 | 12/10/2008 21:00:00 |
| USER 2 | SONG B | MELODY | BEAUTIFUL | P | 5 | 12/15/2008 01:00:00 |
| USER 3 | SONG A | VOICE | NOT GOOD | N | 2 | 12/07/2008 11:00:00 |
| ... | ... | ... | ... | ... | ... | ... |

| USER | ITEM 1 | ITEM 2 | ATTRIBUTE | INTENSITY |
|---|---|---|---|---|
| USER 1 | ARTIST α | ARTIST β | SOUND | 3 |
| USER 1 | SONG A | SONG B | — | 5 |
| USER 2 | SONG A | SONG C | VOICE | 2 |
| ⋮ | ⋮ | ⋮ | ⋮ | ⋮ |

FIG. 7

| ITEM | ITEM TYPE | CHARACTERISTIC AMOUNT TYPE | SCORE |
|---|---|---|---|
| SONG A | SONG | MUSIC CHARACTERISTIC AMOUNT 1 | 3.1 |
| SONG A | SONG | MUSIC CHARACTERISTIC AMOUNT 2 | 9.3 |
| ⋮ | ⋮ | ⋮ | ⋮ |
| SONG B | SONG | MUSIC CHARACTERISTIC AMOUNT 1 | 4.2 |
| SONG B | SONG | MUSIC CHARACTERISTIC AMOUNT 2 | 2.2 |
| ⋮ | ⋮ | ⋮ | ⋮ |
| ARTIST α | ARTIST | KEYWORD 1 | 1 |
| ⋮ | ⋮ | ⋮ | ⋮ |

FIG. 8

| EVALUATION INFORMATION | | | ITEM CHARACTERISTIC AMOUNT | |
|---|---|---|---|---|
| | | | NUMERICAL VALUE ATTRIBUTE (MUSIC CHARACTERISTIC AMOUNT OR THE LIKE) | NAME ATTRIBUTE (KEYWORD OR THE LIKE) |
| SINGLE EVALUATION INFORMATION | NUMERICAL VALUE ATTRIBUTE (5-STAGE EVALUATION OR THE LIKE) | | LINEAR REGRESSION <REGRESSION COEFFICIENT VECTOR> | |
| | NAME ATTRIBUTE (EVALUATION TYPE OR THE LIKE) | | FISHER'S LINEAR DISCRIMINANT ANALYSIS (FDA) <TRANSFORMATION VECTOR> | $X^2$ TEST <BINARY VECTOR INDICATING EXISTENCE OR NON-EXISTENCE OF SIGNIFICANT DIFFERENCE> |
| PLURAL EVALUATION INFORMATION | | | CANONICAL CORRELATION ANALYSIS <TRANSFORMATION MATRIX> | |
| LINK | | | AVERAGE LINK LENGTH FOR EACH CHARACTERISTIC AMOUNT <VECTOR HAVING AVERAGE LINK LENGTH AS COMPONENT> Distance Metric Learning (DML) <TRANSFORMATION MATRIX> | |

FIG. 9

| USER | ITEM TYPE | EVALUATION TYPE | CHARACTERISTIC AMOUNT INFORMATION | SCORE |
|---|---|---|---|---|
| USER 1 | SONG | LIKE OR NOT | COEFFICIENT OF SONG CHARACTERISTIC AMOUNT 1 | 3.0 |
| USER 1 | SONG | LIKE OR NOT | COEFFICIENT OF SONG CHARACTERISTIC AMOUNT 2 | 10.3 |
| USER 1 | SONG | COOL OR NOT | COEFFICIENT OF SONG CHARACTERISTIC AMOUNT 1 | 1.2 |
| USER 1 | SONG | COOL OR NOT | COEFFICIENT OF SONG CHARACTERISTIC AMOUNT 2 | 4.5 |
| ... | ... | ... | ... | ... |
| USER 1 | ARTIST | HANDSOME (NUMERICAL VALUES) | COEFFICIENT OF KEYWORD 1 | 3.9 |
| ... | ... | ... | ... | ... |
| USER 2 | SONG | LIKE OR NOT | COEFFICIENT OF SONG CHARACTERISTIC AMOUNT 1 | 6.0 |
| USER 2 | SONG | LIKE OR NOT | COEFFICIENT OF SONG CHARACTERISTIC AMOUNT 2 | −0.5 |
| ... | ... | ... | ... | ... |
| USER 3 | SONG | LIKE OR NOT | COEFFICIENT OF SONG CHARACTERISTIC AMOUNT 1 | 3.1 |
| USER 3 | SONG | LIKE OR NOT | COEFFICIENT OF SONG CHARACTERISTIC AMOUNT 2 | 9.9 |
| ... | ... | ... | ... | ... |

FIG. 14

| COMBINATION OF EVALUATION TYPE | PURPOSE |
|---|---|
| SAME EVALUATION TYPE | RETRIEVE USER WHO IS SIMILAR IN USAGE (FEELING) OF SPECIFIC EVALUATION TYPE |
| SAME EVALUATION TYPE GROUP | RETRIEVE USER WHO IS SIMILAR IN USAGE OF SPECIFIC EVALUATION TYPE GROUP |
| DIFFERENT EVALUATION TYPE | IN THE CASE WHERE EVALUATION TYPE OVERLAPPED BETWEEN USERS IS SMALL |

FIG. 45

| USER | USER INFORMATION TYPE | VALUE |
|---|---|---|
| USER 1 | GENDER | FEMALE |
| USER 1 | RESIDENTIAL DISTRICT | TOKYO |
| USER 1 | CURRENT LOCATION | (N35.623304, E139.733187) |
| ⋮ | ⋮ | ⋮ |
| USER 2 | CURRENT LOCATION | (N43.068261, E141.351428) |
| USER 3 | CURRENT LOCATION | (N35.634279, E139.716718) |
| USER 4 | CURRENT LOCATION | (N35.658691, E139.701719) |
| USER 5 | CURRENT LOCATION | (N43.768971, E142.482258) |
| ⋮ | ⋮ | ⋮ |

FIG. 46

```
THE FOLLOWING SONGS ARE RECOMMENDED.

1. SONG A/ARTIST α
   EVALUATION OF WOMAN IN TOKYO
    Positive 48:21 Negative
    "COOL": 12
    "FEEL GOOD": 5
2. SONG B/ARTIST β
   EVALUATION OF MAN LISTENING TO SONG WHILE PLAYING SPORTS
    Positive 83:11 Negative
    "HAPPY": 43
    "LIVELY": 39
3. SONG C/ ARTIST γ
    ⋮
```

FIG. 49

| USER | ITEM TYPE | EVALUATION TYPE | CHARACTERISTIC AMOUNT INFORMATION | SCORE | TIME |
|---|---|---|---|---|---|
| USER 1 | SONG | LIKE OR NOT | COEFFICIENT OF SONG CHARACTERISTIC AMOUNT 1 | 2.8 | 12/01/2008 12:00:00 |
| USER 1 | SONG | LIKE OR NOT | COEFFICIENT OF SONG CHARACTERISTIC AMOUNT 2 | 10.3 | 12/01/2008 12:00:00 |
| ... | ... | ... | ... | ... | ... |
| USER 1 | SONG | LIKE OR NOT | COEFFICIENT OF SONG CHARACTERISTIC AMOUNT 1 | 3.2 | 12/10/2008 11:00:00 |
| USER 1 | SONG | LIKE OR NOT | COEFFICIENT OF SONG CHARACTERISTIC AMOUNT 2 | 9.8 | 12/10/2008 11:00:00 |
| ... | ... | ... | ... | ... | ... |

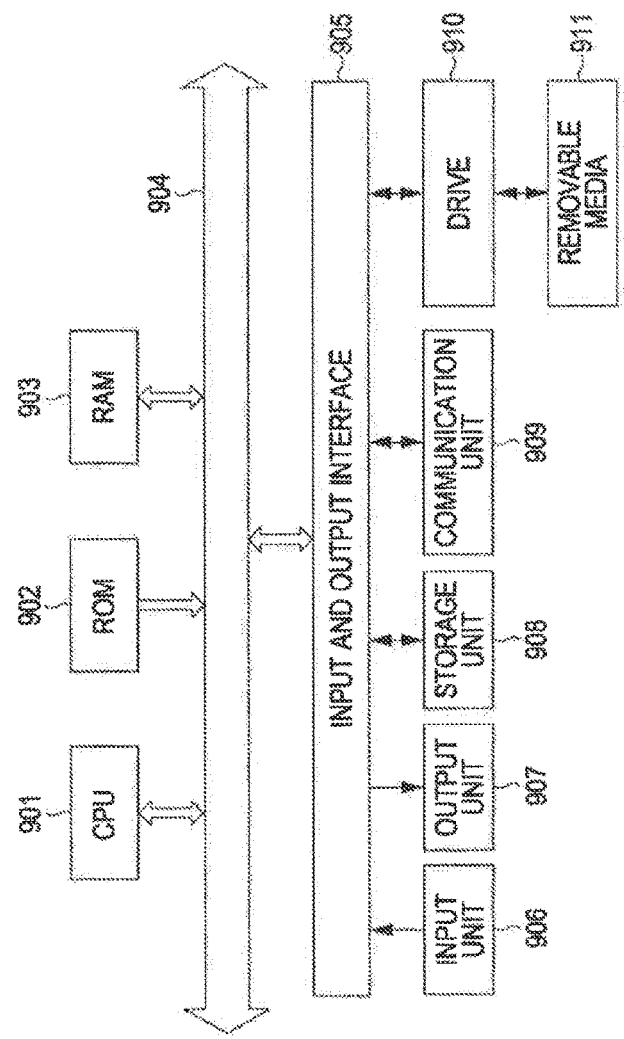

INFORMATION PROCESSING APPARATUS AND METHOD, AND PROGRAM THEREOF

CROSS-REFERENCE TO RELATED APPLICATIONS

This is a continuation of application Ser. No. 13/709,957, filed Dec. 10, 2012, which is a continuation of application Ser. No. 12/730,678, filed Mar. 24, 2010, and is also based upon and claims priority under 35 USC § 119 from the Japanese patent Application JP 2009-093622 filed in the Japanese Patent Office on Apr. 8, 2009, the entire contents of which are incorporated herein by reference.

BACKGROUND OF THE INVENTION

1. Field of the Invention

The present invention relates to an information processing apparatus and an information processing method, and a program thereof, and more particularly, to an information processing apparatus and an information processing method, and a program thereof which are capable of presenting details of preferences of other users in an easily recognized manner.

2. Description of the Related Art

As a method for retrieving and recommending a variety of items such as television programs, music, commercial products or the like on the basis of preferences of users, there is a collaborative filtering method based on evaluations of users.

In the collaborative filtering method, for example, there is a method that similar users (other users) who have evaluated the same items are selected on the basis of evaluation values of users for items, and other items selected by the similar users are recommended (P. Resnick, N. Iacovou, M. Suchak, P. Bergstrom, and J. Riedl. "GroupLens: Open Architecture for Collaborative Filtering of Netnews." Conference on Computer Supported Cooperative Work, pp. 175-186, 1994, and Hofmann, T., "Latent Semantic Models for Collaborative Filtering", ACM Transactions on Information Systems, Vol. 22, No. 1, pp. 89-115, 2004.).

Meanwhile, there is a method that an evaluation method of the present user for items and evaluation methods of other users are presented as space distribution, and then, the evaluation method of the present user and the evaluation methods of the other users can be compared with each other (Japanese Patent Application Laid-open No. 2008-217311 and Japanese Patent Application Laid-open No. 2008-217312).

Further, there is a technology in which sentences on web pages are analyzed to present users having similar value standards.

However, in the above described methods, it is difficult to present details of preferences of other users in an easily recognized manner.

In the method disclosed in the P. Resnick, N. Iacovou, M. Suchak, P. Bergstrom, and J. Riedl. "GroupLens: Open Architecture for Collaborative Filtering of Netnews." Conference on Computer Supported Cooperative Work, pp. 175-186, 1994, since the level of similarity is calculated only for users who have evaluated the same items, it is difficult to recognize how other items are evaluated with respect to other users who have evaluated the other items.

In the method disclosed in the Hofmann, T. "Latent Semantic Models for Collaborative Filtering", ACM Transactions on Information Systems, Vol. 22, No. 1, pp. 89-115, 2004, since it is not considered what kind of characteristics the items evaluated by users have, and since recommended items are limited to items which have been directly evaluated by other users, it is difficult to recommend items which are not evaluated by anybody. Further, since evaluation values based on a five-stage evaluation or the like are received, it is difficult to present evaluations of other users on the basis of evaluations ('like', 'cool' or the like) for indicating preferences of users.

Further, in the methods disclosed in the Japanese Unexamined Patent Application Publication No. 2008-217311 and Japanese Unexamined Patent Application Publication No, 2008-217312, it is possible to recognize similar users, but it is difficult to specifically present how the similar users have evaluated predetermined items.

In addition, in the technology that users having similar value standards are presented from sentences on web pages, unless other users write sentences with respect to the same items as the present user, it is difficult to discriminate whether the other users have the similar value standards. Further, since similar discrimination is performed by only whether the evaluation is a positive evaluation or a negative evaluation, it is difficult to present detailed evaluation even in the case of similar users.

The present invention is contrived in consideration of the above problems, and particularly, provides details of preferences of other users in an easily recognized manner.

SUMMARY OF THE INVENTION

An information processing apparatus according to an embodiment of the present invention includes: an evaluation information extracting unit extracting evaluation information from evaluation of every user for an item; a preference information creating unit creating preference information indicating a preference of every user on the basis of the evaluation information extracted by the evaluation information extracting unit and an item characteristic amount indicating a characteristic of the item; a space creating unit creating a space in which the user is located, according to the preference information; and a display control unit controlling display of the user located in the space, according to the space created by the space creating unit and the preference information.

The preference information creating unit may create the preference information which includes an evaluation type indicating the type of the evaluation for the item and a characteristic amount coefficient scoring the item characteristic amount, using a machine learning algorithm.

The information processing apparatus may further include: a preference information obtaining unit obtaining the preference information of every user with reference to the predetermined evaluation type to generate a characteristic amount vector of every user according to the characteristic amount coefficient; and a user-characteristic amount matrix creating unit creating a user-characteristic amount matrix from the characteristic amount vector of every user generated by the preference information obtaining unit, wherein the space creating unit may compress the user-characteristic amount matrix created by the user characteristic amount matrix creating unit to create the space, and wherein the display control unit may control, the display of the user located in the space, according to the space created by the space creating unit and the characteristic amount vector.

The information processing apparatus may further include: an inter-user distance matrix creating unit calculating a distance between the preference information of every user on the basis of the characteristic amount coefficient of the preference information of every user with respect to the predetermined evaluation type, to create an inter-user distance matrix, wherein the space creating unit may compress the inter-user distance matrix created by the inter-user distance matrix creating unit to create the space, and wherein the display control unit may control the display of the user located in the space, according to the space created by the space creating unit and the distance between the preference information of every user.

The space creating unit may create a low-dimensional space in which a low-dimensional vector indicating every user is located, using a multi-dimensional scaling method, on the basis of the inter-user distance matrix, and the play control unit may control display of the low-dimensional space created by the space creating unit and the low-dimensional vector located in the low-dimensional space.

The information processing apparatus may further include: an inter-identification-information distance matrix creating unit calculating a distance between predetermined identification information corresponding to the evaluation type in a predetermined semantic space to create an inter-identification-information distance matrix; and an inter-user-identification-information matrix creating unit calculating a distance between the predetermined identification information of every user on the basis of the characteristic amount coefficient of the preference information of every user with reference to the predetermined identification information to create an inter-user-identification-information distance matrix, wherein the space creating unit may create an identification information space and a user identification information space on the basis of the inter-identification-information distance matrix created by the inter-identification-information distance matrix creating unit and the inter-user-identification-information distance matrix created by the inter-user-identification-information matrix creating unit, and wherein the display control unit may control, according to a calibration space obtained by calibrating the identification information space created by the space creating unit and the user identification information space, and according to the distance between the predetermined identification information of every user, the display of the user located in the calibration space.

The space creating unit may create an identification information low-dimensional space in which a low-dimensional vector indicating the identification information is located and a user identification information low-dimensional space in which a low-dimensional vector indicating the identification information of every user is located, using a multi-dimensional scaling method, on the basis of the inter-identification-information distance matrix and the inter-user-identification-information distance matrix, and the display control unit may control display of the calibration space, which is obtained by calibrating the identification information low-dimensional space created by the space creating unit and the user identification information low-dimensional space, and display of a low-dimensional vector located in the calibration space corresponding to every user with reference to the predetermined identification information.

The information processing apparatus may further include: a calibration performing unit performing the calibration of the identification information space created by the space creating unit and the user identification information space.

The information processing apparatus may further include: a preference information obtaining unit obtaining the preference information of every user, with reference to the predetermined evaluation type; and a link setting unit calculating a distance between the preference information of every user on the basis of the characteristic amount coefficient of the preference information of every user with reference to the predetermined evaluation type obtained by the preference information obtaining unit to set a link for the users of a higher number k having a smaller distance, wherein the space creating unit may create the space low-dimensionalized on the basis of the link set by the link setting unit, and wherein the display control unit may control the display of the users of the number k located in the space, according to the space created by the space creating unit and the characteristic amount coefficient.

An information processing method according to an embodiment of the present invention includes the steps of: extracting evaluation information from evaluation of every user for an item; creating preference information indicating a preference of every user, on the basis of the evaluation information extracted in the extracting step and an item characteristic amount indicating a characteristic of the item; creating a space in which the user is located, according to the preference information; and controlling display of the user located in the space, according to the space created in the space creating step and the preference information.

A program according to an embodiment of the present invention executes a program in a computer, the process including the steps of: extracting evaluation information from evaluation of every user for an item; creating preference information indicating a preference of every user, on the basis of the evaluation information extracted in the extracting step and an item characteristic amount indicating a characteristic of the item; creating a space in which the user is located, according to the preference information; and controlling display of the user located in the space, according to the space created in the space creating step and the preference information.

According to an embodiment of the present invention, evaluation information is extracted from evaluation of every user for an item; preference information indicating a preference of every user is created on the basis of the extracted evaluation information and an item characteristic amount indicating a characteristic of the item; a space in which the user is located is created according to the preference information; and display of the user located in the space is controlled according to the created space and the preference information.

According to an embodiment of the present invention, details of preferences of other users can be presented in an easily recognized manner.

BRIEF DESCRIPTION OF THE DRAWINGS

FIG. 2 is a flowchart illustrating an evaluation information extracting process;

FIG. 3 is a diagram illustrating user evaluation;

FIG. 4 in a diagram illustrating evaluation information;

FIG. 7 is a diagram illustrating an item characteristic amount;

FIG. 8 is a diagram illustrating a creating method of the preference information;

FIG. 9 is a block diagram illustrating a configuration example of an information processing apparatus;

FIG. 14 is a diagram illustrating a calculating method of macro-similarity;

FIG. 45 is a diagram illustrating an example of user information;

FIG. 46 is a diagram illustrating an item recommended by any other group;

FIG. 49 is a diagram illustrating preference information given by time information;

FIG. 56 is a diagram illustrating a configuration example of a general-purpose personal computer.

DESCRIPTION OF THE PREFERRED EMBODIMENTS

Hereinafter, embodiments according to the present invention will be described with reference to the accompanying drawings. Description will be made in the following order:
1. First Embodiment (from preference information creation to recommendation item presentation)
2. Second Embodiment (item space display)
3. Third Embodiment (user space display)
4. Other Modifications, 1. First Embodiment (Configuration Example of Information Processing System)

Figure 1:
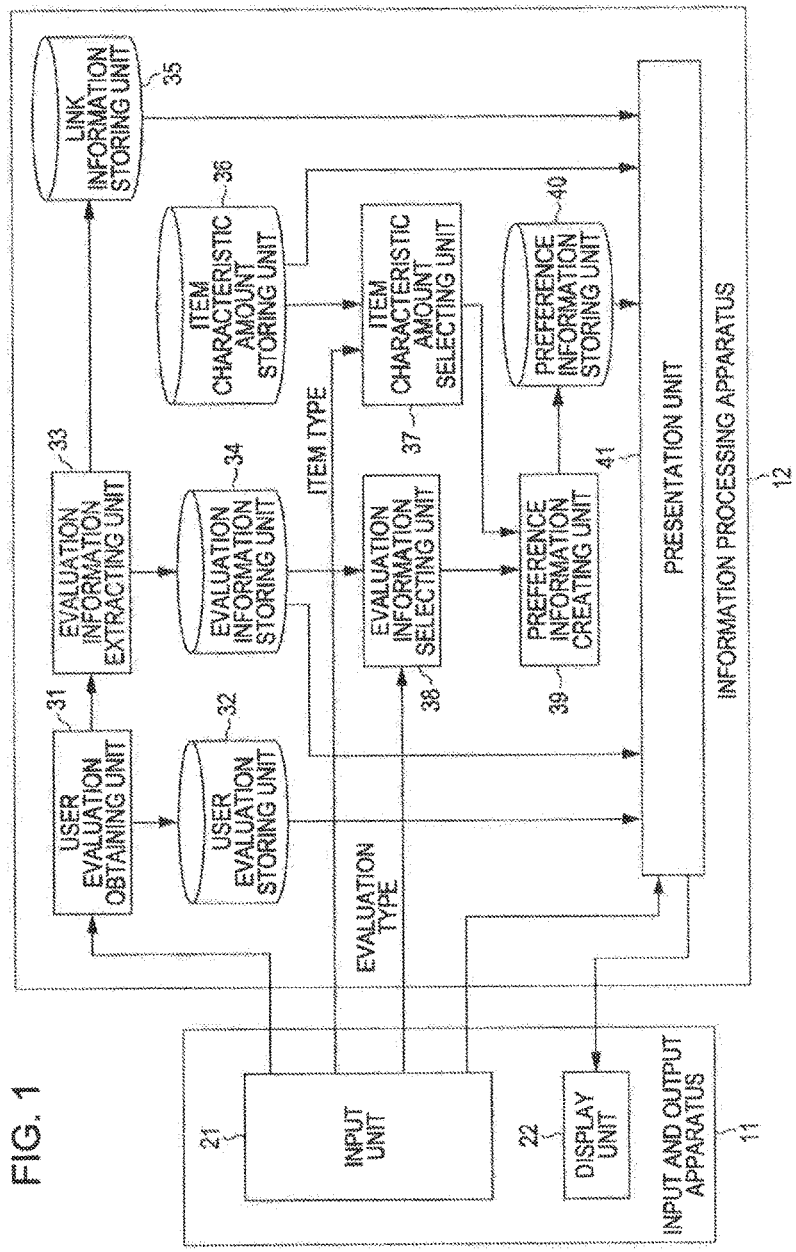
FIG. 1 is a block diagram illustrating an embodiment of an information processing system according to the present invention.

FIG. 1 is a block diagram illustrating an embodiment of an information processing apparatus according to the present invention. The information processing system in FIG. 1 is a system which presents an item, information relating to the item, information relating to a user of the information processing system, and the like to the user. Herein, the item refers to a variety of contents such as a television program, a moving image, a still image, a document, music, software and information, and a variety of commercial products (including a person such as an entertainer) or the like. The information processing system includes an input and output apparatus 11 and an information processing apparatus 12.

The input and output apparatus 11 is used in the case where a user inputs information or a command for the information processing apparatus 12, or presents information supplied from the information processing apparatus 12 to the user. The input and output apparatus 11 includes an input unit 21 which includes a keyboard, a mouse, a microphone or the like, and a display unit 22 which includes an exclusive monitor, a display device provided in a CE (Consumer Electronics) device or the like.

The information processing apparatus 12 includes a user evaluation obtaining unit 31, a user evaluation storing unit 32, an evaluation information extracting unit 33, an evaluation information storing unit 34, a link information storing unit 35, an item characteristic amount storing unit 36, an item characteristic amount selecting unit 37, an evaluation information selecting unit 38, a preference information creating unit 39, a preference information storing unit 40 and a presentation unit 41.

The user evaluation obtaining unit 31 obtains an evaluation for each item (hereinafter, referred to as user evaluation) input by the user through the input unit 21, and the obtained evaluation is supplied to the user evaluation storing unit 32 and the evaluation information extracting unit 33. The user evaluation is, for example, a sentence which is directly input from a keyboard which is the input unit 21 or which is obtained by recognizing a voice which is input from a microphone which is the input unit 21, or text data in a predetermined document or the like. Further, the user evaluation may be alphanumeric characters or the like in 5-stage evaluation.

The user evaluation storing unit 32 records (stores) the user evaluation supplied from the user evaluation obtaining unit 31. The user evaluation which is recorded in the user evaluation storing unit 32 is supplied to the presentation unit 41, as necessary.

The evaluation information extracting unit 33 analyzes the user evaluation supplied from the user evaluation obtaining unit 31 to extract evaluation information indicating the evaluation of the user for the item, and then supplies the extracted evaluation information to the evaluation information storing unit 34.

For example, in the case where the user evaluation is text data (a general sentence), the evaluation information extracting unit 33 extracts, as the evaluation information, words indicating a preference of the user for an item such as "like or dislike", "cool" or the like from the user evaluation, using a method disclosed in "Opinion Mining from Web Documents Extraction and Structurization" by N. Kobayashi, The Japanese Society for Artificial Intelligence, Collection of Papers, Vol. 22, No. 2, pp. 227-238, 2007, and then supplied the extracted words to the evaluation information storing unit 34. Further, the evaluation information extracting unit 33 extracts the item (words indicating the item) which becomes an evaluation target of the user from the user evaluation (text data) and then supplies the extracted item together with an attribute of the item (an aspect which becomes an evaluation reference) or the like for the evaluation information storing unit 34 as the evaluation information.

In addition, in the case where the user evaluation is an evaluation equal to or more than 2 items, the evaluation information extracting unit 33 extracts from the user evaluation which is equal to or more than the 2 items (words indicating the items) which becomes the evaluation target of the user and supplies the corresponding extracted items together with attributes of the items to the link information storing unit 35 as link information.

The evaluation information storing unit 34 records the evaluation information supplied from the evaluation information extracting unit 33. The evaluation information recorded in the evaluation information storing unit 34 is supplied to the evaluation information selecting unit 38 and the presentation unit 41, as necessary.

The link information storing unit 35 records the link information supplied from the evaluation information extracting unit 33. The link information recorded in the link information storing unit 35 is supplied to the presentation unit 41, as necessary.

The item characteristic amount storing unit 36 records an item characteristic amount which is information indicating characteristics of an item. A specific example of the item characteristic amount will be described later with reference to FIG. 8. The item characteristic amount includes the type of the item which is a general genre of the item and the type of a characteristic amount which is a factor specifying the item. The type of the item is, for example, a song, an album, an artist or the like. The type of the characteristic amount is a musical characteristic in the case where the item is music, a characteristic as an image in the case where the item is a moving image or a still image, a sentence written for the content as the item and words included in the sentence, information on a related person or nation, or the like. Further, the type of the characteristic amount may be defined as having a weight (score) indicating the level of importance or degree, respectively. Further, the item characteristic amount may be recorded in advance in the item characteristic storing unit 36 or may be obtained through a network such as the Internet.

The item characteristic amount selecting unit 37 selects and obtains the item characteristic amount according to the item type in the item characteristic amount storing unit 36, on the basis of a command for selecting the item characteristic amount for a predetermined item type which is input by the user through the input unit 21. The item characteristic amount selecting unit 37 supplies the obtained item characteristic amount to the preference information creating unit 39.

The evaluation information selecting unit 38 selects and obtains the evaluation information in the evaluation information storing unit 34, on the basis of an instruction for selecting predetermined evaluation information, which is input through the input unit 21 by the user. The evaluation information selecting unit 38 supplies the obtained evaluation information to the preference information creating unit 39.

The preference information creating unit 39 creates preference information to be described later with reference to FIG. 9, on the basis of the item characteristic amount supplied from the item characteristic amount selecting unit 37 and the evaluation information supplied from the evaluation information selecting unit 38. The preference information is information indicating the tendency of the preference of the user for a predetermined item. The preference information creating unit 39 supplies the created preference information to the preference information storing unit 40.

The preference information storing unit 40 records (stores) the preference information supplied from the preference information creating unit 39. The preference information stored in the preference information creating unit 39 is supplied to the presentation unit 41, as necessary.

The presentation unit 41 obtains predetermined information, on the basis of an instruction of presentation of a variety of information which is input through the input unit 21 of the input and output apparatus 11, from the user evaluation storing unit 32, the link information storing unit 35, the item characteristic amount storing unit 36 and the preference information storing unit 40, as necessary. Further, the presentation unit 41 performs processes to be described later with reference to FIG. 10 and thereafter, for the obtained information and supplies the processed information to the display unit 22, to thereby perform the presentation of the variety of information to the user.

In addition, the input and output apparatus 11 and the information processing apparatus 12 may be provided as one apparatus or may be provided as separate apparatuses. In the case where the input and output apparatus 11 and the information processing apparatus 12 are provided as separate apparatuses, the input and output apparatus 11 includes, for example, a user terminal such as a personal computer, a cellular phone, a CE device or the like; and the information processing apparatus 12 includes, for example, a variety of servers such as a Web server, an application server or the like. In this case, in the information processing system in FIG. 1, the plurality of input and output apparatuses 11 is connected to, for example, the information processing apparatus 12 through a network such as the Internet. Further, the information processing apparatus 12 may include a plurality of devices.

An example of the case where the input and output apparatus 11 is configured by the user terminal and the information processing apparatus 12 is configured by the server will be described hereinafter.

[Evaluation Information Extracting Process of Information Processing Apparatus]

Next, an evaluation information extracting process of the information processing apparatus 12 will be described with reference to FIG. 2.

In step S11, the user evaluation obtaining unit 31 obtains user evaluation as shown in FIG. 3 which is input through the input unit 21 by the user, and then supplies the obtained user evaluation to the user evaluation storing unit 32 and the evaluation information extracting unit 33. In addition, the user evaluation obtaining unit 31 obtains from the input unit 21 a name of the user indicating a user who manages the input and output apparatus 11 together with the user evaluation, and then supplies the obtained user name and user evaluation to the user evaluation storing unit 32 and the evaluation information extracting unit 33. In step S11, if the user evaluation is supplied to the user evaluation storing unit 32, the user evaluation storing unit 32 records the user evaluation together with the user name.

As shown in FIG. 3, the user evaluation corresponds to the user (user name) who has input the user evaluation. More specifically, a user evaluation such as "This song A is cool" corresponds to "user 1"; and a user evaluation "Artist α is not handsome!" also corresponds to "user 1". Further, a user evaluation "Melody of song B is really beautiful" corresponds to "user 2"; and a user evaluation "The voice in song A is a bit grating" corresponds to "user 3".

Returning to FIG. 2, in step S12, the evaluation information extracting unit 33 performs processes of a morpheme analysis or a syntax analysis for the user evaluation (FIG. 3) supplied from the user evaluation obtaining unit 31 to extract evaluation information as shown in FIG. 4, and then supplies the extracted evaluation information to the evaluation information storing unit 34.

As shown in FIG. 4, the evaluation information is configured to include the user (name of the user) who inputs the user evaluation, the item (name of the item) which becomes an evaluation target in the user evaluation, the attribute of the item, the evaluation type for distinguishing the type of the evaluation (preference of the user) for the item, P/N (positive/negative) indicating polarity of the evaluation type (whether the evaluation is positive or negative), intensity indicating the degree of the preference which is indicated as the evaluation type, and the time when the user evaluation which becomes a base of the evaluation information is input.

More specifically, in the first section from the top in FIG. 4 is shown evaluation information that the user is "user 1"; the item is "song A"; the evaluation type is "cool"; the P/N is "P (positive)"; and the time is "2008-12-01 12:00:00" indicating 12 o'clock, Dec. 1, 2008. In the second section from the top is shown evaluation information that the user is "user 1"; the item is "song A"; the evaluation type is "like"; the P/N is "P (positive)"; and the time is "2008-12-03 10:00:00" indicating 10 o'clock, Dec. 3, 2008. In the third section from the top is shown evaluation information that the user is "user 1"; the item is "artist α"; the attribute is "looks"; the evaluation type is "handsome"; the P/N is "P (positive)"; the intensity is "−3"; and the time is "2008-12-10 21:00:00 indicating 21 o'clock, Dec. 10, 2008. In the fourth section from the top is shown evaluation information that the user is "user 2"; the item is "song B"; the attribute is "melody"; the evaluation type is "beautiful"; the P/N is "P (positive)"; the intensity is "5"; and the time is "2008-12-15 1:00:00 indicating 1 o'clock, Dec. 15, 2008. Further, in the fifth section from the top is shown evaluation information that the user is "user 3"; the item is "song A"; the attribute is "voice"; the evaluation type is "not good"; the P/N is "N (negative)"; the intensity is "2"; and the time is "2008-12-7 11:00:00 indicating 11 o'clock, Dec. 7, 2008.

In FIG. 4, the first, third, fourth and fifth evaluation information from the top correspond to the first, second, third and fourth user evaluation from the top in FIG. 3, respectively.

In the case where words ("really" or "a bit") indicating the degree of preference indicated by words ("beautiful" or "not good") corresponding to the evaluation type are included in the user evaluation (FIG. 3), the evaluation information extracting unit 33 extracts the intensity according to the degree as shown in the evaluation information in FIG. 4. The intensity may be directly input by the user or may be used as it is in the case of the user evaluation through the 5-stage evaluation.

Further, in the case where expressions ("not" such as "not handsome") negating words corresponding to the evaluation type are included in the user evaluation (FIG. 3 the evaluation information extracting unit 33 extracts a negative intensity for the evaluation type as shown in the evaluation type in FIG. 4.

The time in the evaluation information is set to the time when the user evaluation is input, but is not limited thereto, for example, time analogized from information (words) about time included in the user evaluation may be applied. For example, time analogized from "last year" (one year before the current time) in a user evaluation "1 liked an artist β until last year, but" may be set as the time in the evaluation information.

In addition, a certainty factor (not shown) indicating certainty may be added to the evaluation information as continuous values of, for example, 0 to 1. For example, the evaluation information extracting unit 33 may extract the word "probably" relating to the certainty factor from a user evaluation "I haven't listened to this person's song, but probably I think I like it", and may add a certainty factor (for example, 0.2) which is preset for the "probably" to the evaluation information in which the evaluation type is "like". Moreover, the evaluation information extracting unit 33 may extract the word "is" relating to the certainty factor (assertion) from a user evaluation "artist γ is clumsy", and may add a certainty factor (for example, a value of 1.0 or the like) which is preset for the "is" to the evaluation information in which the evaluation type is "clumsy".

Figures 5, 6:
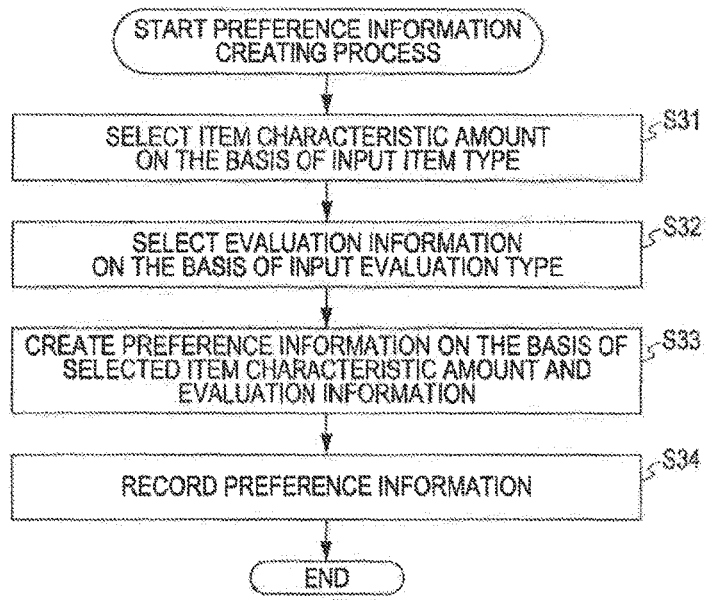
FIG. 5 is a diagram illustrating link information.
FIG. 6 is a flowchart illustrating a preference information creating process.

Further, in step S12, in the case where the user evaluation corresponds to two items, the evaluation information extracting unit 33 extracts from the user evaluation the two items (item names) which become targets of the user evaluation to be supplied to the link information storing unit 35 as the link information as shown in FIG. 5. More specifically, for example, the evaluation information extracting unit 33 performs a syntax analysis or the like for a user evaluation "artist α and artist β have the same sound", and then extracts a parallel relation of the "artist α" and the "artist β".

As shown in FIG. 5, the link information is configured to include the user (user name) who inputs the user evaluation, two items 1 and 2 (item names) which are the evaluation targets in the user evaluation, attributes of the items, and intensity indicating the degree of relevancy between the items obtained from the user evaluation. More specifically, in the first section from the top is shown evaluation information that the user is "user 1"; the item 1 is "artist α"; the item 2 is "artist β"; the attribute is "sound"; and the intensity is "3" in FIG. 5. In the second section from the top is shown evaluation information that the user is "user 1"; the item 1 is "song A"; the item 2 is "song B"; and the intensity is "5". In the third section from the top is shown evaluation information that the user is "user 2"; the item 1 is "song A"; the item 2 is "song C"; the attribute is "voice"; and the intensity is "2".

The link information is configured to be extracted from the parallel relation between the items in the user evaluation. However, for example, in the extracted evaluation information, the link information may be generated by connecting the items in which the some evaluation type is extracted with the link information.

Returning to the flowchart in FIG. 2, in step S13, the evaluation information storing unit 34 records the user evaluation supplied from the user evaluation obtaining unit 31.

In step S14, the link information storing unit 35 records the link information supplied from the evaluation information extracting unit 33.

According to the above described processes, the information processing apparatus 12 may record evaluation for a predetermined item for every user as evaluation information.

[Preference Information Creating Process of Information Processing Apparatus]

Next, a preference information creating process in the information processing apparatus 12 will be described with reference to a flowchart in FIG. 6.

In step S31, the item characteristic amount selecting unit 37 selects and obtains an item characteristic amount according to the type of the item in the item characteristic amount storing unit 36, on the basis of the type of the item input through the input unit 21 by the user. The item characteristic amount selecting unit 37 supplies the obtained item characteristic amount to the preference information creating unit 39.

Herein, an example of the item characteristic amount recorded in the item characteristic amount storing unit 36 will be described with reference to FIG. 7.

As shown in FIG. 7, the item characteristic amount is configured so that the item type, the type of the characteristic amount and a score indicating a weight for the characteristic amount type correspond to the item (item name). More specifically, "song", which is the item type, "music characteristic amount 1" and "music characteristic amount 2" which are the characteristic amount types correspond to an item "song A". Scores of "3.1" and "9.3" are defined for the "music characteristic amount 1" and "music characteristic amount 2" for the "song A", respectively. "Song", which is the item type, "music characteristic amount 1" and "music characteristic amount 2" which are the characteristic amount types correspond to an item "song B". Scores of "1.2" and "2.2" are defined for the "music characteristic amount 1" and "music characteristic amount 2" for the "song B", respectively. "Artist", which is the item type, and "keyword 1", which is the characteristic amount type, correspond to an item "artist α". A score of "1" is defined for the "keyword" for the "artist α".

In such an item characteristic amount, the items corresponding to the same characteristic amount types may correspond to the same item type even though general concepts or sizes are different. For example, in the case where a keyword 1 which is the characteristic amount type corresponds to each item of a song, an album and an artist, the same item type for example, "music" or the like) may correspond to the items.

Returning to the flowchart in FIG. 6, in step S32, the evaluation information selecting unit 38 selects and obtains from the evaluation information storing unit 34 the evaluation information according to the evaluation type on the basis of the evaluation type which is input through the input unit 21 by the user. If there is no input of the evaluation type from the user, for example, the evaluation type such as "like or dislike" or the like may be determined as a default value. Further, in the case where the certainty factor is added to the evaluation information, the evaluation type of the evaluation information having a certainty factor larger than a predetermined value may be obtained. The evaluation information selecting unit 38 supplies the obtained evaluation information to the preference information creating unit 39. In addition, the selected and obtained evaluation information may be plural.

In step S33, the preference information creating unit 39 creates preference information, on the basis of the item characteristic amount which is supplied from the item characteristic amount selecting unit 37 and the evaluation information supplied from the evaluation information selecting unit 38, and then supplies the created preference information to the preference information storing unit 40. For example, the preference information may be created on the basis of evaluation information in which the time of the evaluation information is a predetermined period such as the past 6 months. The preference information creating unit 39 creates preference information, using a regression equation or discriminant machine learning algorithm in the above described patent documents 1 and 2, according to attributes of the item characteristic amount and the evaluation information. Herein, the attributes of the item characteristic amount and the evaluation information are information indicating whether the item characteristic amount and the evaluation information are expressed by numeric values or names. Here, the former is referred to as a numerical attribute and the latter is referred to as a name attribute. That is, the item characteristic amount corresponding to the characteristic amount type such as a music characteristic amount which is able to be numericalized is the numerical attribute; and the item characteristic amount corresponding to the characteristic amount type such as a keyword or the like which is not numericalized is the name attribute. Further, the evaluation information such as a 5-stage evaluation which is able to be numericalized is the numerical attribute; and the evaluation information corresponding to the evaluation type such as "like or dislike" or the like is the name attribute.

Herein, a creating method of preference information according to the attributes of the item characteristic amount and the evaluation information will be described with reference to FIG. 8.

As shown in FIG. 8, the creating methods of the preference information vary according to the attributes of the evaluation information and the attributes of the item characteristic amount. Further, in FIG. 8, the evaluation information is classified into single evaluation information, plural evaluation information and a link, and the single evaluation information is given the attributes.

Firstly, in the case where the evaluation information is the single evaluation information and the numerical attribute, the preference information is created by the linear regression, not by the attribute of the item characteristic amount.

In the linear regression, a regression coefficient is calculated by multiple regression where the item characteristic amount is a dependant variable, and the evaluation information which is the numerical attribute is an objective variable, and a vector (regression coefficient vector) having the regression coefficient corresponding to each item characteristic amount as a component is used as the preference information. That is, where y is evaluation information, $x=(x_1, x_2, \ldots, x_M)$ (M is the number of the types of the item characteristic amounts) is a characteristic amount vector, $y=a_0+a_1x_1+a_2x_2+ \ldots, +a_Mx_M$ is approximated using the linear regression, and thus, a regression coefficient vector $(a_0, a_1, a_2, \ldots, a_M)$ is obtained as the preference information. In FIG. 6, the format of the preference information is expressed in a bracket < >.

Since this indicates the degree that each item characteristic amount affects the evaluation information (the item characteristic amount is normalized in advance), it is appropriate as the preference information of the user.

Next, in the case where the single evaluation information is the name attribute and the item characteristic amount is the numerical attribute, the preference information is created according to the Fisher's Discriminant Analysis (FDA).

For example, in the case where the item characteristic amount is a music characteristic amount such as the level of tempo or live music and the evaluation information (evaluation type) is "cool", a transformation vector determined by the Fisher's Discriminant Analysis (FDA) for optimally discriminating an item corresponding to the "cool" and an item which does not correspond to the "cool" is obtained as the preference information. The transformation vector has the same dimension as the item characteristic amount, and indicates the degree that a certain characteristic amount affects the evaluation information.

Next, in the case where the single evaluation information is the name attribute and the item characteristic amount is the name attribute, the preference information is created by the $\chi^2$ test.

In the $\chi^2$ test, it is verified whether there is a relevancy between the item characteristic amount of a certain name attribute (keyword or the like) and the evaluation information (for example, "cool" or not "cool"). By performing this test for each item characteristic amount, for example, a binary vector having the same dimension as the item characteristic amount and having a component value of 1 if there is a significant difference, and 0 if there is no significant difference, is obtained as the preference information (or a continuous value vector having $\chi^2$ statistics as the component value may be obtained). It can be recognized that a certain characteristic amount has strong relevancy to the evaluation information in the user from the binary vector.

Next, in the case where the evaluation information is a plurality of evaluation information, the preference information is created by the canonical correlation analysis, not by the attribute of the item characteristic amount.

In the canonical correlation analysis, a canonical correlation vector (set thereof) mapped to a canonical space in which correlation between two linearly transformed spaces becomes the highest is calculated. In the canonical space, there are two canonical correlation vectors for an evaluation information space in which all the evaluation information for different dimensions is included and an item characteristic amount space, either of which may be used as the preference information. Further, a transformation matrix including several upper level canonical correlation vectors having the highest correlation may be used.

Finally, in the case where the evaluation information is the link information, the preference information is created by an average link length or DML (Distance Metric Learning), not by the attribute of the item characteristic amount.

The average link length refers to an average value with respect to all links, of differences between respective item characteristic amounts between link-extended items. A characteristic amount having a large average value does not significantly contribute to the link, that is, the relevancy, and also is not such a significant characteristic amount for a target user. The preference information according to the average link length is expressed as a vector having the average link length of each characteristic amount as a component. If link-extended item pairs (characteristic amount vector) are $(x_{p11}, x_{p12}), (x_{p21}, x_{p22}), \ldots, (x_{pP1}, x_{pP2})$ (P is the total number of the pairs), the vector indicating the preference information is expressed as $\Sigma i|x_{p11}-x_{p12}|/P$.

Further, according to the DML, a transformation matrix A from a characteristic amount space, in which a certain objective function is optimized by the link information according to a learning restriction such as "link-extended item pairs belong to the same class" to other spaces, is calculated. In the case of mapping to spaces of a plurality of dimensions, there may be determination-impossibility in the order of the dimensions. At that time, the transformation vector mapped to a first dimensional space becomes the preference information at that time.

Further, the creating method of the preference information is not limited to the above described method, and another method may be adopted.

Returning to the flowchart in FIG. 6, in step S34, the preference information storing unit 40 records the preference information supplied from the preference information creating unit 39.

According to the above described process, the information processing apparatus 12 may create and record preference information indicating the tendency of preferences of users for predetermined items.

Herein, an example of preference information recorded in the preference information storing unit 40 will be described with reference to FIG. 9.

The preference information shown in FIG. 9 is configured so that item types, evaluation types and characteristic amount information correspond to users (user names). Further, scores indicating weights for coefficients designated by the characteristic amount information are provided to the characteristic amount information. More specifically, the item type "song", the evaluation type "like or not" (that is, like or dislike), the characteristic amount information "coefficient of the music characteristic amount 1" and "coefficient of the music characteristic amount 2" correspond to the "user 1"; and scores of "3" and "10.3" are respectively provided to the "coefficient of the music characteristic amount 1" and the "coefficient of the music characteristic amount 2". The item type "song", the evaluation type "cool or not", the characteristic amount information "coefficient of the music characteristic amount 1" and "coefficient of the music characteristic amount 2" correspond to the "user 1"; and scores of "1.2" and "4.5" are respectively provided to the "coefficient of the music characteristic amount 1" and the "coefficient of the music characteristic amount 2". The item type "artist", the evaluation type "handsome" (provided with numerical values), and the characteristic amount information "coefficient of keyword 1" correspond to the "user 1"; and a score of "3.9" is provided to the "coefficient of keyword 1". The item type "song", the evaluation type "like or not", the characteristic amount information "coefficient of the music characteristic amount 1" and "coefficient of the music characteristic amount 2" correspond to "user 2"; and scores of "6.0" and "−0.5" are respectively provided to the "coefficient of the music characteristic amount 1" and the "coefficient of the music characteristic amount 2". The item type "song", the evaluation type "like or not", the characteristic amount information "coefficient of the music characteristic amount 1" and "coefficient of the music characteristic amount 2" correspond to "user 3"; and scores of "3.1" and "9.9" are respectively provided to the "coefficient of the music characteristic amount 1" and the "coefficient of the music characteristic amount 2".

In FIG. 9, the preference information having the evaluation type "like or not" or "cool or not" is created by the above described Fisher's Discriminant Analysis (FDA), and the evaluation information having the preference information "handsome" capable of being expressed as numerical values is created by the above described linear regression.

According to the preference information as shown in FIG. 9, the tendency of preferences for items may be obtained for every user.

[Configuration Example of Information Processing Apparatus which Presents Tendency of Preference for Items]

Herein, a configuration example of the information processing apparatus which presents the tendency of preferences for items for every user according to the preference information will be described with reference to FIG. 10.

Figure 10:
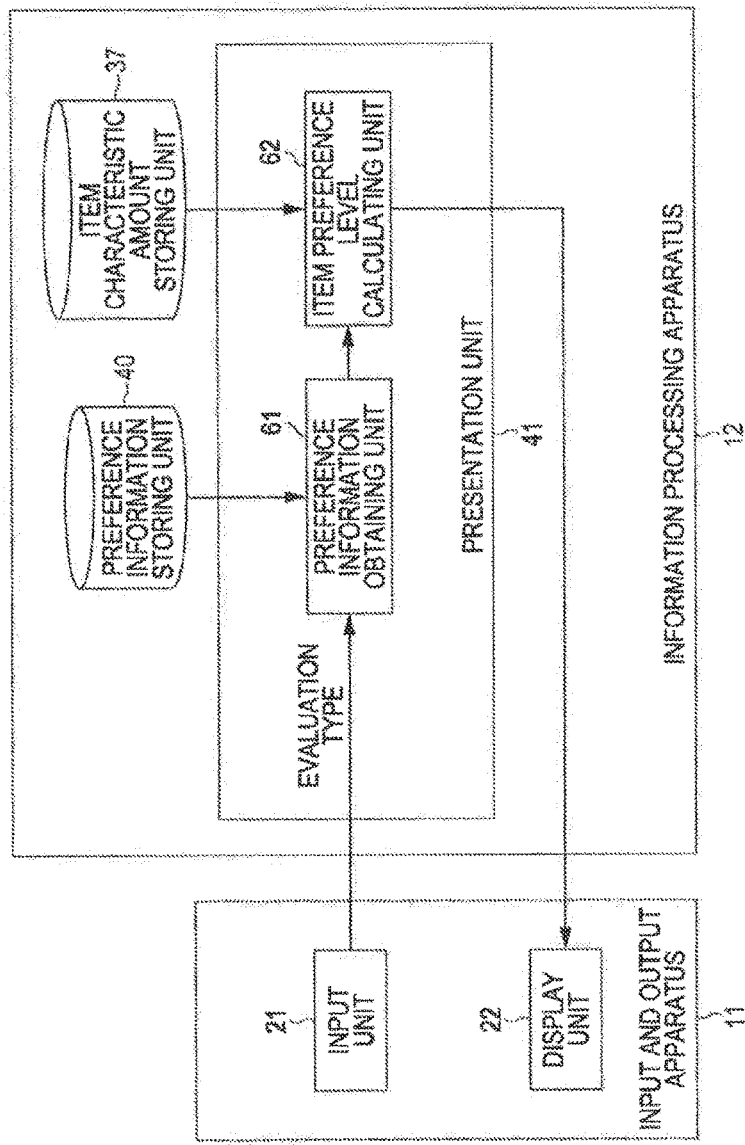
FIG. 10 is a diagram illustrating a calculating example of total similarity level.

The information processing apparatus 12 in FIG. 10 basically has the same function as the information processing apparatus 12 in FIG. 1. In FIG. 10, the components other than the item characteristic amount storing unit 37, the preference information storing unit 40, and the presentation unit 41 are not described.

In the information processing apparatus 12 in FIG. 10, the presentation unit 41 includes a preference information obtaining unit 61 and an item preference level calculating unit 62.

The preference information obtaining unit 61 obtains, on the basis of an instruction for selecting the preference information with respect to predetermined evaluation types, which is input through the input unit 21 by the user, the preference information according to the evaluation type from the preference information storing unit 40. The preference information obtaining unit 61 supplies the obtained preference information to the item preference level calculating unit 62.

The item preference level calculating unit 62 obtains, on the basis of the item type of the preference information from the preference information obtaining unit 61, the item characteristic amount from the item characteristic amount storing unit 37, and calculates an item preference level indicating a level of preference for an item of the user. The item preference level calculating unit 62 performs a predetermined process for the calculation result (item preference level) to be supplied to the display unit 22.

[Item Preference Level Calculating Process of Information Processing Apparatus]

Figure 11:
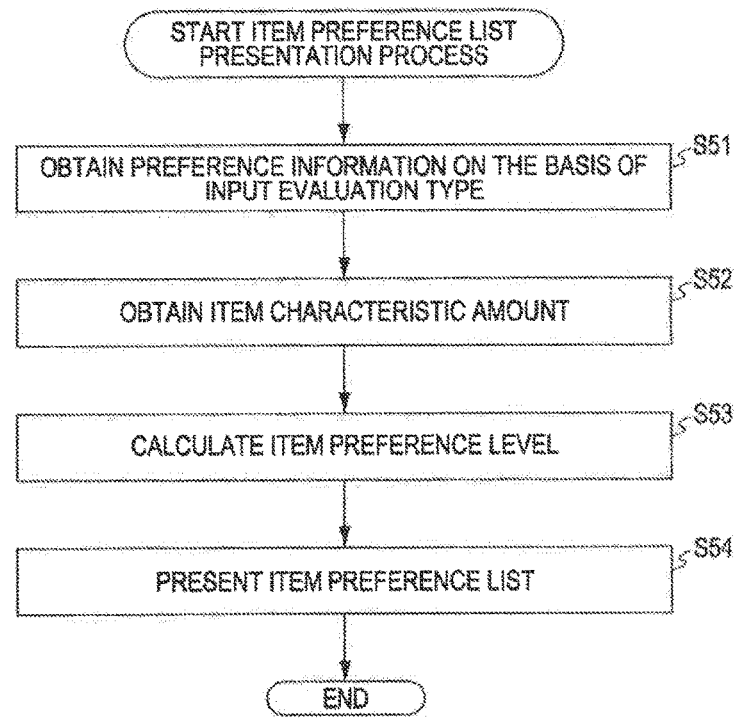
FIG. 11 is a flowchart illustrating an item preference level calculating process.

Next, an item preference level calculating process according to the information processing apparatus in FIG. 10 will be described with reference to a flowchart in FIG. 11.

In step S51, the preference information obtaining unit 61 obtains, on the basis of an evaluation type which is input through the input unit by the user, the preference information according to the evaluation type from the preference information storing unit 40 and supplies the obtained preference information to the item preference level calculating unit 62. At this time, the preference information obtained by the preference information obtaining unit 61 is preference information with respect to a user who manipulates the input and output apparatus 11. For example, in the case where a user 1 manipulates the input and output apparatus 11 to input an evaluation type which is "cool or not" through the input unit 21, the preference information obtaining unit 61 obtains the third and fourth preference information from the top in FIG. 9.

In step S52, the item preference level calculating unit 62 obtains, on the basis of the item type of the preference information from the preference information obtaining unit 61, en item characteristic amount from the item characteristic amount storing unit 37. For example, the item preference level calculating unit 62 obtains the item characteristic amount having the item type "song" from the item characteristic amount storing unit 37, on the basis of the item type which is "song" in the preference information from the preference information obtaining unit 61.

In step S53, the item preference level calculating unit 62 calculates an item preference level, on the basis of the preference information from the preference information obtaining unit 61 and the item characteristic amount obtained from the item characteristic amount storing unit 37. For example, the item preference level calculating unit 62 calculates, on the basis of scores of "1.2" and "4.5" of "coefficient of music characteristic amount 1" and "coefficient of music characteristic amount 2" of the third and fourth preference information the evaluation type is "cool or not") from the top in FIG. 9, and scores of "3.1" and "9.3" of "music characteristic amount 1" and "music characteristic amount 2" of the item characteristic amount of "song A" in FIG. 7, an item preference level of 45.57 (=1.2×3.1+4.5×9.3) for the song A of the user 1. Similarly, the item preference level calculating unit 62 calculates, on the basis of scores of "1.2" and "4.5" of "coefficient of music characteristic amount 1" and "coefficient of music characteristic amount 2" of the third and fourth preference information (the evaluation type is "cool or not") from the top in FIG. 9, and scores of "1.2" and "2.2" of "music characteristic amount 1" and "music characteristic amount 2" of the item characteristic amount of "song B" in FIG. 7, an item preference level of 14.94 (=1.2×4.2+4.5×2.2) for the song B of the user 1.

In step S54, the presentation unit 41 supplies an item preference level list in which the item preference levels calculated by the item preference level calculating unit 62 are sorted in a descending order to the display unit 22, for presentation. For example, the presentation unit 41 presents the item preference level for the evaluation type "cool or not" of the user 1 in the order of an item preference level of 14.94 for the song B and an item preference level of 45.57 for the song A, as the item preference level list.

According to the above described process, since the tendency of preferences for items of the user can be presented according to the preference information, the user can recognize the tendency of his or her preferences for items including an item which was not evaluated in the past by the user. Thus, for example, the user can retrieve his or her preference item.

In the above description, the tendency of the preferences for the items of the user has been presented, the level of preference similarity with respect to other users can be calculated according to the preference information and items evaluated by other similar users can be presented (recommended).

[Configuration Example of Information Processing Apparatus which Presents Items Evaluated by Other Users]

Herein, a configuration example of an information processing apparatus which calculates a similarity level of preference with respect to other users and presents items (recommended items) evaluated by other similar users will be described with reference to FIG. 12. Hereinafter, a user who manipulates the input and output apparatus 11 is referred to as the present user with respect to the other users.

Figure 12:
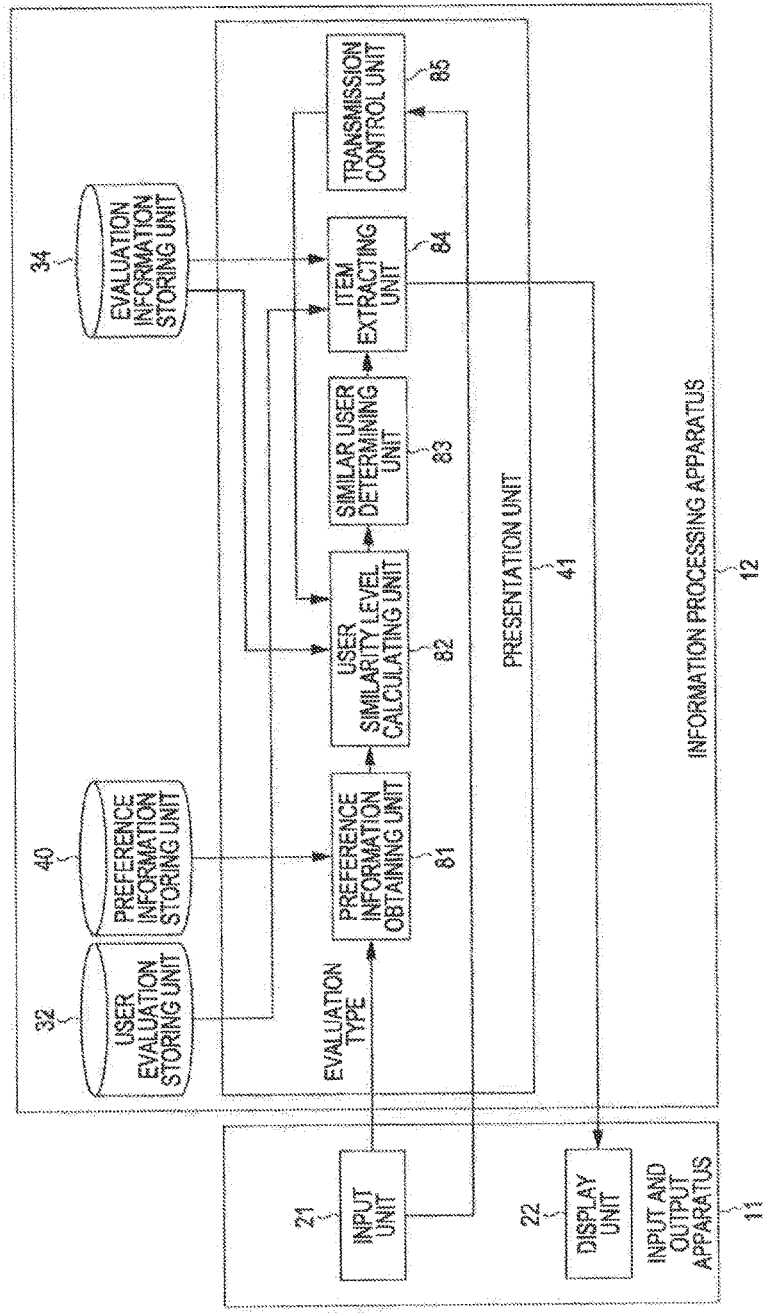
FIG. 12 is a block diagram illustrating a configuration example of an information processing apparatus.

The information processing apparatus 12 in FIG. 12 basically has the same function as the information processing apparatus 12 in FIG. 11n FIG. 12, the components other than the user evaluation storing unit 32, the evaluation information storing unit 34, the preference information storing unit 40 and the presentation unit 41 are not described.

In the information processing apparatus 12 in FIG. 12, the presentation unit 41 includes a preference information obtaining unit 81, a user similarity level calculating unit 82, a similar user determining unit 83, an item extracting unit 84 and a transmission control unit 65.

The preference information obtaining unit 81 obtains, on the basis of an instruction for selecting preference information for predetermined evaluation types, which is input through the input unit 21 by the user, the preference information of each user according to the evaluation type from the preference information storing unit 40. The preference information obtaining unit 81 supplies the obtained preference information to the user similarity level calculating unit 82.

The user similarity level calculating unit 82 calculates a similarity level between the present user and the other users on the basis of the preference information with respect to each user from the preference information obtaining unit 81 and the evaluation information corresponding to each user, and then supplies the preference information to which the similarity level is added, to the similar user determining unit 83.

The similar user determining unit 83 determines other similar users who are similar to the present user, and other non-similar users who are not similar to the present user, on the basis of the preference information having the added similarity level from the user similarity level calculating unit 82. The similar user determining unit 83 supplies preference information according to the similar users and the non-similar users to the item extracting unit 84.

The item extracting unit 84 extracts from the evaluation information storing unit 34 evaluation information by evaluations of the other users, on the basis of the preference information according to the other similar users and the other non-similar users from the similar user determining unit 83, and also extracts corresponding user evaluation from the user evaluation storing unit 32. The item extracting unit 84 supplies items (item names) in the extracted evaluation information and the corresponding user evaluations to the display unit 22. The display unit 22 displays (presents) the item names and the user evaluations supplied from the item extracting unit 84.

The transmission control unit 85 transmits a message (comment) for the presented item or the user evaluation which is input through the input unit 21 by the user to the other users (for example, an input and output apparatus 11 or the like which is manipulated by the other users).

[Recommendation Item Presentation Process of Information Processing Apparatus]

Next, a recommendation item presentation process in the information processing apparatus in FIG. 12 will be described with reference to a flowchart in FIG. 13.

In step S71, the preference information obtaining unit 81 obtains, on the basis of evaluation type which is input through the input unit 21 by users, each users preference information according to the evaluation types from the preference information storing unit 40, and then supplies the obtained preference information to the user similarity level calculating unit 82. For example, in the case where a user 1 manipulates the input and output apparatus 11 to input an evaluation type "like or not" through the input unit 21, the preference information obtaining unit 61 obtains the preference information of users 1, 2 and 3 having the evaluation types "like or not" in FIG. 9 from the preference information storing unit 40, and then supplies the obtained preference information to the user similarity level calculating unit 82.

In step S72, the user similarity level calculating unit 82 calculates, on the basis of the preference information from the preference information obtaining unit 81 for each user corresponding to the evaluation type which is input by the users and the evaluation information corresponding to each user, a similarity level between the present user and the other users, and then supplies the preference information to which the similarity level is added, to the similar user determining unit 83.

Herein, as the similarity level to be calculated, a similarity level between preference information (hereinafter, referred to as a macro similarity level), and an inter-user similarity level (hereinafter, referred to as a micro similarity level) in the evaluation information may be considered.

The macro similarity level is calculated by calculating a distance between the preference information group and its calculation method becomes different according to a combination of the evaluation types as shown in FIG. 14.

As shown in FIG. 14, when the combination of the evaluation types is the same evaluation type (one evaluation type), a purpose of similarity level calculation is to retrieve users who are similar in usage (feeling) of a specific evaluation type. When the combination of the evaluation type is the same evaluation type group (a plurality of evaluation types), a purpose of similarity level calculation is to retrieve users who are similar in usage (feeling) of a specific evaluation type group. Further, when the combination of the evaluation types is a different evaluation type (different evaluation types), a purpose of similarity level calculation is to retrieve users who are similar in that the evaluation types that overlap between the users' preference information are few.

In the case where the combination of the evaluation types is the same evaluation type, the similarity level is calculated by simply calculating the distance between the preference information. In the case where the combination of the evaluation type is the same evaluation type group, the similarity level is calculated by calculating the distance between the preference information with respect to the plurality of the evaluation types, respectively, and calculating an average thereof. In the case where the combination of the evaluation types is the different evaluation type, words which are the evaluation type are expanded or exchanged by a thesaurus or the like, to recognize the words as the same evaluation type. Further, the similarity level is calculated by adding a distance between the words in the thesaurus to the distance between the preference information.

Specifically, for example, in the case where the combination of the evaluation types is the same evaluation type, the distance between the evaluation information becomes, for example, a Euclid distance or a Cos distance when the preference information is expressed as a vector, and becomes, for example, a Frobenius norm or the like when the preference information is expressed as a matrix.

For example, in the preference information shown in FIG. 9, a Euclid distance $D_{12}$ between the user 1 an the user 2 with respect to the evaluation information "like or not" becomes $D_{12}=\sqrt{((6.0-3.0)^2+(-0.5-10.3)^2)} \cong 11.3$, from the scores in the respective preference information. Further, a Euclid distance $D_{13}$ between the user 1 and the user 3 becomes $D_{13}=\sqrt{((3.1-3.0)^2+(9.9-10.3)^2)}=0.5$, from the scores in the respective preference information. In addition, if the similarity level is a reciprocal number of the distance, the similarity level between the user 1 and the user 2 becomes approximately 0.089, and the similarity level between the user 1 and the user 3 becomes 2.

Meanwhile, the micro similarity level is obtained by comparing the items and the evaluation types or the like which are the evaluation targets, in the evaluation information of the users. For example, in the case where in the evaluation information of the users, the same evaluation types correspond to the same items, or the P/Ns (positive or negative) for the same items are the same regardless of the evaluation types, it is considered that the users are similar. Further, in the case where the evaluation types corresponding to the same items are words (keyword), the similarity level in the thesauruses of the words may be the macro similarity level. Herein, noticeable items when the macro similarity level is obtained may be items which are especially preferred by users, items which are currently viewed by users, or the like.

In step S72, the user similarity level calculating unit 82 may calculate both the macro similarity level and the micro similarity level or may calculate any one of the macro similarity level and the micro similarity level.

Figure 13:
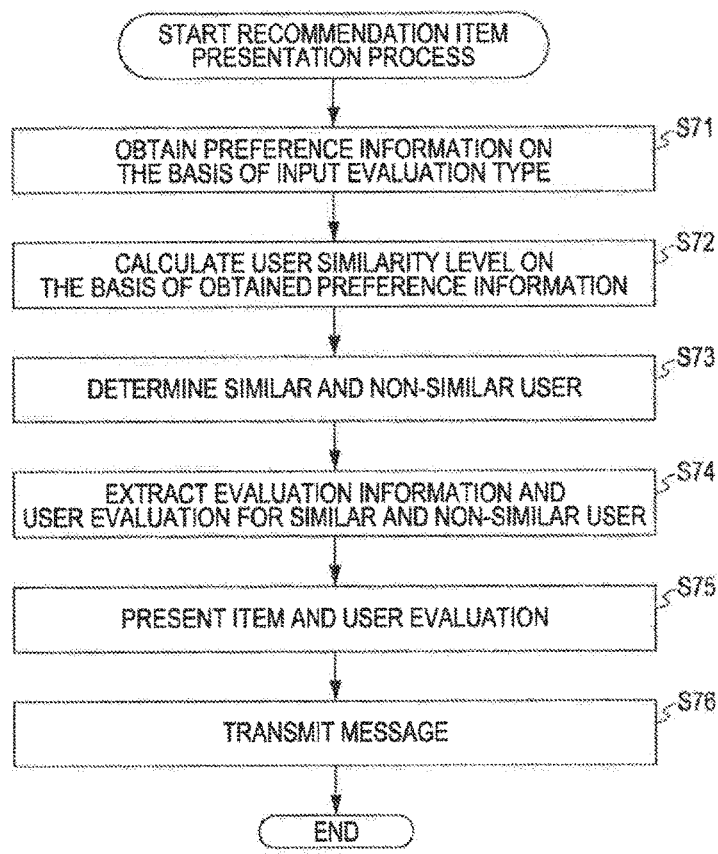
FIG. 13 is a flowchart illustrating a recommendation item presentation process.

Returning to the flowchart in FIG. 13, in step S73, the similar user determining unit 83 determines the similar users and the non-similar users on the basis of the preference information having the added similarity level from the user similarity level calculating unit 82. The similar user determining unit 33 supplies the preference information according to the similar users and the non-similar users to the item extracting unit 84. For example, the similar user determining unit 83 sets a predetermined threshold with respect to the macro similarity level, sets the users of which the macro similarity level exceeds the predetermined threshold to the similar users, and sets the users of which the macro similarity level does not exceed the threshold to the non-similar users. In addition, the users may be simply sorted according to the similarity level, instead of by being divided the similarity and non-similarity according to the similarity level. Moreover, in the case where both the macro similarity and the micro similarity are calculated, a combination of the similarity and the non-similarity with respect to each similarity level is considered. For example, in the case where a user is a similar user in the macro similarity level and a non-similar user in the micro similarity level, the user becomes a macro-similar and micro-non-similar user.

In step S74, the item extracting unit 84 extracts, on the basis of the preference information according to the similar users and the non-similar users from the similar user determining unit 83, evaluation information according to the evaluations of the other users from the evaluation information storing unit 34, and extracts the corresponding user evaluations from the user evaluation storing unit 32. The item extracting unit 84 supplies items (names) in the extracted evaluation information and corresponding user evaluations to the display unit 22.

In step S75, the display unit 22 displays (presents) the name of the item names and the user evaluations supplied from the item extracting unit 34.

For example, the item extracting unit 84 extracts, on the basis of the similar users' preference information, evaluation information in which an item which has not been evaluated (viewed) by the present user is highly evaluated by the similar users from the evaluation information storing unit 34. In addition, the item extracting unit 84 extracts the user evaluation corresponding to the extracted evaluation information from the user evaluation storing unit 32. At this time, for example, as disclosed in the non-patent document 1, on the basis of similarity and non-similarity (correlation coefficients of evaluation values) of the plurality of other users, prediction evaluation values of the items may be calculated, and the evaluation information with respect to the items may be extracted. Further, evaluations of the other users are calculated on the basis of the extracted user evaluations, for example, total information of the number of positive evaluations, the number of negative evaluations or the like may be generated for presentation.

Moreover, if there is an item evaluated by other users among items which has been (is being) evaluated or viewed by the present user, the item extracting unit 84 extracts and presents the corresponding user evaluation and evaluation information. At this time, for example, in the case where a certainty factor in the evaluation information is smaller than a predetermined value, the corresponding user evaluation may not be presented.

In addition, in a field of community services on a network such as an SNS (Social Networking Service), names or icons of other users (similar and non-similar users) may be presented.

Further, in the case where both the macro similarity level and the micro similarity level are calculated, the following presentation may be given according to the combination of the similarity and non-similarity for each similarity level in the other users.

a) Case of Macro-Similar and Micro-Similar User

As described above, items or user evaluations are presented.

b) Case of Macro-Similar and Micro-Non-Similar User

An attribute of the target item which is evaluated by another user as the user evaluation is presented to the present user in a highlighted manner. Further, in the case where polarity (P/N) is included in the evaluation information, evaluation information, which is evaluation information with respect to the evaluation target item and has an opposite polarity to the polarity of the evaluation information according to the present user, is presented. For example, according to the preference information in FIG. 9, the user 1 and the user 3 have a high macro similarity level, but according to the user evaluation in FIG. 3, the user 1 evaluates the same song A as "cool", but the evaluation of user 3 is that "voice is a bit grating", and thus, the micro similarity level is low.

In this case, for example, 'the user 3 said "The voice in song A is a bit grating"' or the like is presented.

Accordingly, the user can recognize the other users' feelings with respect to the item.

c) Case of Macro Non-Similar and Micro-Similar User

The degree to which the macro similarity level regarding another user is low is presented to the present user. Specifically, all images of the macro-non-similar and micro-similar user (for example, preferable genre or top 10 artists or the like of the user (or user group)) are presented. For example, in the case where the user 1 who likes rock music evaluates a song C as positive, whereas another user who gives a positive evaluation for the song C mainly likes techno music, the other user may give a presentation such as "it seems that there are many techno fans among those who give the positive evaluations for the song C" to the user. Further, even in the case of the name positive evaluation, in the case where the user 1 gives an evaluations of a thick sound with a high tempo, whereas most of other users highly evaluate the vocals having an effect applied thereto, a presentation such as "it seems that there are many people who like the vocals having an effect applied thereto" may be given.

Accordingly, the user 1 can evaluate the previously evaluated song from a new point of view.

That is, the above described presentation pattern may be designated by the user or may be determined according to the combination of the similarity and the non-similarity.

Returning to the flowchart in FIG. 13, in step S76, the transmission control unit 85 transmits a message (for example, "I agree with you") corresponding to a presented item or a user evaluation which is input through the input unit 21 by the user, to other users (for example, input and output apparatuses 11 or the like manipulated by the other users). Further, the transmission control unit 85 supplies information indicating the other users who transmit messages such as "I agree with you" to the user similarity level calculating unit 82, and the user similarity calculating unit 82 calculates the previously calculated similarity level as a similarity level which is, for example, α times (α>1) when the similarity level is newly calculated with respect to the other users.

According to the above described process, an item which has not been evaluated (viewed) can be recognized or a new point of a known item can be found. In addition, even though the user did not evaluate the same item in the past, the user can find similar users whose preferences or emotions are similar on the basis of the characteristic of the item. Moreover, specific evaluations for the item of the similar users (or non-similar users) can be recognized.

In the above description, the similarity level of preferences with respect to the other users is calculated according to the preference information, and the item evaluated by the other similar users is presented, but a similar evaluation type may be presented according to the preference information.

[Configuration Example of Information Processing Apparatus which Presents Similar Evaluation Type]

Herein, a configuration example of the information processing apparatus which presents a similar evaluation type will be described with reference to FIG. 15.

Figure 15:
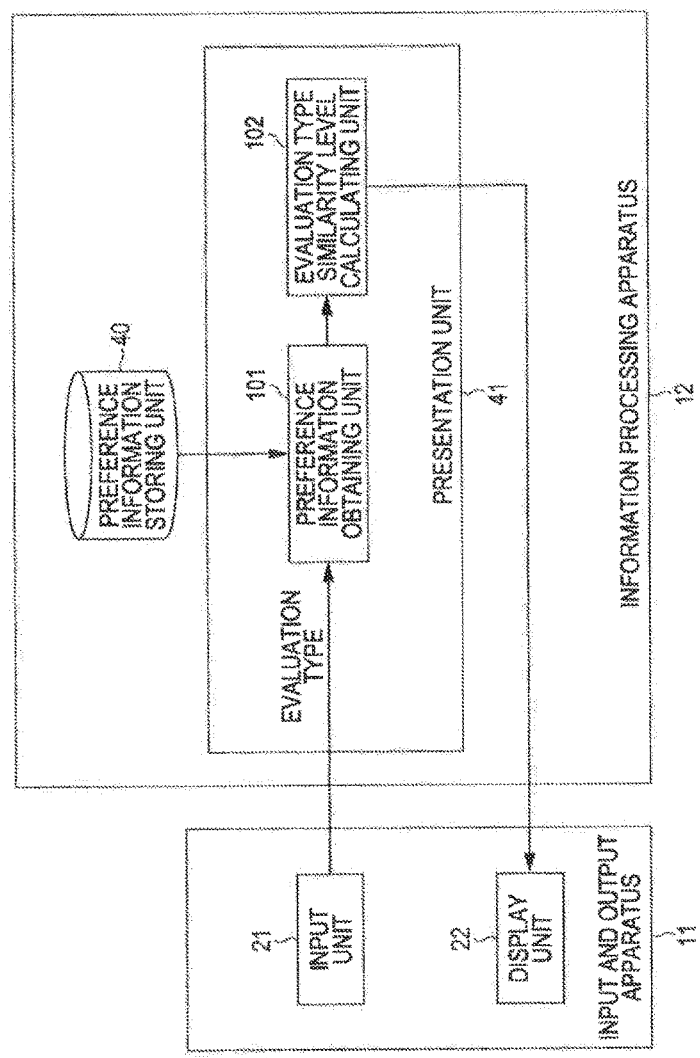
FIG. 15 is a block diagram illustrating a configuration example of an information processing apparatus.

The information processing apparatus 12 in FIG. 15 basically has the same function as the information processing apparatus 12 in FIG. 1. In FIG. 15, the components other than the preference information storing unit 40 and the presentation unit 41 are not described.

In the information processing apparatus 12 in FIG. 12, the presentation unit 41 includes a preference information obtaining unit 101 and an evaluation type similarity level calculating unit 102.

The preference information obtaining unit 101 obtains, on the basis of an instruction for selecting the preference information on the plurality of evaluation types which is input through the input unit 21 by the user, the plurality of preference information according to the evaluation type from the preference information storing unit 40. The preference information obtaining unit 101 supplies the obtained preference information to the evaluation type similarity level calculating unit 102.

The evaluation type similarity level calculating unit 102 calculates the similarity level of the evaluation types with respect to one preference information and the other preference information among the plurality of preference information from the preference information obtaining unit 101, and displays the result to the display unit 22.

[Similar Evaluation Type Presentation Process of Information Processing Apparatus]

Figure 16:
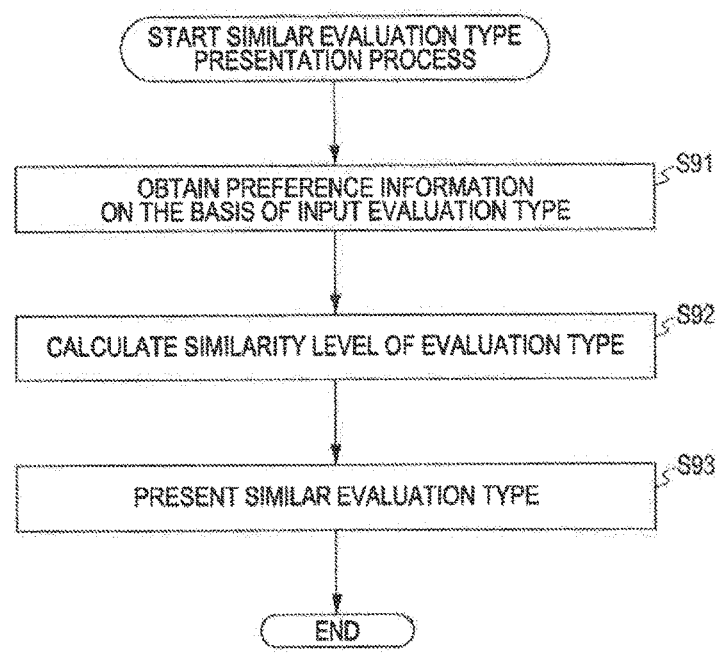
FIG. 16 is a flowchart illustrating a similar evaluation type presentation process.

Next, a similar evaluation type presentation process according to the information processing apparatus in FIG. 15 will be described with reference to a flowchart in FIG. 16.

In step S91, the preference information obtaining unit 101 obtains, on the basis of the plurality of evaluation types which is input through the input unit 21 by the user, the plurality of preference information of the present user according to the evaluation types from the preference information storing unit 40, and then supplies the obtained preference information to the evaluation type similarity level calculating unit 102.

In step S92, the evaluation type similarity level calculating unit 102 calculates the similarity levels according to the evaluation types with respect to one preference information and the other preference information among the plurality of the preference information from the preference information obtaining unit 101, and then supplies the result to the display unit 22. For example, the evaluation type similarity level calculating unit 102 calculates a distance according to each score with respect to the preference information having the evaluation type "like or not" and the other preference information among the plurality of preference information, thereby calculating the similarity levels of the evaluation types. The evaluation type which becomes a standard of the calculation of the similarity levels (for example, "like or not") may be selected by the user, or may be the evaluation type which is frequently used by the user.

In step S93, the display unit 22 displays (presents), on the basis of the similarity levels which are calculated by the evaluation type similarity level calculating unit 102, the evaluation types (similar evaluation types) of the similarity levels larger than a predetermined value. In addition, the display unit 22 may display the evaluation types having the similarity levels calculated by the evaluation type similarity level calculating unit 102 in a descending order of the similarity levels.

In the above description, the evaluation types which are similar to one evaluation type are presented on the basis of the distance between preference information with respect to the present user, bit characteristic evaluation types may be presented to the present user according to the distance between preference information with respect to other users.

For example, with respect to the plurality of users (for example, all users), an average vector μ and a covariance matrix Σ are created from the preference information (expressed as a transformation vector) for a predetermined evaluation type. The degree that preference information $S_u$ of the present user is deviated from the average vector $\mu$ is calculated on the basis of the created average vector $\mu$ and the covariance matrix $\Sigma$, thereby presenting differences in the preference types of the other users. For example, in the case where Mahalanobis' generalized distance $((S_u-\mu)^T \Sigma (S_u-\mu))^{1/2}$ is equal to or more than 1, since it is considered that usage of the evaluation type (semantic aspect) is different from those of the other users, "Your usage of OO is a bit different from those of the other users" or the like is presented. The presented evaluation type may be determined by, for example, usage frequency thereof.

Further, for example, "you often give a 'cool' evaluation" or the like may be presented with respect to an evaluation type having a high usage frequency.

In addition, among similar evaluation types, the evaluation type having the highest score in the preference information corresponding to a characteristic amount designated by the user or a characteristic amount which is the most characteristic (deviation from the average value of all items) in contents (items) which are currently viewed, may be presented.

Further, when calculating the similarity level, with respect to an evaluation type pair including two predetermined evaluation types, in the case where a path length in a tree structure defining a thesaurus is long, and a distance between corresponding preference information is short, and also in the case where the path length is short and the distance between the preference information is long, usage of the evaluation type pair by the user may be determined to be abnormal.

Hereinbefore, a configuration in which similar users or items evaluated by the similar users are presented as information on the basis of the preference information is described, but the similar users or the items evaluated by the similar users may be displayed in a space.

2. Second Embodiment

Hereinafter, an example of a space display of an item (visualization) will be described with reference to FIGS. 17 to 31. The number of dimensions in the space on which the item is displayed may be random, but hereinafter it will be described as having two dimensions.

[Configuration Example of Information Processing Apparatus which Space-Displays Item]

Firstly, a configuration example of the information processing apparatus which space-displays an item will be described with reference to FIG. 17.

Figure 17:
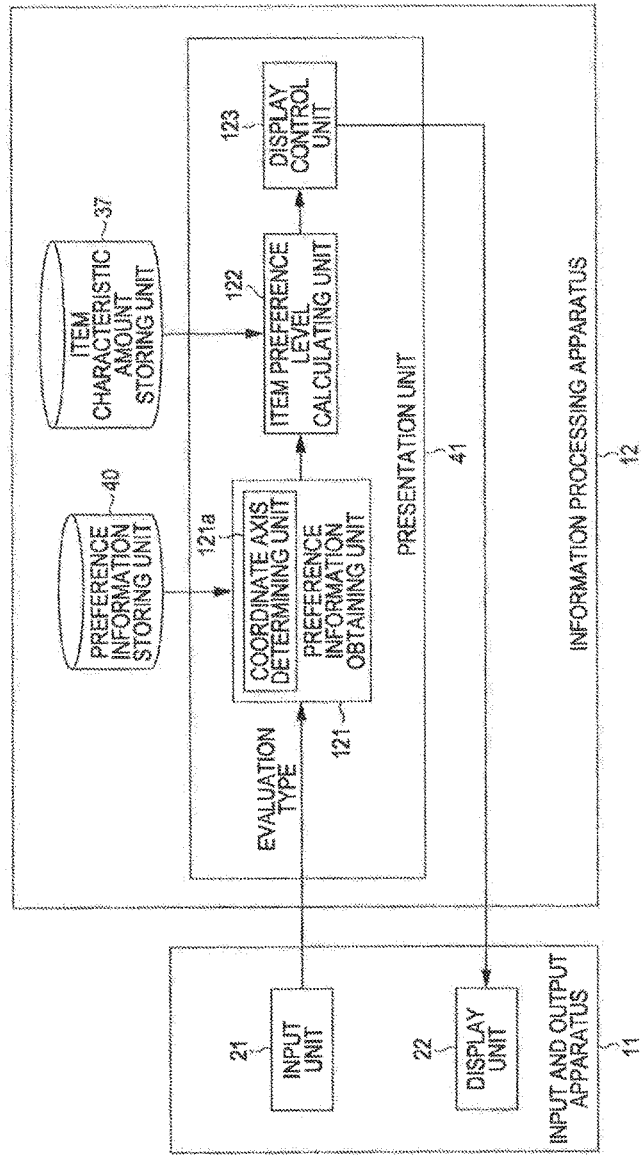
FIG. 17 is a block diagram illustrating a configuration example of an information processing apparatus.

The information processing apparatus 12 in FIG. 17 has basically the same function as the information processing apparatus 12 in FIG. 1. In FIG. 17, the components other than the item characteristic amount storing unit 37, the preference information storing unit 40 and the presentation unit 41 are not described.

In the information processing apparatus 12 in FIG. 17, the presentation unit 41 includes a preference information obtaining unit 121, an item preference level calculating unit 122 and a display control unit 123.

The preference information obtaining unit 121 obtains, on the basis of an instruction for obtaining preference information corresponding to evaluation types, which is input through the input unit 21 by the user and defines a space, the preference information according to the evaluation types from the preference information storing unit 40. The preference information obtaining unit 121 supplies the obtained preference information to the item preference level calculating unit 122.

Further, the preference information obtaining unit 121 includes a coordinate axis determining unit 121a. The coordinate axis determining unit 121a determines, on the basis of an instruction for obtaining preference information corresponding to evaluation types defining the space, which is input through the input unit 21 by the user, coordinate axes for defining the space in which items are displayed, and supplies the determined coordinate axes to the display control unit 123 through the item preference level calculating unit 122 as space definition information.

The item preference level calculating unit 122 obtains, on the basis of item types of the preference information from the preference information obtaining unit 121, item characteristic amounts from the item characteristic amount storing unit 37, and calculates item preference level indicating the level of preferences for the items of the users. The item preference level calculating unit 122 performs a predetermined process for the calculation results to be supplied to the display control unit 123.

The display control unit 123 displays, on the basis of the space definition information from the coordinate axis determining unit 121a and the item preference level from the item preference level calculating unit 122, the item preference levels in the space (two-dimensional plane).

[Item Preference Level Space Display Process of Information Processing Apparatus]

Figure 18:
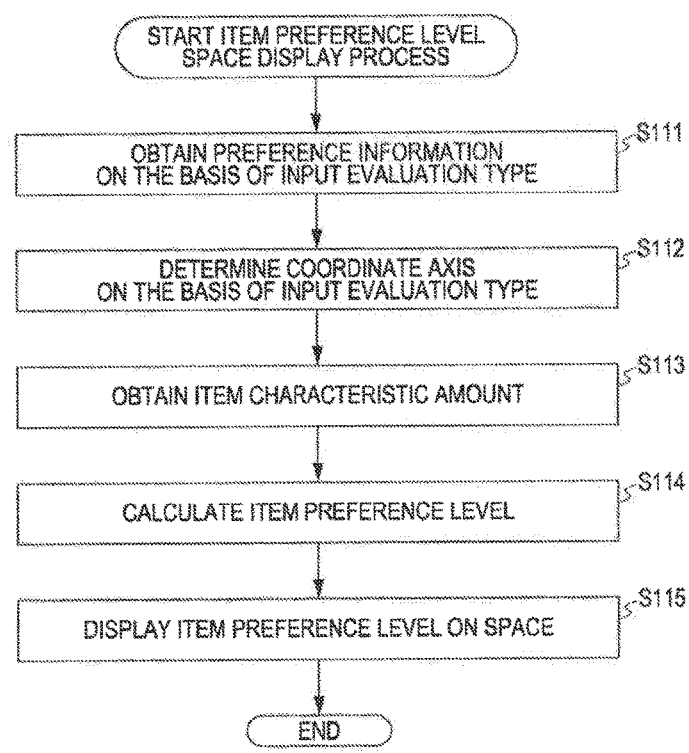
FIG. 18 is a flowchart illustrating an item preference level space display process.

Next, an item preference level space display process in the information processing apparatus in FIG. 17 will be described with reference to a flowchart in FIG. 18.

In step S111, the preference information obtaining unit 121 obtains, on the basis of the evaluation types which are input through the input unit 21 by the users, the preference information according to the evaluation types from the evaluation information storing unit 40, and then supplies the obtained preference information to the item preference level calculating unit 122.

In step S112, the coordinate axis determining unit 121a determines the coordinate axes on the basis of the evaluation types which are input through the input unit 21 by the user, and supplies the coordinate axes to the display control unit 123 through the item preference level calculating unit 122 as the space definition information. For example, the coordinate axis determining unit 121a sets the transformation result according to the FDA for the evaluation type "like" (inner product of a characteristic amount vector (item characteristic amount) and a transformation vector (preference information)) to the x axis, the transformation result according to the FDA for the evaluation type "cool" to the y axis.

In step S113, the item preference level calculating unit 122 obtains, on the basis of an item type of the preference information from the preference information obtaining unit 121, the item characteristic amount from the item characteristic amount storing unit 37.

In step S114, the item preference level calculating unit 122 calculates an item preference level on the basis of the preference information (transformation vector) from the preference information obtaining unit 121 and the item characteristic amount (characteristic vector) obtained from the item characteristic amount storing unit 37, and then supplies the calculated item preference to the display control unit 123.

In step S115, the display control unit 123 displays, on the basis of the space definition information from the coordinate axis determining unit 121a and the item preference level from the item preference level calculating unit 122, the item preference level in the space (two-dimensional plane). At this time, for example, as shown in the left side in FIG. 19, according to whether the item is known or unknown to the user, the color of a point indicating the item may be changed.

Figure 19:
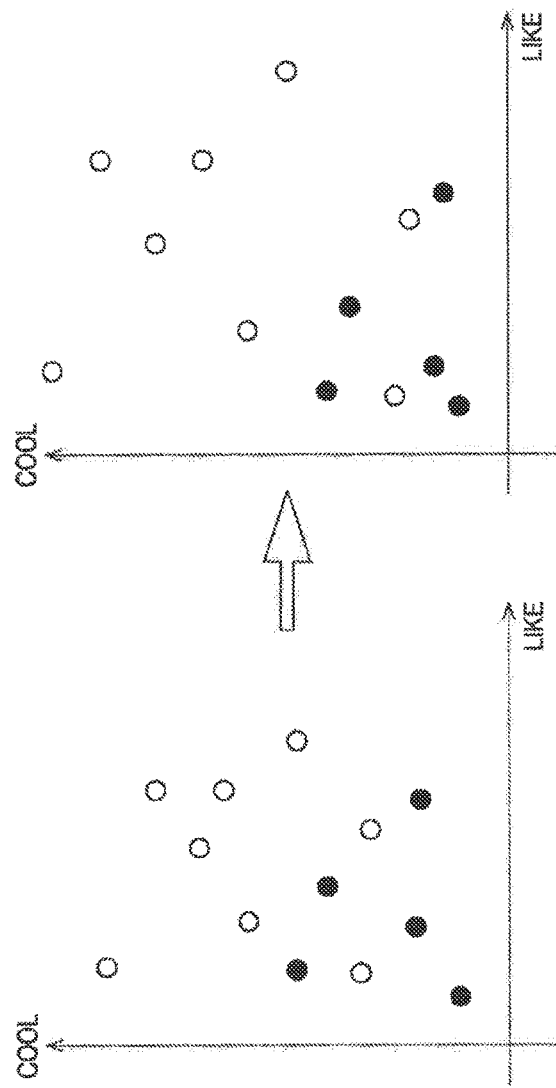
FIG. 19 is a diagram illustrating an example of display of item preference level.

In FIG. 19, the evaluation type "like" is represented in the transverse axis, the evaluation type "cool" is displayed in the longitudinal axis. Here, black circles are displayed as known items and white circles are displayed as unknown items. The items in the space are not limited to the black circles and the white circles shown in FIG. 19, for example, the items may be icons of images or the like which are related to the items, or may be circles having sizes corresponding to the view frequencies of the users.

Information about the view frequencies of the user or whether the items are known or unknown to the user represents bias of experiences of the user for the items. Accordingly, in order to emphasize the items to be experienced from that time, as shown in the left side of FIG. 19, in a region where many items which are not experienced by the user are distributed, for example, the coordinate axes may be exponentially transformed to broadly show the space. In the right side of FIG. 19, since the unknown items are distributed in the upper left region, in the space (on the plane surface), it is processed so that the upper left region is to be broadly shown.

Figure 20:
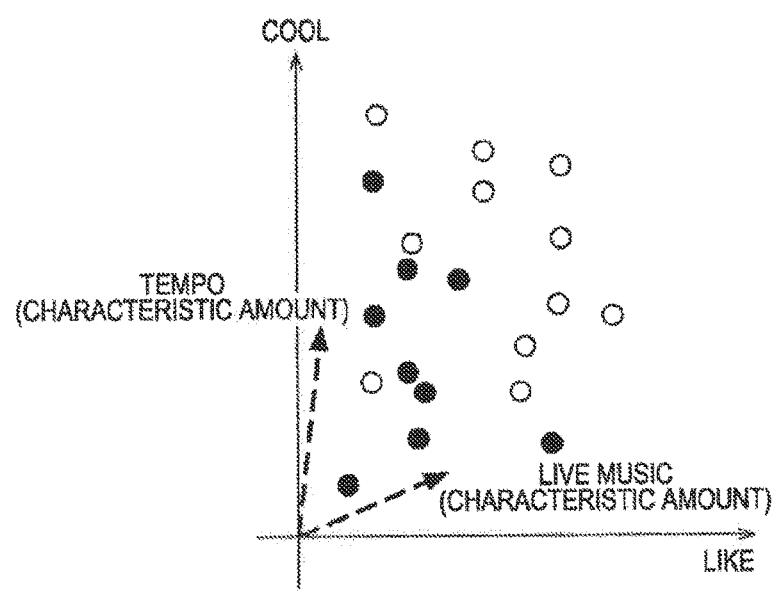
FIG. 20 is a diagram illustrating an example of display of item preference level.

Further, characteristic amounts having characteristic distribution may be displayed in the space. The preference information is created on the basis of the degree of relevance between a certain evaluation type and a certain characteristic amount (a regression coefficient in the case of the regression equation, a component value corresponding to the characteristic amount in the case of a transformation vector of the FDA). Accordingly, for example, in the case where the item preference levels are space-displayed according to the FDA of the evaluation types "like" and "cool", a name of the characteristic amount having a large component value of the transformation vector of each evaluation type may be represented together with the names of the axes ("like and "cool"), in addition, a base having the largest size (square sum) according to the preference information may be selected, and the characteristic amount vectors (live music, tempo) may be displayed while overlapped in the space, as shown in FIG. 20. For example, if a 2×F transformation matrix of the FDP (F is the number of characteristic amounts) is T=($t_{ij}$), characteristic amounts $f_1$ and $f_2$ which are displayed in an overlapped manner in the space are determined by the following formula 1.

$$f_1 = \underset{f}{\mathrm{argmax}}(t_{1f}^2 + t_{2f}^2) \quad (1)$$

$$f_2 = \underset{f \neq f_1}{\mathrm{argmax}}(t_{1f}^2 + t_{2f}^2)$$

In formula 1, the argmax ( ) having an under f thereof represents a maximum value in a parenthesis ( ) in a range of f.

According to the process, since the tendency of preferences for items for every user can be displayed (visualized) in the space according to the preference information, the user can intuitively recognize the tendency of his or her preferences for the items, including items which are not previously evaluated by the user. Thus, for example, the user can effectively retrieve his or her preference items.

In the above description, the preference tendency for the items is displayed in the space, names according to distribution of the preference tendency may be displayed in the space.

[Configuration Example of Information Processing Apparatus which Displays Space Name]

Hereinafter, a configuration example of an information processing apparatus which displays a space name will be described with reference to FIG. 21.

Figure 21:
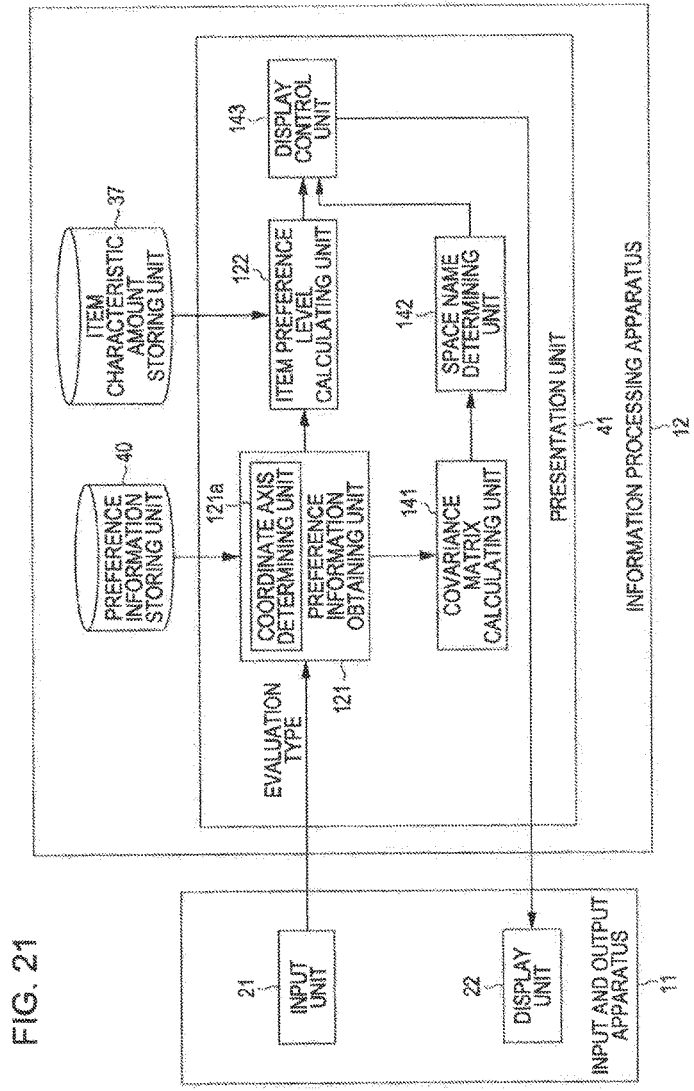
FIG. 21 is a block diagram illustrating a configuration example of an information processing apparatus.

The information processing apparatus 12 in FIG. 21 has the same function as the information processing apparatus 12 in FIG. 1. In FIG. 21, the components other than the item characteristic amount storing unit 37, the preference information storing unit 40 and the presentation unit 41 are not described.

In the presentation unit 41 in FIG. 21, the same names and references are used with respect to the components having the same functions as those provided in the presentation unit 41 in FIG. 17 and description thereof will be omitted as necessary.

In the presentation 41 in FIG. 21, a difference with respect to the presentation unit 41 in FIG. 17 is that a covariance matrix calculating unit 141 and a space name determining unit 142 are newly installed and a display control unit 143 is installed instead of the display control unit 123.

The covariance matrix calculating unit 141 calculates a covariance matrix in the coordinate axes of an item to which the evaluation type is added for each evaluation type in the space where the item preference levels are displayed.

The space name determining unit 142 calculates dispersion for every evaluation type for the coordinate axes on the basis of the covariance matrix calculated by the covariance matrix calculating unit 141, and uses evaluation types having the dispersion smaller than a predetermined value as display targets which are the space names.

The display control unit 143 displays the space names determined by the space name determining unit 142 in the space, in addition to the function which is provided with the display control unit 123 in FIG. 17.

[Space Name Display Process of Information Processing Apparatus]

Figure 22:
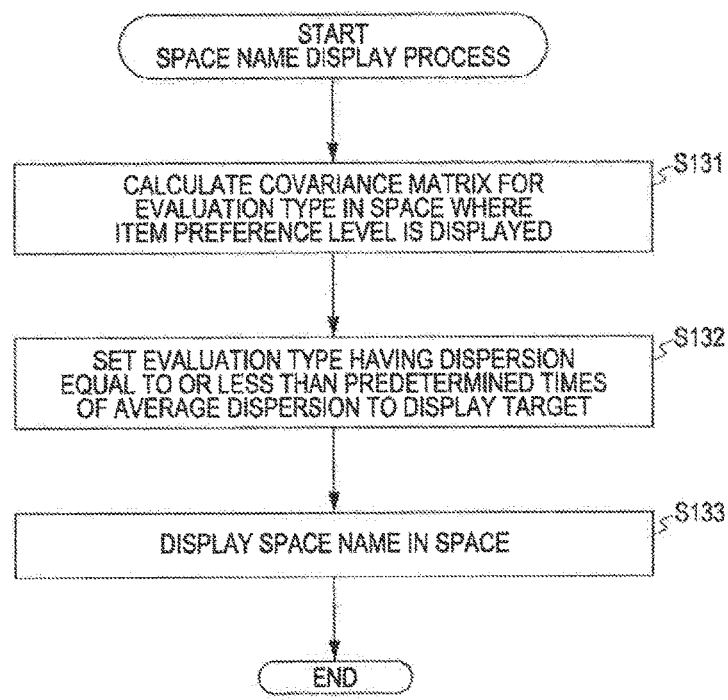
FIG. 22 is a flowchart illustrating a space name display process.

Next, a space name display process in the information processing apparatus in FIG. 21 will be described with reference to a flowchart in FIG. 22.

In step S131, the covariance matrix calculating unit 141 calculates a covariance matrix in the coordinate axes of the item to which the evaluation type is added for each evaluation type in the space where the item preference levels are displayed. More specifically, since the space where the item preference levels are displayed is two-dimensional, the covariance matrix for an evaluation type L is expressed by the following formula 2.

$$A^{(L)} = \begin{pmatrix} A_{11}^{(L)} & A_{12}^{(L)} \\ A_{21}^{(L)} & A_{22}^{(L)} \end{pmatrix} \quad (2)$$

Herein, the evaluation types used for calculating the item preference levels (that is determined in the coordinate axis) are not covered by the calculation of the covariance matrix.

In step S132, the space name determining unit 142 calculates dispersion for every evaluation type for the coordinate axes on the basis of the covariance matrix calculated by the covariance matrix calculating unit 141, and sets evaluation types having the dispersion smaller than a predetermined value as display targets which are the space names. More specifically, the space name determining unit 142 calculates an average value (average dispersion p) of dispersion (diagonal components of the covariance matrix) with respect to all the evaluation types, and sets the evaluation types having the dispersion less than predetermined times (for example, 0.5 times) of the average dispersion to the display targets. The average dispersion $\mu$ is expressed as $\mu=\text{diag}\ (\Sigma_L\ A^{(L)}/N_L)$ when the $N_L$ is a type number of the evaluation types. Herein, diag ( ) is a function extracting vectors from the diagonal components of the matrix. Accordingly, for respective evaluation types L, the evaluation types L in which $A^{(L)}_{ii}/\mu_i$ (in the case of two dimensions, i=1, 2) becomes less than 0.5 are determined as the space names. That is, the evaluation types L satisfying this condition for one axis may be determined as the space names, or the evaluation types L satisfying this condition with respect to all the axes may be determined as the space names.

Figure 23:
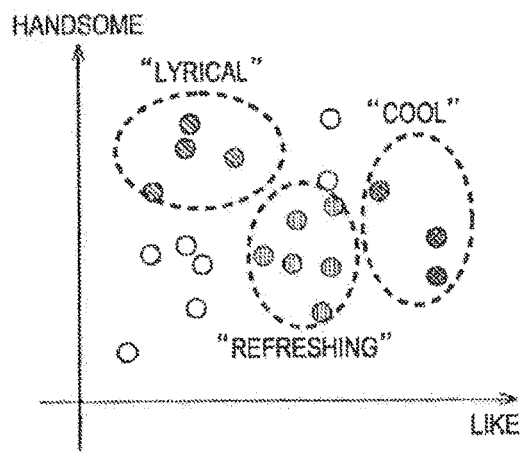
FIG. 23 is a diagram illustrating an example of display of a space name.

In step S133, the display control unit 143 displays the space names determined by the space name determining unit 142, for example, in the space as shown in FIG. 23. In FIG. 23, with respect to each evaluation type which is determined as the space names (lyric, refreshing and cool), an ellipse having standard deviations for the axes (transverse axis and longitudinal axis) as a long axis and a short axis is drawn centering around an average vector in the space, of the items which are given the evaluation type, and then the names of the evaluation types are displayed. Further, with respect to each evaluation type which is determined as the space names, the covariance matrix thereof is calculated, and thus, the ellipse which is suitable for the distribution of the items may be drawn.

In the above description, the ellipse which surrounds the items distributed in the space for every evaluation type is displayed, but the evaluation types may be displayed as scales of the axes as shown in FIG. 21.

Figure 24:
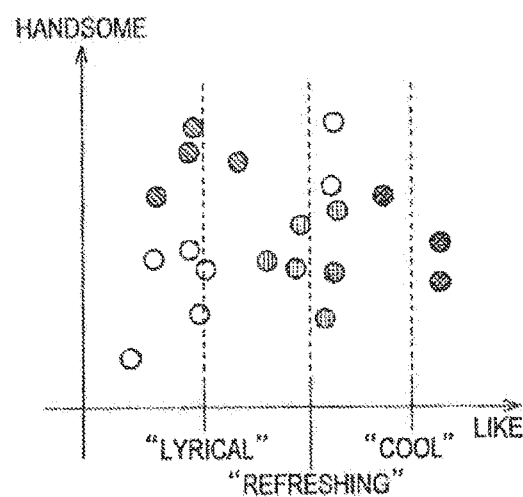
FIG. 24 is a diagram illustrating an example of display of a space name.

In order to display the evaluation types as the scales of the axes, since it is preferable that the respective evaluation types are not overlapped on the axes, for example the scales are displayed with respect to the axes having a large dispersion of an average value on the axes (having a broad interval between the scales), of the items which are given the respective evaluation types. For example, if an average vector in the two-dimensional space, of the items which are given the evaluation types L is $\mu_L=(\mu_{L1}, \mu_{L2})$, the dispersion of the average value on the "like" axis in FIG. 24 becomes $v_1=\text{var}\ (\mu_{11}, \mu_{12}, \ldots, \mu_{NL1})$. Herein, the var(x) is a function for calculating dispersion of x. Further, the dispersion of the average value on the "handsome" axis becomes $v_2=\text{var}\ (\mu_{21}, \mu_{22}, \ldots, \mu_{NL2})$. Herein, with respect to the axes in which the dispersions $v_1$ and $v_2$ are larger than a predetermined threshold, the evaluation types are displayed as the scales. In FIG. 24, the dispersion $v_1$ on the "like" axis becomes larger than the predetermined threshold, and evaluation types such as "lyrical", "refreshing" and "cool" are displayed as the scales.

Further, for example, the scales may be displayed with respect to axes in which the dispersion of intervals of the items which are given the respective evaluation types is small (scales are inclined at predetermined intervals).

According to the above described process, since information with respect to other preferences can be displayed (visualized) in the space on which the tendency of the preferences for the items is displayed, the user can intuitively recognize the tendency of his or her preferences for the items. Accordingly, for example, the user can effectively retrieve his or her preference items.

In the above description, a configuration in which the tendency of the preferences for the items is displayed in the space or names according to the distribution of the preference tendency are displayed in the space is described, but a specific item may be displayed to be a center of the space.

[Configuration Example of Information Processing Apparatus which Displays Specific Item in Center of Space]

Hereinafter, a configuration example of an information processing apparatus which displays a specific item in the center of the space will be described with reference to FIG. 25.

Figure 25:
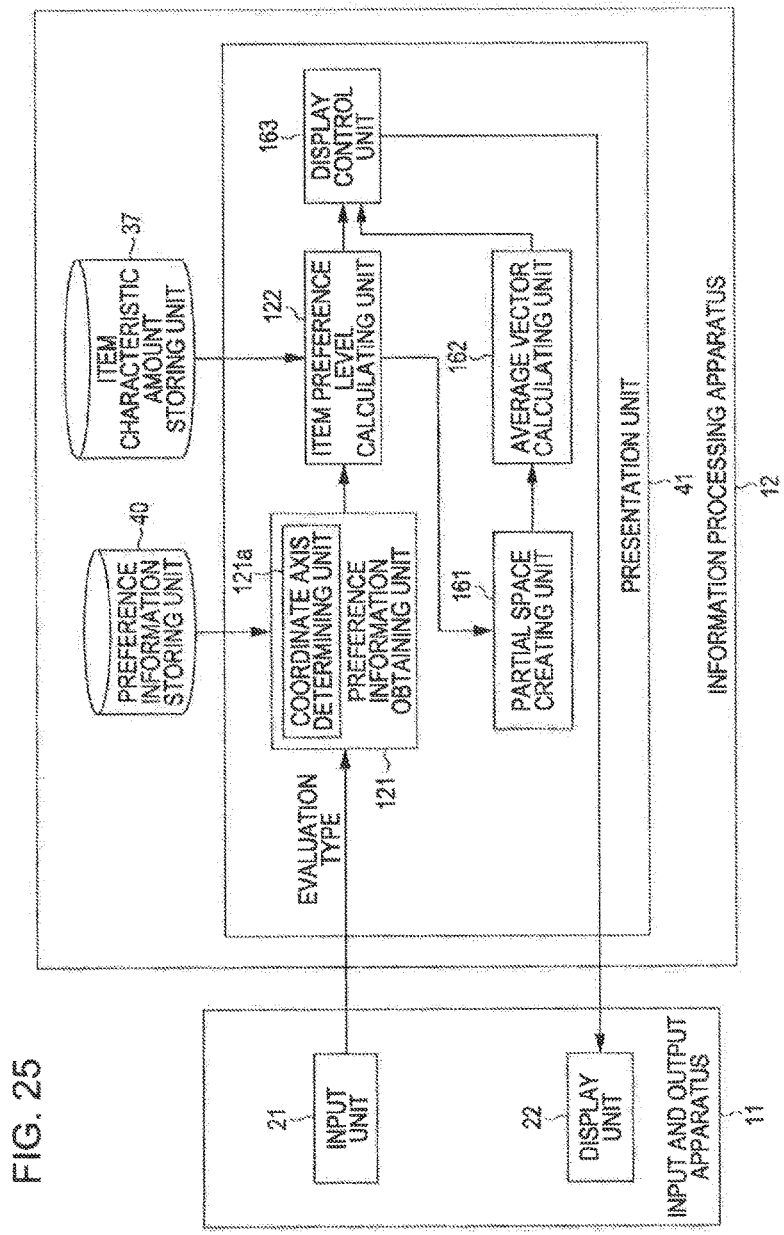
FIG. 25 is a block diagram illustrating a configuration example of an information processing apparatus.

The information processing apparatus 12 in FIG. 25 basically has the same function as the information processing apparatus 12 in FIG. 1. In FIG. 25, the components other than the item characteristic amount storing unit 37, the preference information storing unit 40 and the presentation unit 41 are not described.

In the presentation unit 41 in FIG. 25, the same names and references are used with respect to the component having the same function as those provided in the presentation unit 41 in FIG. 17, and description thereof will be omitted as necessary.

That is in the presentation unit 41 in FIG. 25, a difference with respect to the presentation unit 41 in FIG. 17 is that a partial space creating unit 161 and an average vector calculating unit 162 are newly installed and a display control, unit 163 is installed instead of the display control unit 123.

The partial space creating unit 161 creates a plurality of partial spaces including preference information (space including several pieces of preference information from among all the preference information).

The average vector calculating unit 162 calculates an average vector of item preference levels in the respective partial spaces which are created by the partial space creating unit 161.

The display control unit 163 displays a partial space in which a designated item is nearest to the average vector which is calculated by the average vector calculating unit 162, in addition to the function which is provided with the display control unit 123 in FIG. 17.

[Coordinate Axis Changing Process Displaying Item Preference Level Display Space in Information Processing Apparatus]

Figure 26:
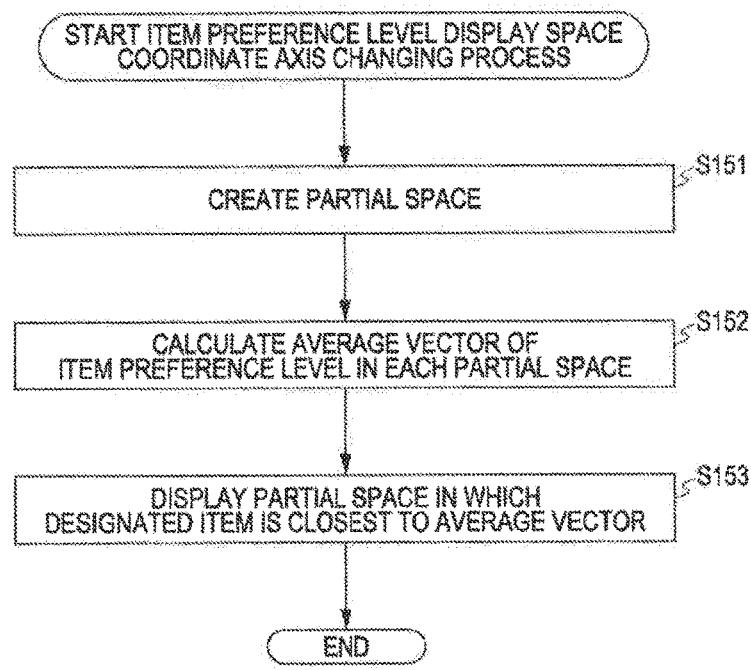
FIG. 26 is a flowchart illustrating an item preference level display space display coordinate axis converting process.

Next, a coordinate axis changing process displaying item preference level display space in an information processing apparatus in FIG. 25 will be described with reference to a flowchart in FIG. 26.

In step S151, the partial space creating unit 161 creates a plurality of partial spaces including preference information. For example, in the case where the number of preference information is 5 and two-dimensional partial spaces are created, the partial space creating unit 161 creates partial spaces of $_5C_2=10$.

In step S152, the average vector calculating unit 162 calculates an average vector of item preference levels in the respective partial spaces which are created by the partial space creating unit 161.

In step S153, the display control unit 163 displays, for example, a partial space in which the item designated by the user is closest to the average vector calculated by the average vector calculating unit 162 in the Euclid distance or the like. The item may be designated by the user. Alternatively, an item which is being currently viewed may be automatically selected.

According to the above described process, the specific item may be displayed to be the center of the space in the space where the item preference level is displayed.

In the above description, a configuration in which one specific item is displayed to be the center of the space is described, a specific item group may be displayed to be optimally clustered.

[Configuration Example of Information Processing Apparatus which Clusters Specific Item Group]

Hereinafter, a configuration example of the information processing apparatus which clusters a specific item group will be described with reference to FIG. 27.

Figure 27:
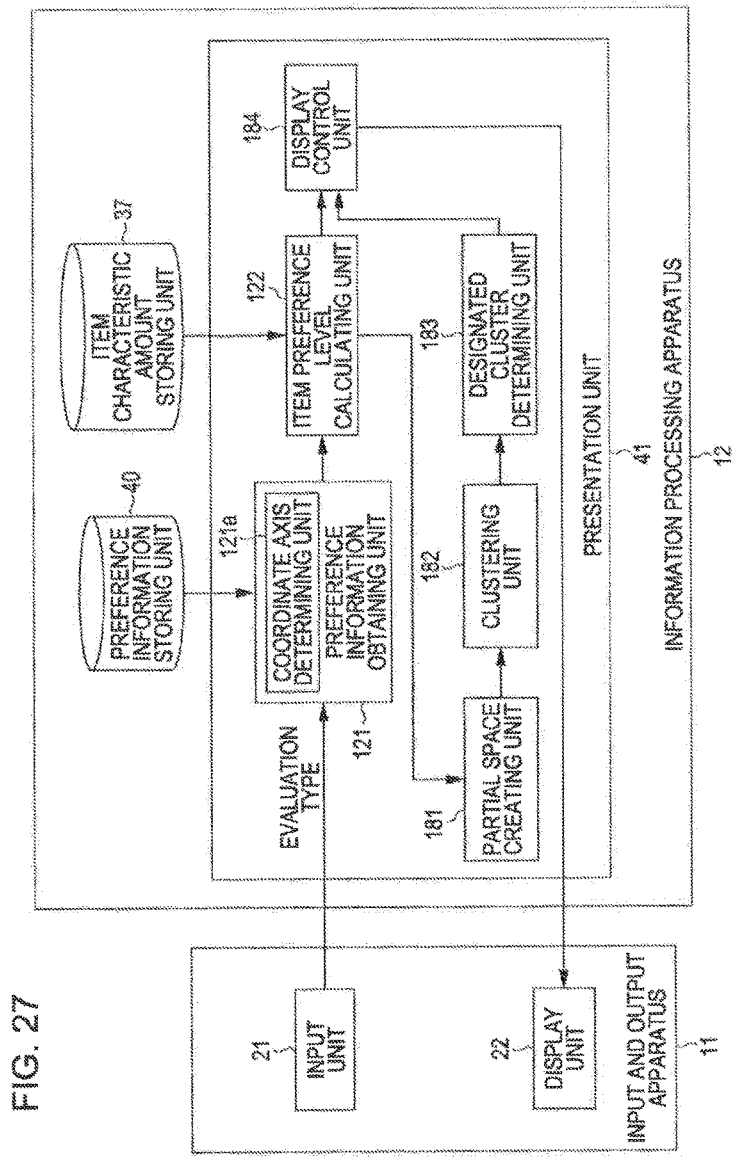
FIG. 27 is a block diagram illustrating a configuration example of an information processing apparatus.

The information processing apparatus 12 in FIG. 27 basically has the same function as the information processing apparatus 12 in FIG. 1. In FIG. 27, the components other than the item characteristic amount storing unit 37, the preference information storing unit 40 and the presentation unit 41 are not described.

In the presentation unit 41 in FIG. 27, the same names and references are used with respect to the components having the same functions as those provided in the presentation unit 41 in FIG. 17, and description thereof will be omitted as necessary.

That is, in the presentation unit 41 in FIG. 27, a difference with respect to the presentation unit 41 in FIG. 17 is that a partial space creating unit 181, a clustering unit 182 and a designated cluster determining unit 183 are newly installed and a display control unit 184 is installed instead of the display control unit 123.

The partial space creating unit 181 creates a plurality of partial spaces including preference information (space including several pieces of preference information from among all the preference information).

The clustering unit 182 clusters the item preference levels in the respective partial spaces which are created by the partial space creating unit 181.

The designated cluster determining unit 183 determines a cluster to which a designated item group belongs in each partial space.

The display control unit 184 displays a partial space corresponding to a cluster in which the designated item group is most included, in addition to the function that is provided with the display control unit 123 in FIG. 17.

[Coordinate Axis Changing Process Displaying Item Preference Level Display Space in Information Processing Apparatus]

Figure 28:
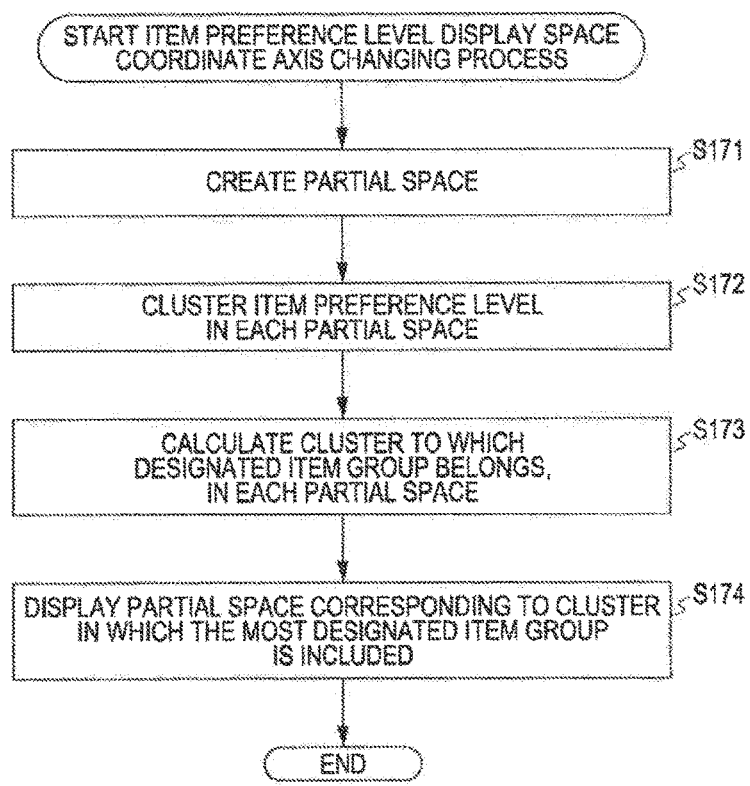
FIG. 28 is a flowchart illustrating an item preference level display space display coordinate axis converting process.

Next, a coordinate axis changing process displaying an item preference level display space in an information processing apparatus in FIG. 27 will be described with reference to a flowchart in FIG. 28.

In step S171, the partial space creating unit 181 creates a plurality of partial spaces including the preference information. For example, in the case where the preference information is five and two-dimensional partial spaces are created, the partial space creating unit 181 creates partial spaces of $_5C_2=10$.

In step S172, the clustering unit 182 clusters the item preference levels using the k-means clustering or the like, in the respective partial spaces which are created by the partial space creating unit 181.

In step S173, the designated cluster determining unit 183 determines, for example, a cluster to which the item group designated by the user belongs in each partial space. At this time, a maximum value of the designated item group which is included in the same cluster is set to a sufficiency level. The item group may be designated by the user. Alternatively, an item having strong relevancy to the item which is being currently viewed may be automatically selected.

In step S174, the display control unit 184 displays the partial space corresponding to the cluster in which the designated item group is most included. That is, the partial space having the largest sufficiency level is displayed. It may be considered that the partial space having the largest sufficiency level optimally displays clustering of the designated item group.

According to the above described process, the specific item group may be displayed to be optimally clustered in the space where the item preference level is displayed.

In the above description, the configuration in which the item preference level is displayed in the space on the basis of the preference information of the present user is described. However, the item preference level may be displayed in the space on the basis of the other users' preference information. At this time by selecting similar users as the other users, a new insight regarding the evaluation of the item can be expected.

Further, in the above description, the tendency of the preferences for the items is displayed on the basis of the preference information, but relevancy between preferences for the plurality of items may be displayed on the basis of the link information.

[Configuration Example of Information Processing Apparatus which Displays Relevancy Between Preferences for Plurality of Items]

A configuration example of an information processing apparatus which displays relevancy between preferences for a plurality of items will be described with reference to FIG. 29.

Figure 29:
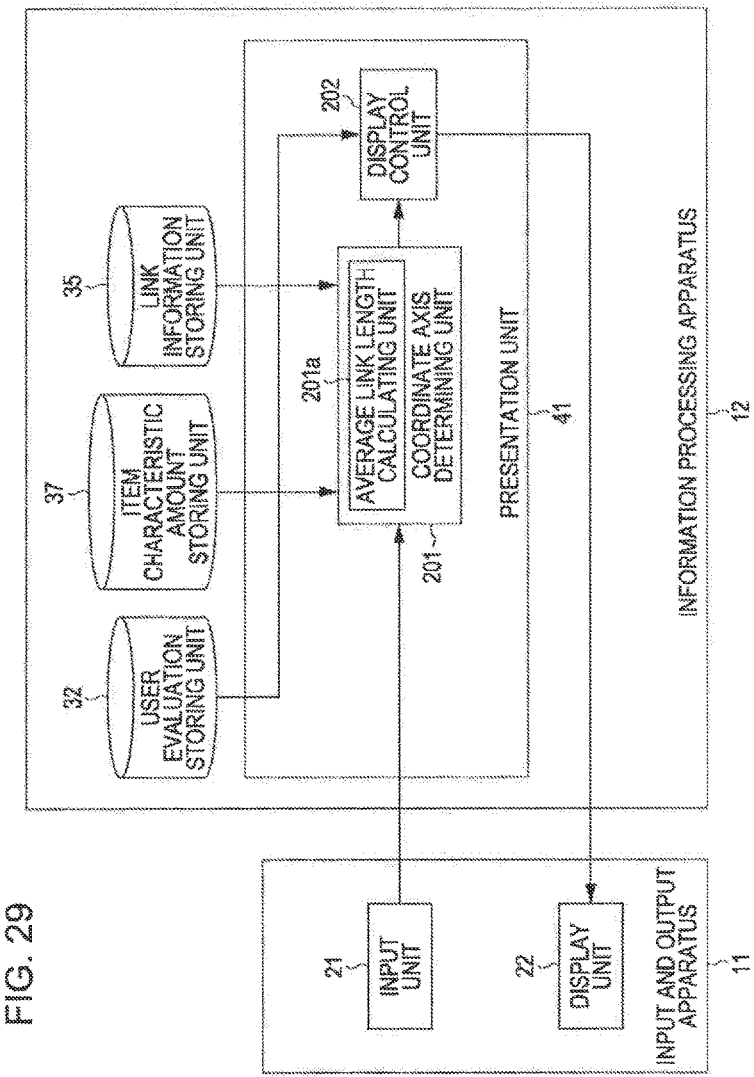
FIG. 29 is a block diagram illustrating a configuration example of an information processing apparatus.

The information processing apparatus 12 in FIG. 29 basically has the same function as the information processing apparatus 12 in FIG. 1. In FIG. 29, the components other than the user evaluation storing unit 32, the link information storing unit 35, the item characteristic amount storing unit 37 and the presentation unit 41 are not illustrated.

In the information processing apparatus 12 in FIG. 29, the presentation unit 41 includes a coordinate axis determining unit 201 and a display control unit 202.

The coordinate axis determining unit 201 determines coordinate axes for defining a space in which an item is displayed, on the basis of an instruction for determining the coordinate axes which is input through the input unit 21 by the user, and then supplies the determined coordinate axes to the display control unit 202 as the space definition information.

Further, the coordinate axis determining unit 201 includes an average link length calculating unit 201a. The average link length calculating unit 201a calculates, on the basis of the link information which is recorded in the link information storing unit 35, and the item characteristic amounts which are recorded in the item characteristic amount storing unit 37, an average (average link length) of distances between item characteristic amounts of the items corresponding to the link information for every characteristic amount type.

The display control unit 202 displays the item characteristic amounts of the corresponding items in the link information in the space (two-dimensional plane).

[Link Information Display Process of Information Processing Apparatus]

Figure 30:
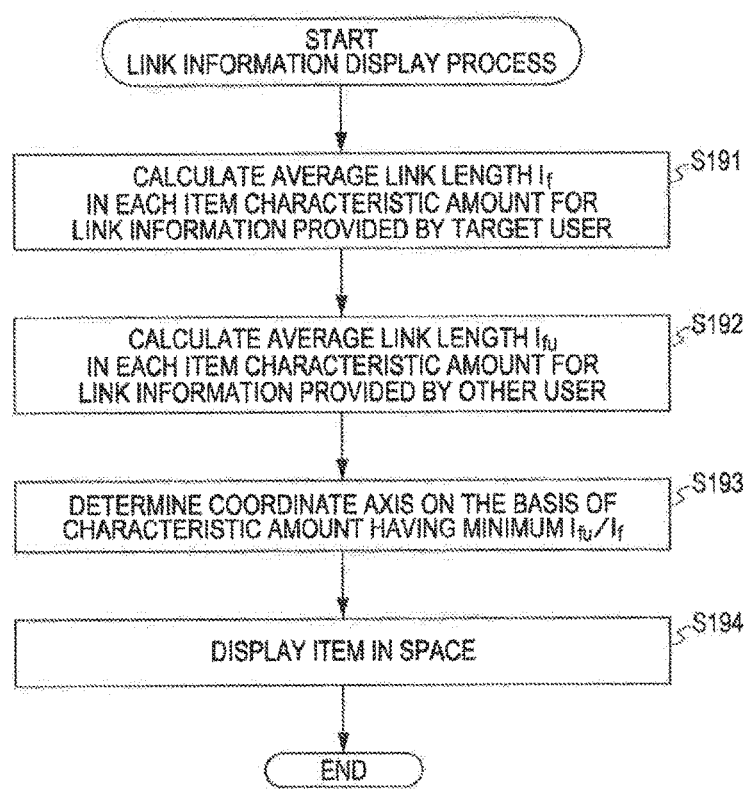
FIG. 30 is a flowchart illustrating a link information display process.

Next, a link information display process in an information processing apparatus in FIG. 29 will be described with reference to a flowchart in FIG. 30.

In step S191, the average link length calculating unit 201a, if an instruction for determining the coordinate axes input from the input unit 21, calculates an average link length (hereinafter, referred to as user average link length $l_f$) in the respective item characteristic amounts, with respect to the link information given by the user of the input and output apparatus 11. For example, the average link length calculating unit 201a calculates distances between the item characteristic amounts based on the music characteristic amounts 1 and 2 in the corresponding item characteristic amounts (FIG. 7), with respect to the link information (FIG. 5) which corresponds to the song A and the song B, given by the user 1. The average link length calculating unit 201a also calculates the distances between the item characteristic amounts with respect to the other item (song) corresponding to the link information and sets the average thereof as the average link length.

In step S192, the average link length calculating unit 201a calculates an average link length (hereinafter, referred to as other user average link length $l_{fu}$) in the respective item characteristic amounts by performing the same process as the step S191 with respect to the link information given by other users who are different from the user of the input and output apparatus 11.

In step S193, the coordinate axis determining unit 201 selects two characteristic amounts (characteristic amount types) in which the user average link length $l_f$ becomes a relatively large value and the other user average link length $l_{fu}$ becomes a relatively small value and determines them as coordinate axes, determines the selected characteristic amounts as the coordinate axes, and then supplies the determined coordinate axes as the space definition information. More specifically, the coordinate axis determining unit 201 selects the characteristic amounts in which $l_{fu}/l_f$ becomes a minimum as the coordinate axes.

Figure 31:
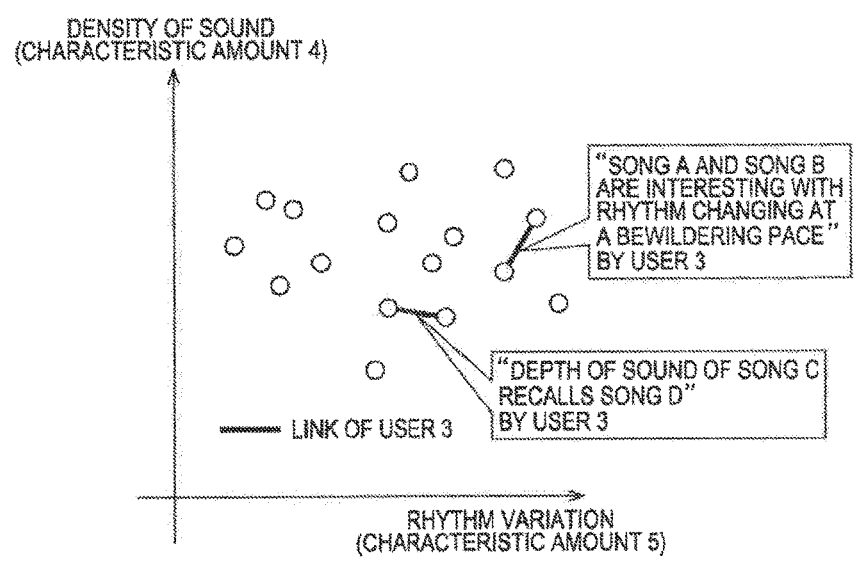
FIG. 31 is a diagram illustrating an example of space display of an item.

In step S194, the display control unit 202 displays the items in the space (two-dimensional plane) where the characteristic amounts selected by the coordinate axis determining unit 201 are the coordinate axes, as shown in FIG. 31, on the basis of the space definition information from the coordinate axis determining unit 201.

In FIG. 31, the corresponding (link-extended) items by the other users are displayed in the two-dimensional plane. The two-dimensional plane in FIG. 31 is configured so that the transverse axis is a rhythm variation (characteristic amount 5) and the longitudinal axis is the density of the sound (characteristic amount 4). Further, there are two pairs of items link-extended by the user 3 in the two-dimensional plane in FIG. 31. In the figure, the pair in the right side is relatively close to the rhythm variation (transverse axis), and is given a user evaluation "song A and song B are interesting with rhythm changing at a bewildering pace" by the user 3. The user evaluation is appropriately read from the user evaluation storing unit 32 by the display control unit 202. In addition, in the figure, the pair in the left side is relatively close to the density of the sound (longitudinal axis) and is given a user evaluation "depth of sound of song C recalls song D" by the user 3.

According to the above described process, the corresponding items in the link information can be displayed in the space. Accordingly, the present user can recognize other users evaluations for the items to which the present user thought had no relevancy to himself or herself, and can obtain a new insight.

In the above description, the corresponding items in the link information are displayed in the space. However, for example, inter-item network structures, which are link-extended with respect to the items which are given the same evaluation types, may be displayed in the two-dimensional space according to the Spring Model as disclosed in Sugiyama, K., Misue, K., "graph Drawing by the Magnetic-Spring model", Journal of Visual Languages and computing, 6(3), pp. 217-231, 1995, with the link information.

3. Third Embodiment

In the above description, the example of the space display (visualization) of the items is described. However, hereinafter, an example of the space display (visualization) of the user will be described with reference to FIGS. 32 to 42. That is, the number of dimensions of the space in which the user is displayed is arbitrary, but the two-dimensional space is exemplified hereinafter.

[Configuration Example of Information Processing Apparatus which Space-Displays Users]

Firstly, a configuration example of an information processing apparatus which space-displays the user will be described with reference to FIG. 32.

Figure 32:
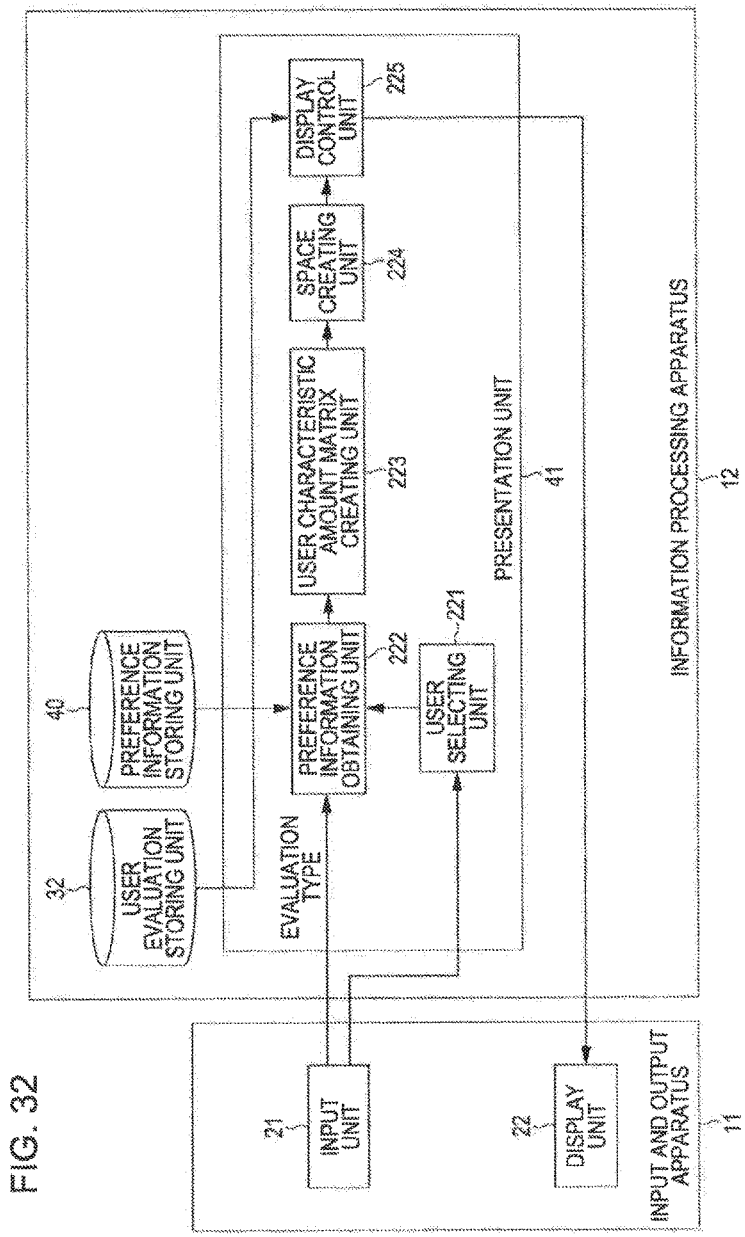
FIG. 32 is a block diagram illustrating a configuration example of an information processing apparatus.

The information processing apparatus 12 in FIG. 32 basically has the same function as the information processing apparatus 12 in FIG. 1. In FIG. 32, the components other than a user evaluation storing unit 32, a preference information storing unit 40 and a presentation unit 41 are not described.

In the information processing apparatus 12 in FIG. 32, the presentation unit 41 includes a user selecting unit 221, a preference information obtaining unit 222, a user characteristic amount matrix creating unit 223, a space creating unit 224 and a display control unit 225.

The user selecting unit 221 selects a user group to be space-displayed on the basis of an instruction for selecting users (user group) to be space-displayed, which is input through the input unit 21 by the user, and supplies information indicating the user group to the preference information obtaining unit 222.

The preference information obtaining unit 222 obtains from the preference information storing unit 40, on the basis of an instruction for obtaining the preference information corresponding to predetermined evaluation types, which is input through the input unit 21 by the user, the preference information of the user indicated by the information from the user selecting unit 221 corresponding to the evaluation types. The preference information obtaining unit 222 supplies the obtained preference information to the user-characteristic amount matrix creating unit 223.

The user-characteristic amount matrix creating unit 223 creates a user-characteristic amount matrix on the basis of the preference information from the preference information obtaining unit 222 and supplies the user-characteristic amount matrix to the space creating unit 224.

The space creating unit 224 compresses the user-characteristic amount matrix from the user-characteristic amount matrix creating unit 223 to create the space.

The display control unit 225 displays the user in the space which is created by the space creating unit 224.

[User Space Display Process of Information Processing Apparatus]

Figure 33:
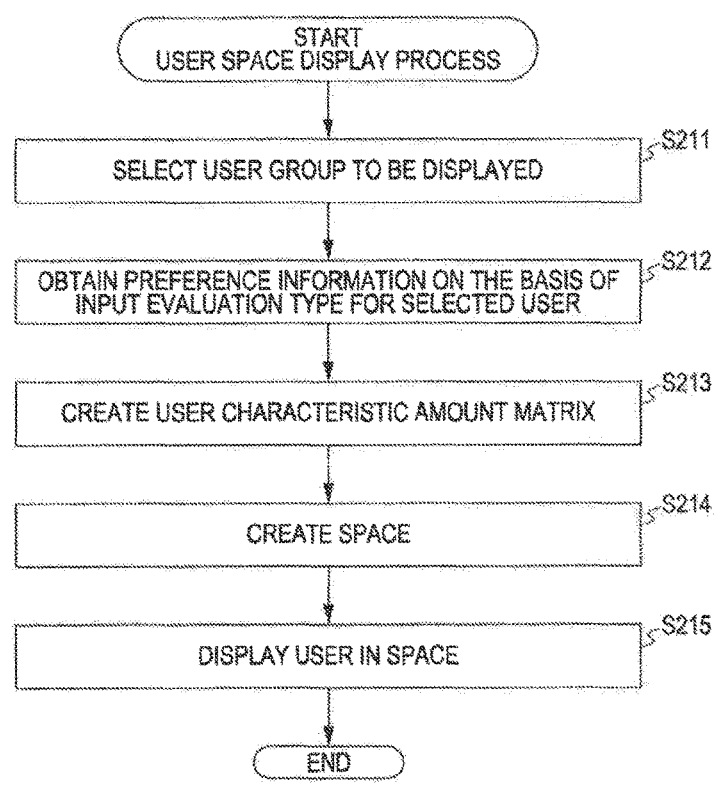
FIG. 33 is a flowchart illustrating a user space display process.

Next, a user space display process in an information processing apparatus in FIG. 32 will be described with reference to a flowchart in FIG. 33.

In step S211, the user selecting unit 221 selects the user group who space-displays on the basis of an instruction for selecting users (user group) to be space-displayed, which is input through the input unit 21 by the user, and supplies information indicating the user group to the preference information obtaining unit 222. The selected user group (class) is set to U.

In step S212, the preference information obtaining unit 222 obtains corresponding preference information from the preference information storing unit 40, on the basis of an evaluation types L which are input through the input unit 21 by the user, with respect to each user of the user class U which is selected by the user selecting unit 221. In step S211, in the case where no user is selected, the preference information with respect to all users corresponding to the input evaluation type L may be obtained. That is, the obtained preference information is, for example, a transformation vector of the FDA, and the transformation vector for a user u (u∈U) is set as $t_u$. The preference information obtaining unit 222 supplies the obtained preference information (transformation vector $t_u$) to the user-characteristic amount matrix creating unit 223.

In step S213, the user-characteristic amount matrix creating unit 223 creates a user-characteristic amount matrix by arranging the transformation vectors $t_u$ from the preference information obtaining unit 222 in rows and lining up the rows with respect to each user u of the user class U, and then supplies the created user-characteristic amount matrix to the space creating unit 224.

In step S214, the space creating unit 224 creates a two-dimensional space by compressing the user-characteristic amount matrix from the user-characteristic amount matrix creating unit 223, for example, using the PCA (Principal Component Analysis).

Figure 34:
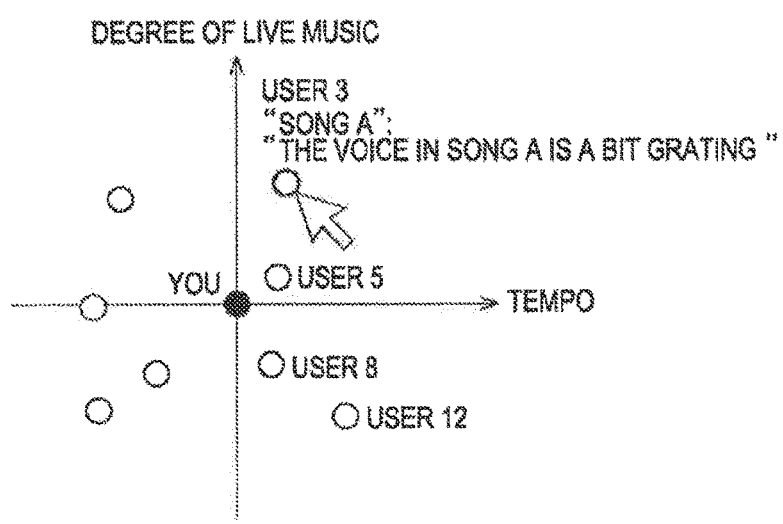
FIG. 34 is a diagram illustrating an example of space display of a user.

In step S215, the display control unit 225 display the user in the two-dimensional space which is created by the space creating unit 224 as shown in FIG. 34.

In FIG. 34, each user indicated by circles is arranged and displayed in the two-dimensional plane. In an original point (intersection of the transverse axis and the longitudinal axis), "you" who is the present user is displayed, and a user 3, a user 5, a user 8, a user 12 and the like who are other users are displayed. In FIG. 34, by arranging the present user in the original point, distances with respect to the other users can be easily recognized, but the present user is not necessarily arranged in the original point, and may be appropriately rotated or shifted in parallel. In addition, by putting a pointer of a mouse in the circle indicating the user 3 on the display unit 22, a name of an item (song A) to which the input evaluation type is added or a corresponding user evaluation ("The voice in song A is a bit grating") may be displayed. Further, two characteristic amounts having large component values of characteristic vectors which are generated by the principal component analysis may be names of axes corresponding to the characteristic vectors. For example, in FIG. 34, the name of the transverse axis is "tempo" the characteristic amount and the name of the longitudinal axis is "level of live music" as the characteristic amount.

According to the above described process, since the users can be displayed (visualization) on the basis of the preference information with respect to a predetermined evaluation types, a different point compared with the other users evaluations can be recognized even in the case of the same evaluation type.

[Another Configuration Example of Information Processing Apparatus which Space-Displays Users]

Next, an another configuration example of an information processing apparatus which space-displays users will be described with reference to FIG. 35.

Figure 35:
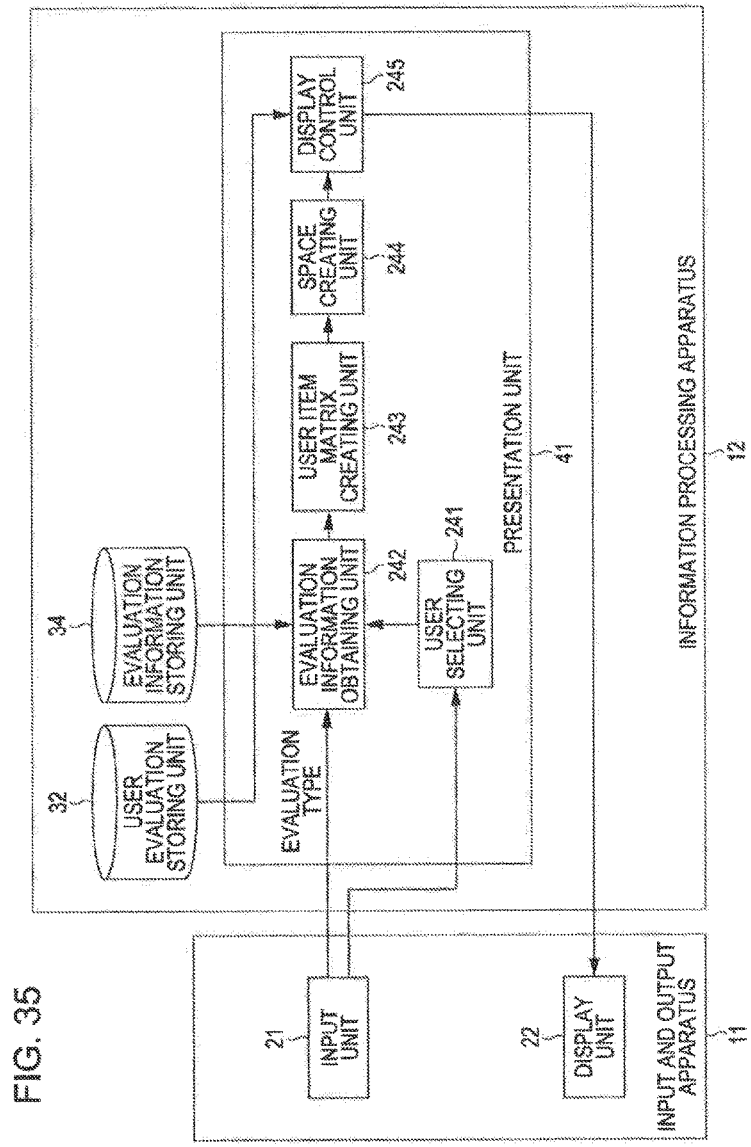
FIG. 35 is a block diagram illustrating a configuration example of an information processing apparatus.

The information processing apparatus 12 in FIG. 35 basically has the same function as the information processing apparatus 12 in FIG. 1. In FIG. 35, the components other than the user evaluation storing unit 32, the evaluation information storing unit 34 and the presentation unit 41 are not described.

In the information processing apparatus 12 in FIG. 35, the presentation unit 41 includes a user selecting unit 241, an evaluation information obtaining unit 242, a user item matrix creating unit 243, a space creating unit 244 and a display control unit 245.

Since the user selecting unit 241 in FIG. 35 has the same function as the user selecting unit 221 in FIG. 32, description thereof is omitted.

The evaluation information obtaining unit 242 obtains from the evaluation information storing unit 34, on the basis of an instruction for selecting the evaluation information corresponding to predetermined evaluation types, which is input through the input unit 21 by the user, the user evaluation information indicated by information from the user selecting unit 221 corresponding to the evaluation type. The evaluation information obtaining unit 242 supplies the obtained evaluation information to the user item matrix creating unit 243.

The user item matrix creating unit 243 creates a user-item matrix, on the basis of the evaluation information for every user from the evaluation information obtaining unit 242, and then the created user-item matrix to the space creating unit 244.

The space creating unit 244 compresses the user-item matrix from the user item matrix creating unit 243 to create the space.

The display control unit 245 displays the users in the space which is created by the space creating unit 244.

[User Space Display Process of Information Processing Apparatus]

Figure 36:
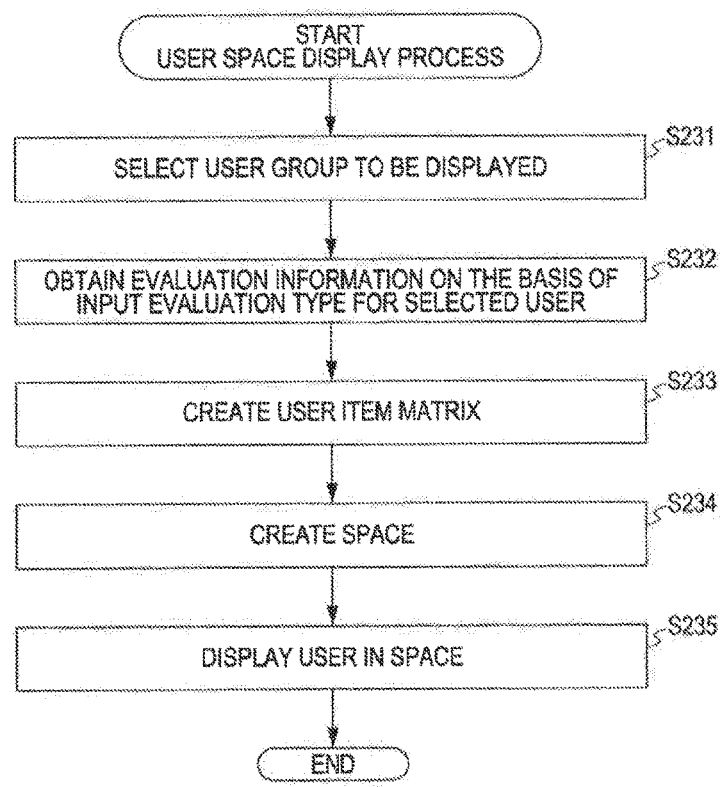
FIG. 36 is a flowchart illustrating a user space display process.

Next, a user space display process in an information processing apparatus in FIG. 33 will be described with reference to a flowchart in FIG. 36.

In step S231, the user selecting unit 241 selects, on the basis of an instruction for selecting users (user group) to be space-displayed, which is input through the input unit by the user, the user group to be space-displayed, and then supplies information indicating the user group to the evaluation information obtaining unit 242. The selected user group (class) is set to U.

In step S232, the evaluation information obtaining unit 242 obtains, on the basis of the evaluation types L which are input through the input unit 21 by the user, for each user of the user class U selected by the user selecting unit 241, corresponding evaluation information from the evaluation information storing unit 34. In step S231, in the case where no user is selected, the evaluation information with respect to all users corresponding to the input evaluation types L may be obtained. Here, the obtained each user's evaluation information is a vector where the number of the items is the number of dimensions and the intensity is the component value, and an item vector for the user u (u∈U) is set to $r_u$. The preference information obtaining unit 242 supplies the obtained evaluation information (item vector $r_u$) to the user item matrix creating unit 243.

In step S233, the user item matrix creating unit 243 creates the user-item matrix by arranging the item vectors $r_u$ from the evaluation information obtaining unit 242 in rows and lining up the rows for each user u of the user class U, and then supplies the created matrix to the space creating unit 244.

In step S234, the space creating unit 244 compresses the user-item matrix from the user-item matrix creating unit 243, for example, using the Latent Semantic Analysis (LSA) disclosed in S. C. Deerwester, S. T. Dumais, T. K. Landauer, G. W. Furnas, and R. A. Harshman, "Indexing by latent semantic analysis" Journal of the American Society of Information Science, 41 (6):391-407, 1990, to create the two-dimensional space.

In step S235, the display control unit 245 displays the user in the two-dimensional space which is created by the space creating unit 244.

According to the above described process, the users can be displayed (visualized) in the space on the basis of the evaluation information with respect to the predetermined evaluation types.

[Still Another Configuration Example of Information Processing Apparatus which Space-Displays Users]

Next, a still another configuration example of an information processing apparatus which space-displays users will be described with reference to FIG. 37.

Figure 37:
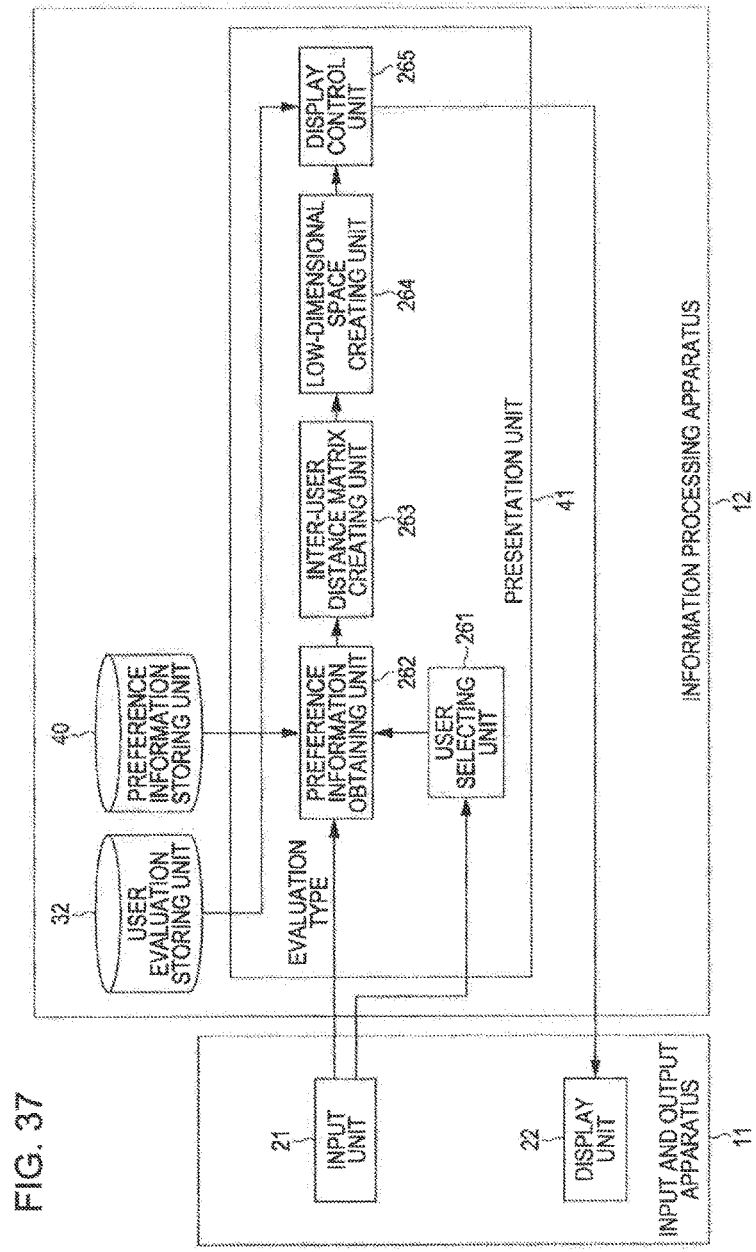
FIG. 37 is a block diagram illustrating a configuration example of an information processing apparatus.

The information processing apparatus 12 in FIG. 37 basically has the same function as the information processing apparatus 12 in FIG. 1. In FIG. 37, the components other than the user evaluation storing unit 32, the preference information storing unit 40 and the presentation unit 41 are not described.

In the information processing apparatus 12 in FIG. 37, the presentation unit 41 includes a user selecting unit 261, a preference information obtaining unit 262, an inter-User distance matrix creating unit 263, a low-dimensional space creating unit 264 and a display control unit 265.

Since the user selecting unit 261 and the preference information obtaining unit 262 in FIG. 37 have the same functions as the user selecting unit 221 and the preference information obtaining unit 222 in FIG. 32, respectively, description thereof is omitted.

The inter-user distance matrix creating unit 263 creates an inter-user distance matrix on the basis of the preference information of every user from the preference information obtaining unit 262 and then supplies the created inter-user distance matrix to the low-dimensional space creating unit 264.

The low-dimensional space creating unit 264 compresses the inter-user distance matrix from the inter-user distance matrix creating unit 263 to create a low-dimensional space.

The display control unit 265 displays the users in the space which is created by the low-dimensional space creating unit 264.

[User Space Display Process of Information Processing Apparatus]

Figure 38:
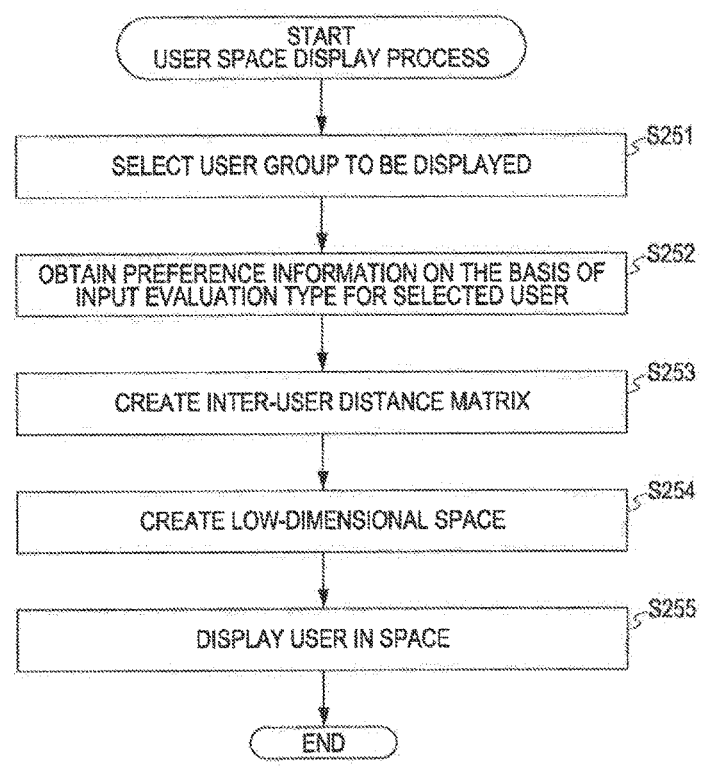
FIG. 38 is a flowchart illustrating a user space display process.

Next, a user space display process in an information processing apparatus in FIG. 37 will be described with reference to a flowchart in FIG. 38.

In step S251, the user selecting unit 261 selects a user group which space-displays on the basis of an instruction for selecting users (user group) who space-displays, which is input through the input unit 21 by the user, and then information indicating the user group to the preference information obtaining unit 262.

In step S252, the preference information obtaining unit 262 obtains corresponding preference information from the preference information storing unit 40, on the basis of an evaluation type which is input through the input unit 21 by the user, with respect to each user of the user group which is selected by the user selecting unit 261. In step S251, in the case where no user is selected, the preference information with respect to all users corresponding to the input evaluation type may be obtained. The preference information obtaining unit 262 supplies the obtained preference information to the inter-user distance matrix creating unit 263. Herein, the evaluation type which is input by the user may be one or plural.

In step S253, the inter-user distance matrix creating unit 263 calculates distances between the preference information from the preference information obtaining unit 262, with respect to all combinations of the user group to create the inter-user distance matrix, and then supplies the created the inter-user distance matrix to the low-dimensional space creating unit 264.

In step S254, the low-dimensional space creating unit 264 creates the two-dimensional space in which the low-dimensional vector (two-dimensional vector) indicating each user is arranged, for example, using the multi dimensional scaling (MDS), on the basis of the inter-user distance matrix from the inter-user distance matrix creating unit 263.

In step S255, the display control unit 265 displays each user (two-dimensional vector indicating each user) in the two-dimensional space which is created by the low-dimensional space creating unit 264.

According to the above described process, the users can be displayed (visualized) in the space on the basis of the evaluation information with respect to the plurality of evaluation types.

[Still Another Configuration Example of Information Processing Apparatus which Space-Displays Users]

Next, a still another configuration of the information processing apparatus which space-displays users will be described with reference to FIG. 39.

Figure 39:
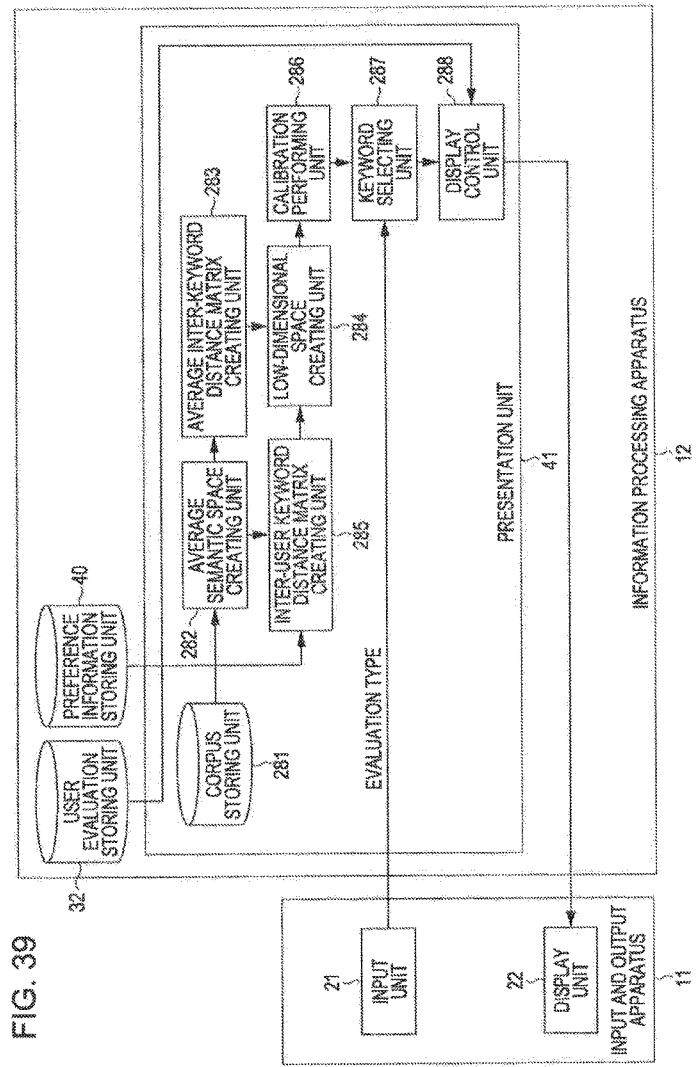
FIG. 39 is a block diagram illustrating a configuration example of an information processing apparatus.

The information processing apparatus 12 in FIG. 39 basically has the same function as the information processing apparatus 12 in FIG. 1. In FIG. 39, the components other than the user evaluation storing unit 32, the preference information storing unit 40 and the presentation unit 41 are not described.

In the information processing apparatus 12 in FIG. 39, the presentation unit 41 includes a corpus storing unit 281, an average semantic space creating unit 282, an average inter-keyword distance matrix creating unit 283, a low-dimensional space creating unit 284, an inter-user keyword distance matrix creating unit 285, a calibration performing unit 286, a keyword selecting unit 287 and a display control, unit 288.

The corpus storing unit 281 records huge text data (corpus) including sentences of computerized natural languages.

The average semantic space creating unit 282 creates an average semantic space by obtaining arrangement (vector) in a predetermined semantic space, of a predetermined word (keyword) which is a general word as identification information which corresponds to an evaluation type in the predetermined semantic space, using corpus recorded by the corpus storing unit 281. Hereinafter, the identification information is described as the word, but is not limited thereto. For example, the identification information may be information which is able to discriminate each other, such as a variety of icons or the like indicating a smiling face, crying face or the like, which are provided to contents when the user evaluates the contents. In this case, the average semantic space creating unit 232 creates the average semantic space by obtaining arrangement in the space, of meta-information on predetermined icons recorded in a predetermined database. Further, the average semantic space creating unit 282 may create the average semantic space by dimension-compressing a content-icon matrix based on frequency at which one or more users provided icons for the contents to obtain arrangement in the space of the icons.

The average inter-keyword distance matrix creating unit 283 calculates an inter-keyword distance in the average semantic space which is created by the average semantic space creating unit 282 to create the average inter-keyword distance matrix, and then supplies the created average inter-keyword distance matrix to the low-dimensional space creating unit 284.

The low-dimensional space creating unit 284 compresses the average inter-keyword distance matrix from the average inter-keyword distance matrix creating unit 283 and the inter-user distance matrix from the inter-user keyword distance matrix creating unit 285, to create the low-dimensional space for each matrix.

The inter-user keyword distance matrix creating unit 285 calculates inter-keyword distances from a view point of the user, on the basis of predetermined keywords used in the average semantic space creating unit 282 and the preference information of every user for the keywords to create the inter-user keyword distance matrix. The inter-user keyword distance matrix creating unit 285 supplies the created inter-user keyword distance matrix to the low-dimensional space matrix creating unit 284.

The calibration performing unit 286 performs calibration for providing the low-dimensional space (average low-dimensional space) for the average inter-keyword distance matrix created by the low-dimensional space creating unit 284 and the low-dimensional space (user low-dimensional space) for the inter-user keyword distance matrix.

The keyword selecting unit 287 selects keywords on the basis of an instruction for selecting the keywords, which is input through the input unit 21 by the user, and then supplies the selected keywords to the display control unit 288.

The display control unit 288 displays users in a space (calibration space) which is obtained by calibrating the low-dimensional space for the keywords selected by the keyword selecting unit 287 by the calibration performing unit 286.

[User Space Display Process of Information Processing Apparatus]

Figure 40:
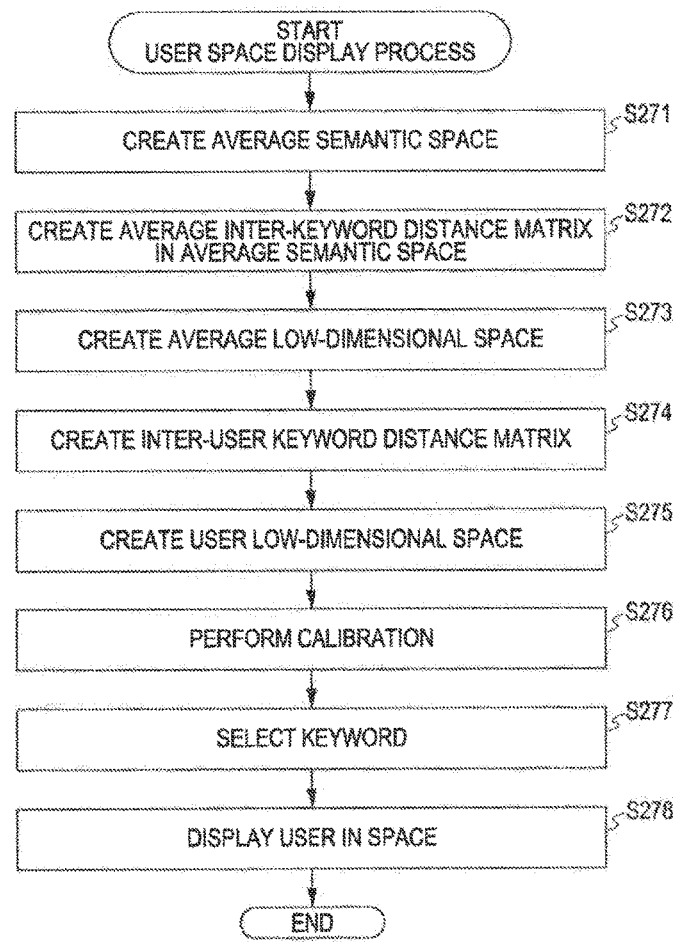
FIG. 40 is a flowchart illustrating a user space display process.

Next, a user space display process in an information processing apparatus in FIG. 3) will be described with reference to a flowchart in FIG. 40.

In step S271, the average semantic space creating unit 282 obtains arrangement (vector) in the semantic space, of the word (keyword) obtained by dimension-compressing a predetermined document-word matrix according to the LSA or the like in the low-dimensional manner using the corpus recorded by the corpus storing unit 281 to create the average semantic space.

In step S272, the average inter-keyword distance matrix creating unit 283 calculates inter-keyword distances (Euclid distance, Cos distance or the like) in the average semantic space created by the average semantic space creating unit 282 to create the average inter-keyword distance matrix and then supplies the created average inter-keyword distance matrix to the low-dimensional space creating unit 284.

In step S273, the low-dimensional space creating unit 284 creates an average low-dimensional space in which the low-dimensional vector indicating the respective keywords is arranged, for example, using the MOS on the basis of the average inter-keyword distance matrix from the average inter-keyword distance matrix creating unit 283 and then calculates a location in the average low-dimensional space of each keyword.

In step S274, the inter-user keyword distance matrix creating unit 285 calculates inter-keyword distances form a view point of the user, on the basis of predetermined keywords used in the average semantic space creating unit 282 and the preference information of each user for the keywords to create an inter-user keyword distance matrix. More specifically, the inter-user keyword distance matrix creating unit 285 creates the inter-user keyword distance matrix on the basis of a vector (the highest level vector of the FDA) in the characteristic amount space having a characteristic amount coefficient as a component, of the preference information with respect to the keywords. The inter-user keyword distance matrix creating unit 285 supplies the created inter-user keyword distance matrix to the low-dimensional space creating unit 284.

In step S275, the low-dimensional space creating unit 284 creates a user low-dimensional space in which the low-dimensional vector indicating each keyword from a view point of the user is arranged, for example, using the MDS, on the basis of the inter-user keyword distance matrix from the inter-user keyword distance matrix creating unit 285, and then calculates a location in the user low-dimensional space of each keyword.

In step S276, the calibration performing unit 286 performs calibration for providing the average low-dimensional space which is created by the average low-dimensional space creating unit 284 and the user low-dimensional space. More specifically, the calibration performing unit 286 calculates a rotation matrix for providing the average low-dimensional space and the user low-dimensional space. At this time, the calibration performing unit 286 selects one keyword (word, for example, general noun meaning of which is not changed by the user) used for calibration. The calibration performing unit 286 calculates, from the location in the average low-dimensional space (average low-dimensional space vector m) and the location in the user low-dimensional space (user low-dimensional space vector $s_u$), of the selected keyword, a rotation matrix $A_u$ in which $m - A_u S_u$ is a minimum. The calibration performing unit 286 supplies the calculated rotation matrix $A_u$ to the display control unit 288 through the keyword selecting unit 287.

In step S277, the keyword selecting unit 287 selects keywords on the basis of an instruction, for selecting keywords which is input through the input unit 21 by the user, and supplies the selected keyword to the display control unit 288. In the case where the keywords are not selected by the User, for example, a keyword having the largest dispersion in the user low-dimensional space may be automatically selected.

In step S278, the display control unit 288 displays users (two-dimensional vectors indicating users) in the calibration space obtained by calibrating the low-dimensional space (for example, two-dimensional space) for the keywords selected by the keyword selecting unit 287 on the basis of the rotation matrix from the calibration performing unit 286. At this time, vectors of the keywords in the average low-dimensional space may be arranged in the original point.

According to the above described process, the present user can recognize differences in feelings with respect to other users for the general languages (keywords).

[Still Another Configuration Example of Information Processing Apparatus Space-Displaying Users]

Next, a still another configuration example of the information processing apparatus which space-displays users will be described with reference to FIG. 41.

Figure 41:
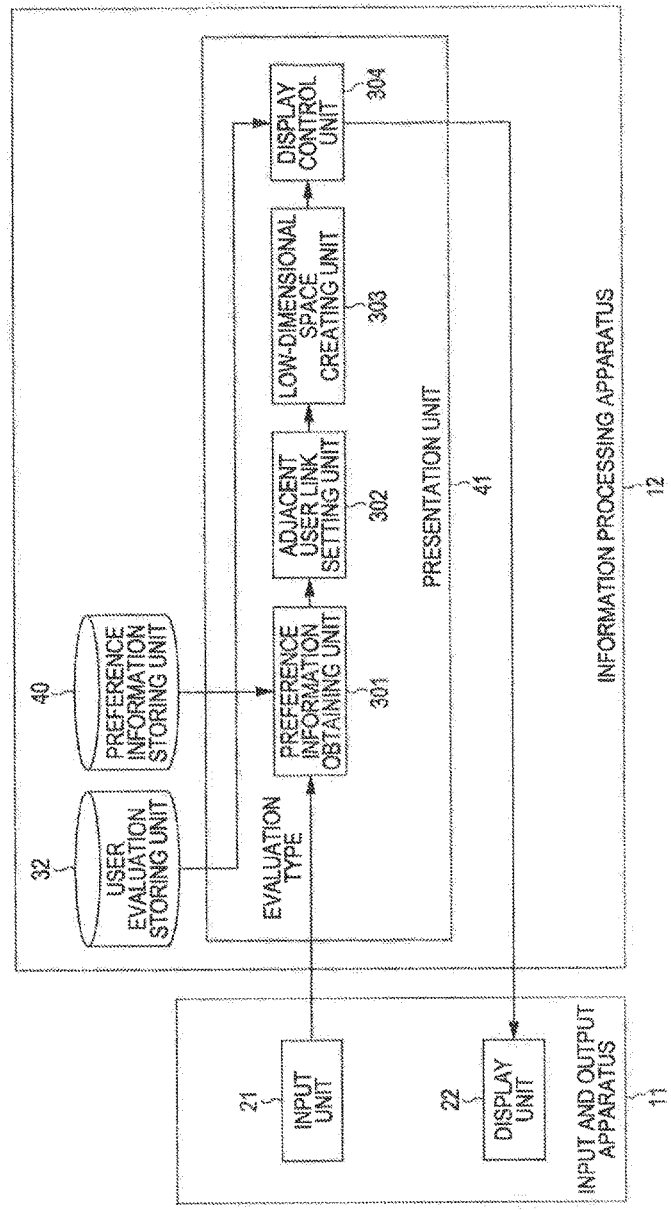
FIG. 41 is a block diagram illustrating a configuration example of an information processing apparatus.

The information processing apparatus 12 in FIG. 41 basically has the same function as the information processing apparatus 12 in FIG. 1. In FIG. 41, the components other than the user evaluation storing unit 32, the preference information storing unit 40 and the presentation unit 41 are not described.

In the information processing apparatus 12 in FIG. 41, the presentation unit 41 includes a preference information obtaining unit 301, a neighboring user link setting unit 302, a low-dimensional space creating unit 303 and a display control unit 304.

The preference information obtaining unit 301 obtains, on the basis of an instruction for selecting the preference information corresponding to predetermined evaluation types, which is input through the input unit 21 by the user, the preference information of every user according to the evaluation types from the preference information storing unit 40. The preference information obtaining unit 301 supplies the obtained preference information to the neighboring user link setting unit 302.

The neighboring user link setting unit 302 sets links for neighboring users on the basis of the preference information from the preference information obtaining unit 301.

The low-dimensional space creating unit 303 creates a low-dimensional space on the basis of the links set by the neighboring user link setting unit 302.

The display control unit 304 displays the users in the space created by the low-dimensional space creating unit 303.

[User Space Display Process of Information Processing Apparatus]

Figure 42:
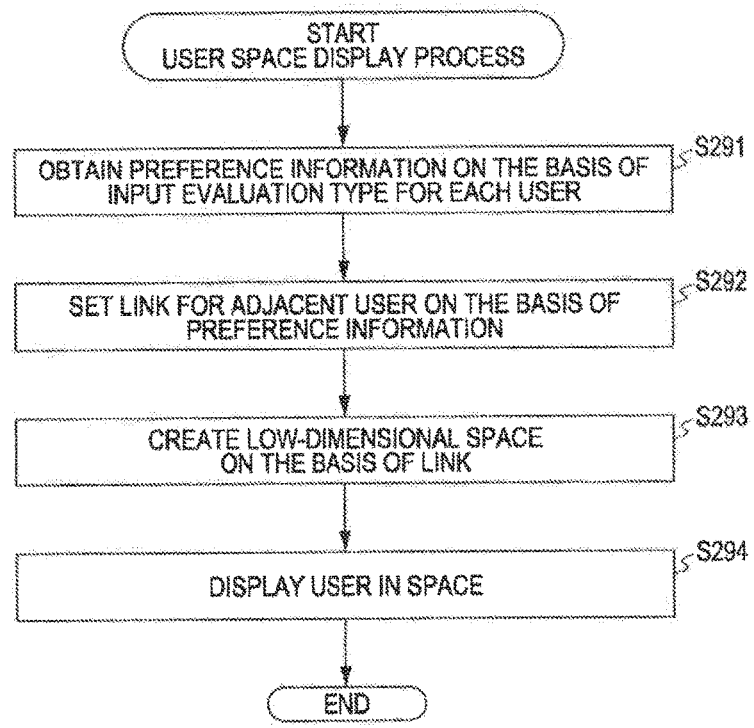
FIG. 42 is a flowchart illustrating a user space display process.

Next, a user space display process in the information processing apparatus in FIG. 41 will be described with reference to a flowchart in FIG. 42.

In step S291, the preference information obtaining unit 301 obtains, on the basis of an evaluation type which is input through the input unit 21 by the user for each user, the preference information according to the evaluation type from the preference information storing unit 40. The preference information obtaining unit 301 supplies the obtained preference information to the neighboring user link setting unit 302.

In step S292, the neighboring user link setting unit 302 calculates distances between preference information of the respective users from the preference information obtaining unit 301 and sets links for a k number of users of a higher level which are in a near distance, using the k-Nearest Neighbor Algorithm (k-NN).

In step S293, the low-dimensional space creating unit 303 creates the low-dimensional space by the spring model or, for example, Isomap disclosed in Tenenbaum J., et al., "A global geometric framework for nonlinear dimensionality reduction", Science, 290(5500):2319-2323, 2000, on the basis of the links set by the neighboring user link setting unit 302.

In step S294, the display control unit 304 displays the users in the space created by the low-dimensional space creating unit 303.

According to the above described process, the users in a near distance can be displayed in the space.

As described above, since the present user and the other users are displayed in the space (visualized) on the basis of the preference information or the like, details of preferences of the other users can be presented in an easily recognized manner. Accordingly, the user may intuitively recognize that the user is located in a certain location with respect to the other users and the other users who are similar to the user.

4. Other Modifications

Hereinbefore, a process based on preference information with respect to each user is described, but preference information for a user group including a plurality of users may be created.

[Configuration Example of Information Processing Apparatus which Creates Preference Information with Respect to User Group]

A configuration example of an information processing apparatus which creates preference information with respect to a user group including a plurality of users will be described with reference to FIG. 43.

Figure 43:
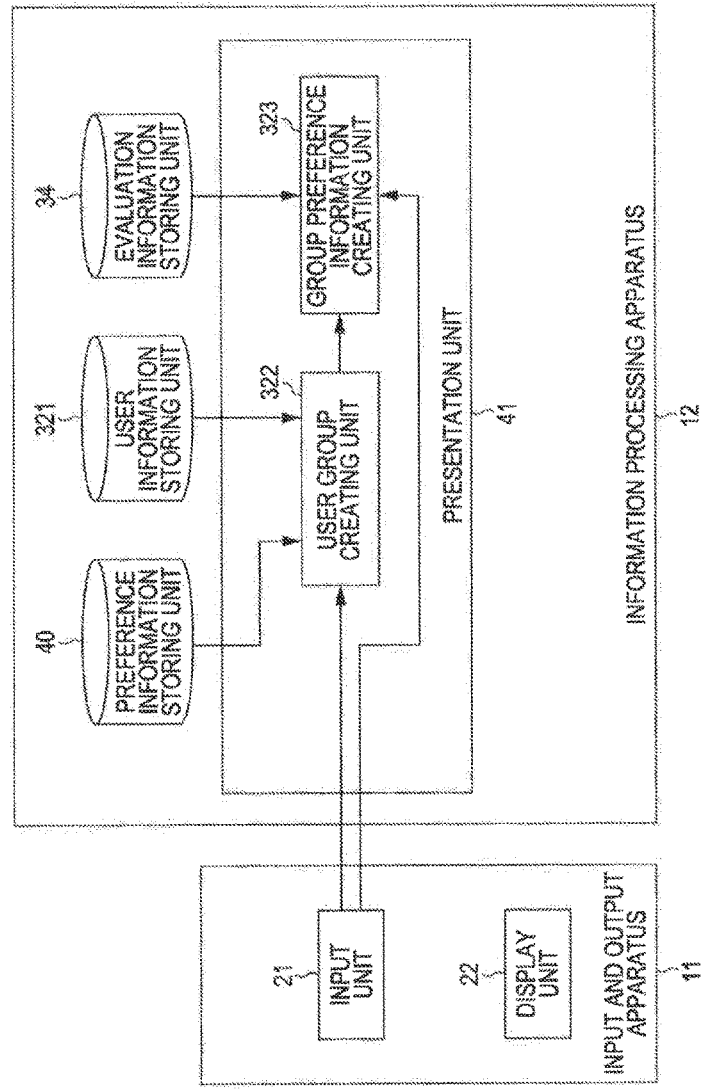
FIG. 43 is a block diagram illustrating a configuration example of an information processing apparatus.

The information processing apparatus 12 in FIG. 43 basically has the same function as the information processing apparatus 12 in FIG. 1. In FIG. 43, the components other than the evaluation information storing unit 34, the presentation unit 41 and a newly added user information storing unit 321 are not described.

The user information storing unit 321 records user information indicating an attribute of a user. The user information is supplied to the presentation unit 41 as necessary.

In the information processing apparatus 12 in FIG. 43, the presentation unit 41 includes a user group creating unit 322 and a user preference information creating unit 323.

The user group creating unit 322 reads user information from the user information storing unit 321, on the basis of an instruction for creating the user group which is input through the input unit 21 by the user, to create the user group. The user group creating unit 322 supplies the information indicating the user group to the group preference information creating unit 323.

The group preference information creating unit 323 creates group preference information which indicates the tendency of preferences of the user group for predetermined items on the basis of preference information of the users in the used group, on the basis of the information indicating the user group from the user group creating unit 322.

[Group Preference Information Creating Process of Information Processing Apparatus]

Figure 44:
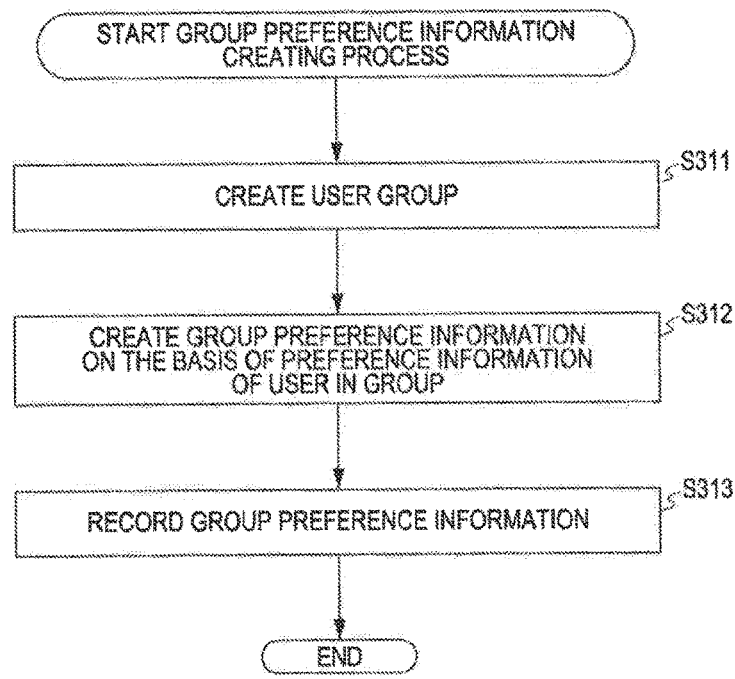
FIG. 44 is a flowchart illustrating a group preference information creating process.

Next, a group preference information creating process in the information processing apparatus in FIG. 43 will be described with reference to a flowchart in FIG. 44.

In step S311, the user group creating unit 322 reads user information as shown in FIG. 45 from the user information storing unit 321, on the basis of an instruction for creating the user group which is input through the input unit 21 by the user, to create the user group.

As shown in FIG. 45, the user information includes users (user names), user information types indicating attribute types of the users, and values of the user information types.

According to FIG. 45, gender of a user 1 is female; a residential district of the user 1 is Tokyo; and a current location of the user 1 is 35.623304° of north latitude and 139.733187° of east longitude. Further, a current location of a user 2 is 43.068261° of north latitude and 141.351428° of east longitude; a current location of a user 3 is 35.634279° of north latitude and 139.716718° of east longitude; a current location of a user 4 is 35.658691° of north latitude and 139.701719° of east longitude; and a current location of a user 5 is 43.768971° of north latitude and 142.482258° of east longitude.

For example, the user group creating unit 322 sets the latitude and the longitude in coordinate axes in a two-dimensional plane on the basis of a current location of the user, thereby grouping the users 1 to 5 into a user group including the users 1, 3 and 4, and a user group including the users 2 and 5.

Further, the grouping performed by the user group creating unit 322 is not limited to the user information, but clustering (grouping) may be performed according to distances between preference information of the users or contexts (location information, weather, sensing information on sweating and actions, or the like) of the users.

In step S312, the group preference information creating unit 323 creates group preference information on the basis of the evaluation information of the users in the user group, on the basis of the information indicating the user group. For example, the group preference information creating unit 323 reads the evaluation information with respect to each user in the user group and creates preference information (transformation vector) according to the FDA, and sets an average vector thereof to group preference information. Further, for example, the group preference information creating unit 323 considers a class of the evaluation information of all the users in the user group as one user's evaluation information, to create the preference information and to set the created preference information to the group preference information. At this time, in the case of such a conflicted state that three users evaluate "cool" (positive evaluation) and two users evaluate "not good" (negative evaluation) with respect to evaluation type for a certain item in evaluation information with respect to each user in the user group, "cool" is determined as one user's evaluation type by the majority. The larger difference in the user groups is, the larger a value of the intensity corresponding to the evaluation type may be.

In step S313, the group preference information creating unit 323 supplies the created group preference information to the preference information storing unit 40 to be recorded.

According to the above described process, since the preference information of each user group can be created, the tendency of preferences for items of each user group can be presented, and thus, specific evaluations for the items of other groups can be recognized.

For example, the item recommendation process as described with reference to the flowchart in FIG. 13 may be performed for the user group. In this case, for example, the presentation unit 41 calculates evaluation information of the users in the other groups and may present the evaluations for the items of the other groups as shown in FIG. 46.

In FIG. 46, a song A of an artist α is exemplified as one item recommended by the other groups; and evaluations are given by women living in Tokyo as a user group. In addition, among the users in the user group who are the women living in Tokyo, 46 people give positive evaluations, 21 people give negative evaluation, 12 people give "cool" evaluations, and 5 people give "feel good" evaluations.

Further, a song B of an artist β is exemplified as another item recommended by the other group; and evaluations are given by a user group who are listening to the song while playing sports. In addition, among the users in the user group who are listening to the song while playing sports, 83 people give positive evaluations, 11 people give negative evaluations, 43 people give "happy" evaluations, and 39 people give "lively" evaluations.

That is, the process for the user group is not limited to the item recommendation process, but the process may be performed in a manner similar to the process for each user as described above.

In the above description, a temporal change with respect to the user evaluations is not considered, but the process may be performed to correspond to time-varying user evaluations.

[Configuration Example of Information Processing Apparatus Corresponding to Time-Varying User Evaluations]

Herein, a configuration example of an information processing apparatus corresponding to user evaluations which are time-varying will be described with reference to FIG. 47.

Figure 47:
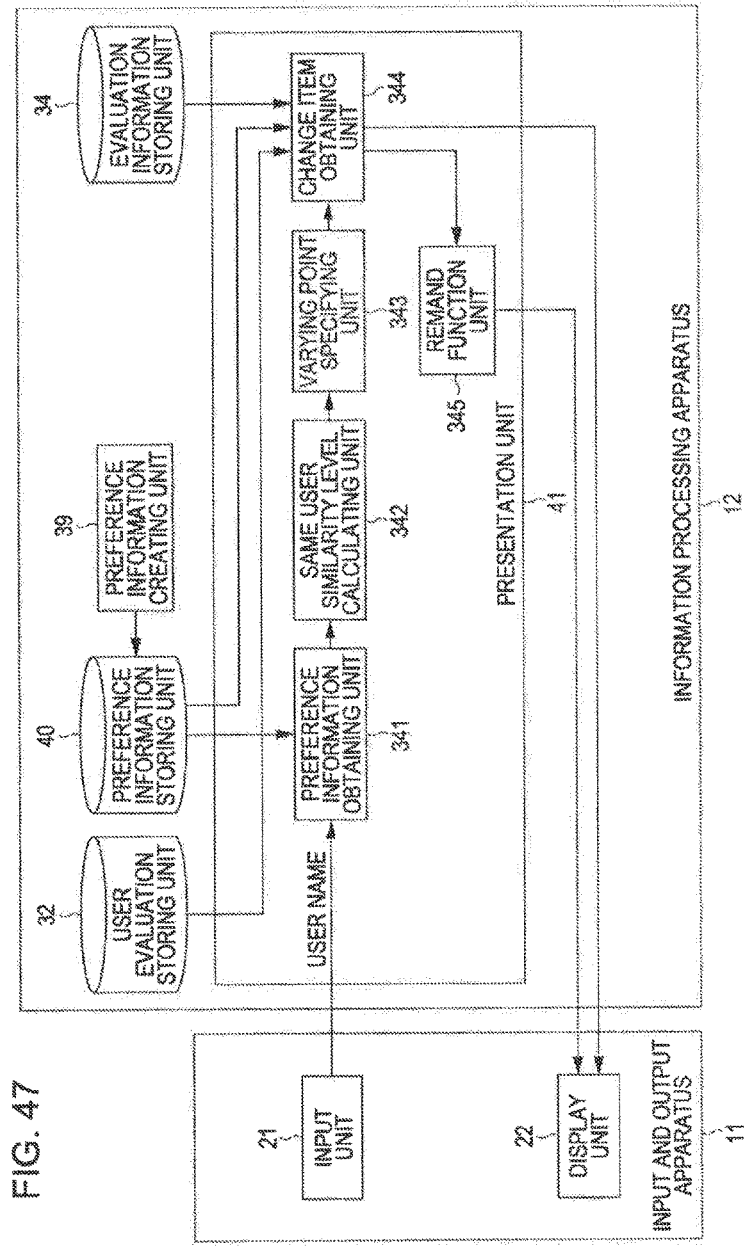
FIG. 47 is a block diagram illustrating a configuration of an information processing apparatus.

The information processing apparatus 12 in FIG. 47 basically has the same function as the information processing apparatus 12 in FIG. 1. In FIG. 47, the components other than the user evaluation storing unit 32, the evaluation information storing unit 34, the preference information creating unit 39, the preference information storing unit 40 and the presentation unit 41 are not described.

In the information processing apparatus 12 in FIG. 47, the preference information creating unit 39 provides time information indicating time to the preference information as described in FIG. 9, to thereby create the preference information corresponding to preferences of users who are time-varying.

Further, in the information processing apparatus 12 in FIG. 47, the presentation unit 41 includes a preference information obtaining unit 341, a same user similarity level calculating unit 342, a varying point specifying unit 343, a change item obtaining unit 344 and a remind function unit 345.

The preference information obtaining unit 341 obtains, on the basis of an instruction for selecting preference information corresponding to predetermined users, which is input through the input unit 21 by the user, the preference information including time information of the users from the preference information storing unit 40. The preference information obtaining unit 341 supplies the obtained preference information to the same user similarity level calculating unit 342.

The same user similarity level calculating unit 342, similar to the user similarity level calculating unit 82 in FIG. 12, calculates similarity level between the preference information at different times of the same user, on the basis of the preference information with respect to the same user from the preference information obtaining unit 341 and evaluation information corresponding thereto, and supplies the preference information including the similarity level to the similar user determining unit 83.

The varying point specifying unit 343 specifies a varying point (varying time) of the similarity level between the preference information on the basis of the preference information at the different times including the similarity level, from the same user similarity level calculating unit 342, and supplies time corresponding to the varying point to the change item obtaining unit 344.

The change item obtaining unit 344 obtains information about items corresponding to the varying point on the basis of the time corresponding to the varying point from the varying point specifying unit 343, and supplies the obtained information to the display unit 22 and the remind function unit 345.

The remind function unit 345 supplies, when a predetermined period elapses aster the information about the items is supplied from the change item obtaining unit 344 is supplied, the information about the items to the display unit 22.

[Varying Point Item Presentation Process of Information Processing Apparatus]

Figure 48:
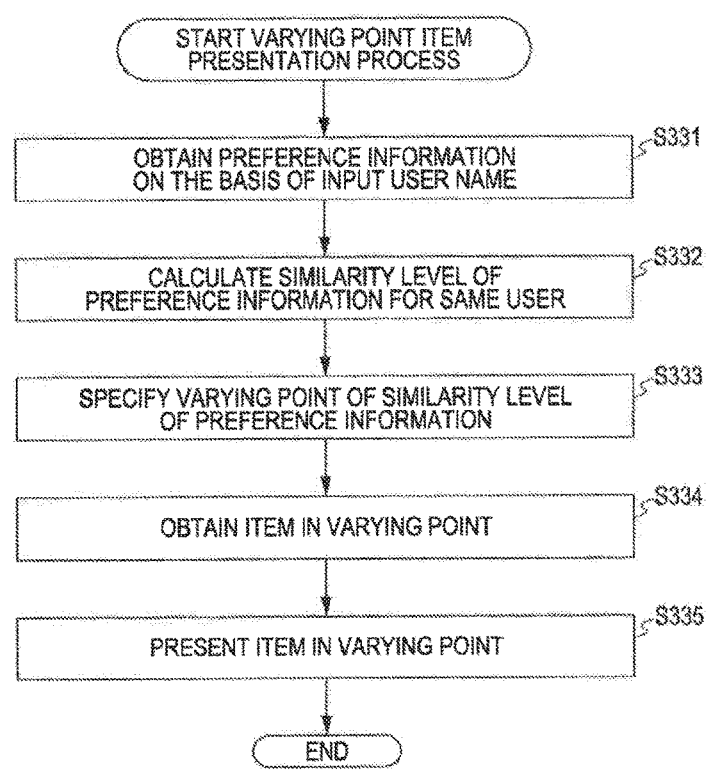
FIG. 48 is a flowchart illustrating a changing point item presentation process.

Next, a varying point item presentation process in the information processing apparatus in FIG. 47 will be described with reference to a flowchart in FIG. 48.

In step S331, the preference information obtaining unit 341 obtains, on the basis of an instruction for selecting preference information corresponding to predetermined users, which is input through the input unit 21 by the user, the preference information including time information of the users from the preference information storing unit 40. The preference information obtaining unit 341 supplies the obtained preference information to the same user similarity level calculating unit 342.

Hereinafter, the preference information to which the time information is added will be described with reference to FIG. 49.

The preference information shown in FIG. 49 is obtained by adding the time information indicating the time when the preference information is created to the preference information as described with reference to FIG. 9. Specifically, in FIG. 49, time information indicating "12 o'clock, Dec. 1, 2008" is provided to two pieces of upper preference information of a user 1; and time information indicating "11 o'clock, Dec. 10, 2008" is provided to two pieces of lower preference information thereof.

As described above, by providing the time information to the preference information, the evaluation information is not overwritten.

In step S332, the same user similarity level calculating unit 342 calculates similarity level between the preference information at different times of the same user, on the basis of the preference information with respect to the same user from the preference information obtaining unit 341 and evaluation information corresponding thereto, and supplies the preference information including the similarity level to the similar user determining unit 83.

In step S333, the varying point specifying unit 343 specifies a varying point (varying time) of the similarity level between the preference information on the basis of the preference information at the different times including the similarity level from the same user similarity level calculating unit 342, and supplies time corresponding to the varying point to the change item obtaining unit 344. For example, the varying point specifying unit 343 determines that change of the preference information is large when similarity level between preference information becomes smaller than $1/\alpha$ times ($\alpha>1$) of an average thereof, to specify the varying point. More specifically, with respect to preference information to which time information on continuous times 1 to 5 is provided, in the case where similarity level between the preference information at the time 1 and the preference information at the time 2 is 0.8; similarity level between the preference information at the time 2 and the preference information at the time 3 is 0.91; and similarity level between the preference information at the time 3 and the preference information at the time 4 is 0.85; and similarity level between the preference information at the time 4 and the preference information at the time 5 is 0.93, an average thereof becomes 0.8725. Accordingly, if similarity level between the preference information at the time 5 and the preference information at the time 6 is 0.35 and a change determination reference is ½ times ($\alpha=2$) of the average similarity level, since 0.35 is smaller than $0.8725 \times (½)=0.43625$, it is determined that there is a change in the preference information between the time 5 and the time 6.

In step S334, the change item obtaining unit 344 obtains an item having a high view frequency at that time or evaluation information corresponding to an item of having a high intensity of the evaluation information, on the basis of the time corresponding to the varying point from the varying point specifying unit 343, and supplies, for example, a name of the item to the display unit 22.

In step S335, the display unit 22 presents the name of the item from the change item obtaining unit 344, and presents an inquiry on whether the item triggers the change in the preference information to the user. In this respect, there is an input that the item triggers the change in the preference information from the user, the change item obtaining unit 344 sets the item as an impact item which triggers the change in the preference information. At this time, a natural sentence from the user or context information or the like with respect to the user may be stored. Further, the impact item may be directly input by the user.

In addition, since the impact item significantly changes the preference of the user, the impact item may be preferentially presented in an item recommendation process for other users. For example, in step S75 in FIG. 13, when calculating a prediction evaluation value of the item, the prediction evaluation value is set to $\beta$ times ($\beta>1$) with respect to the impact item. Further, when presenting the impact item, comments such as "this is an item which has given an impact to a certain user" may be included in the impact item to be presented.

Further, the remind function unit 345, after a predetermined period elapses (for example, three years later) from the time when there is an input that a predetermined item triggers the change in the preference information from the user, presents the impact item, a natural sentence, or context information or other information at that time. Further, after a predetermined time elapses from the time when the user did not viewed the impact item (or similar item), the impact item may be presented. Accordingly, a memory or interest for the impact item of the user may be regularly recalled.

According to the above described process, since a timing of the change in preferences of the user can be recognized, the item which was being viewed by the user at that time may be recommended as an item causing a significant change.

In the above description, a configuration presenting differences in preferences between the present user and other users is mainly described on the basis of the preference information, but the difference in the preferences between the present user and the other users may be described on the basis of link information.

[Configuration Example of Information Processing Apparatus which Presents Characteristics of Users on the Basis of Link Information]

Herein, a configuration example of an information processing apparatus which presents characteristics of users on the basis of the link information will be described with reference to FIG. 50.

Figure 50:
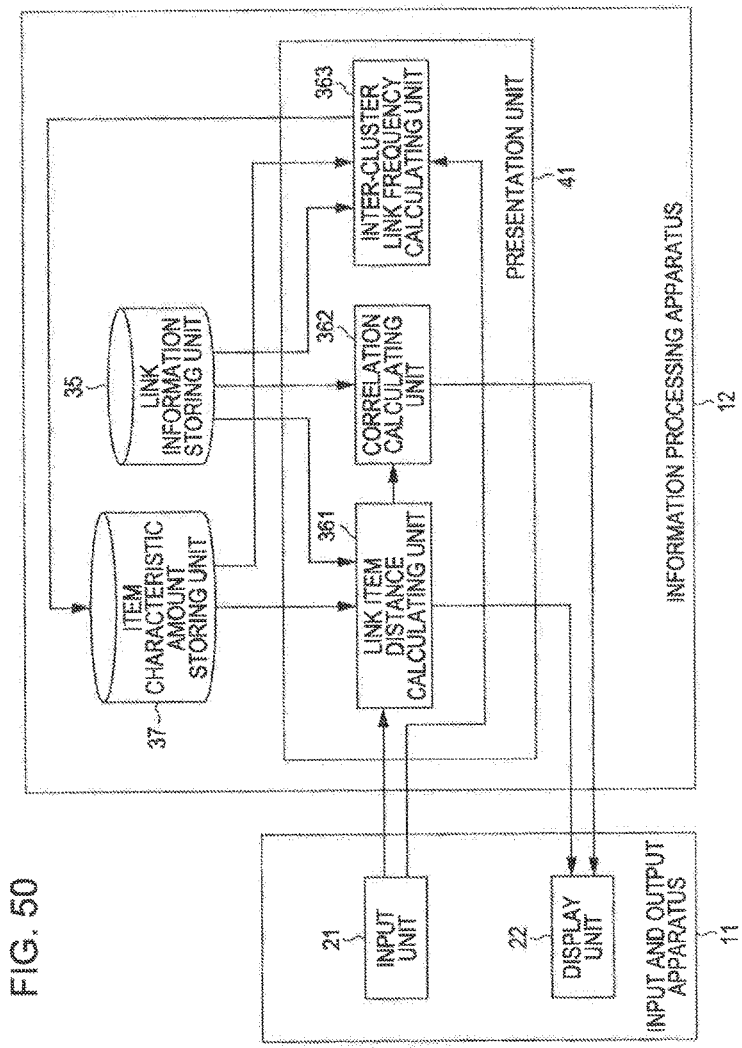
FIG. 50 is a block diagram illustrating a configuration example of an information processing apparatus.

The information processing apparatus 12 in FIG. 50 basically has the same function as the information processing apparatus 12 in FIG. 1. In FIG. 50, the components other than the link information storing unit 35, the item characteristic amount storing unit 37 and the presentation unit 41 are not described.

In the information processing apparatus 12 in FIG. 50, the presentation unit 41 includes a link item distance calculating unit 361, a correlation calculating unit 362 and an inter-class link frequency calculating unit 363.

The link item distance calculating unit 361 calculates distances (link item distances) between corresponding (link-extended) items in link information of the link information storing unit 35, using item characteristic amounts of the item characteristic amount storing unit 37, and supplies the calculated distances to the correlation calculating unit 362.

The correlation calculating unit 362 calculates correlation between the link item distance from the link item distance calculating unit 361 and the intensity (hereinafter, referred to as link intensity) in the link information, and then displays the result to the display unit 22.

The inter-class link frequency calculating unit 363 calculates frequency of different classes of the respective items (inter-class link frequency) in corresponding (link-extended) item pairs in the link information. Herein, the class of the item is, for example, non-discrete information in which the same keyword is provided to each item, such as songs of the same artist. For example, the class is a characteristic amount type in an item characteristic amount of a name attribute. The inter-class link frequency calculating unit 363 sets, in the case where the calculated inter-item class frequency is larger than a predetermined threshold, the classes of the respective items in the item pairs corresponding to the inter-item and inter-class frequency as the same.

[Characteristic Amount Suitability Level Presentation Process of Information Processing Apparatus]

Figure 51:
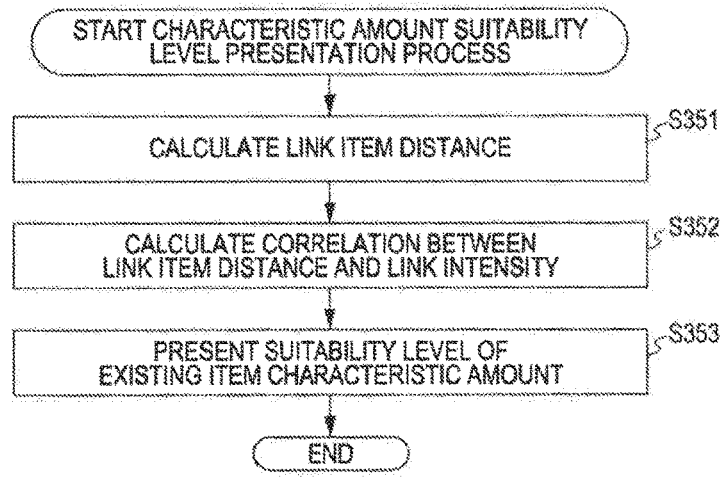
FIG. 51 is a flowchart illustrating a characteristic amount suitability presentation process.

A characteristic amount suitability level presentation process indicating a suitability level of item characteristic amounts according to an information processing apparatus in FIG. 50 will be described with reference to a flowchart in FIG. 51.

In step S351, the link item distance calculating unit 361 calculates link item distances between corresponding items in the link information for every user, using the item characteristic amounts in the item characteristic amount storing unit 37, and supplies the calculated link item distances to the correlation calculating unit 362. The link item distances may be calculated with respect to all the characteristic amount types, or may be calculated with respect to partial spaces (at least one characteristic amount), for example, as Euclid distances in a characteristic amount space according to the characteristic amount types of the item characteristic amounts. The link item distance calculating unit 361 supplies the calculated link item distances to the correlation calculating unit 362.

In step S352, the correlation calculating unit 362 calculates correlation between the link item distance from the link item distance calculating unit 361 and the link intensity in the link information, and supplies a correlation value as the calculated result to the display unit 22.

In step S353, the display unit 22 presents a suitability level of existing item characteristic amounts of the user, on the basis of the correlation value from the correlation calculating unit 362. In the case where the correlation value from the correlation calculating unit 362 is smaller than for example, a predetermined threshold, since it is considered that the distance between the link-extended items and intensity thereof are not suitable for each other, the display unit 22 presents that a score of the characteristic amount type in the existing item characteristic amount is not significantly suitable.

Further, herein, the link item distance calculating unit 361 may supply a value obtained by dividing a value which is obtained by adding up all link item distance with respect to every user, by the number of link, to the display unit 22 for presentation. In the case where the former value is large compared with other users, since a link item distance with respect to one link becomes large compared with the other users, the present user may consider that the score of the characteristic amount type in the existing item characteristic amount are not significantly suitable. In such a case, the user may use the evaluation type which is given to the item pair by the other users or may add a new characteristic amount type in the item characteristic amount.

According to the above described process, the user can recognize whether the score of the characteristic amount type in the existing item characteristic amount is suitable for the user.

[Inter-Class Link Frequency Calculating Process of Information Processing Apparatus]

Figure 52:
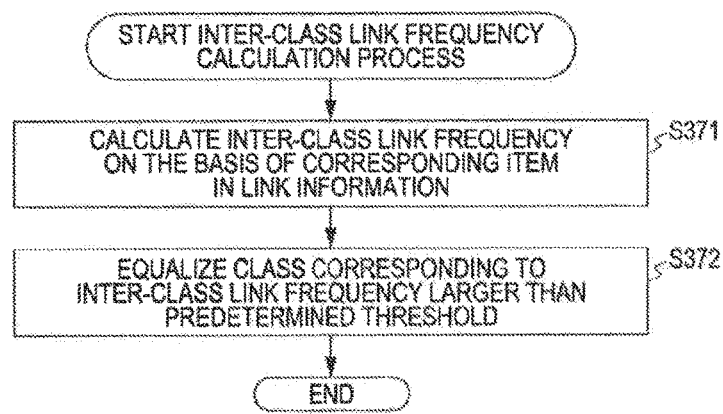
FIG. 52 is a flowchart illustrating an inter-class link frequency calculating process.

Next, an inter-class link frequency calculating process in an information processing apparatus in FIG. 50 will be described with reference to a flowchart in FIG. 52.

In step S371, the inter-class link frequency calculating unit 363 calculates frequency (inter-class link frequency) of different classes of respective items in corresponding (link-extended) item pairs in the link information.

Hereinafter, an example of calculation of the inter-item class frequency will be described with reference to FIG. 53.

Figure 53:
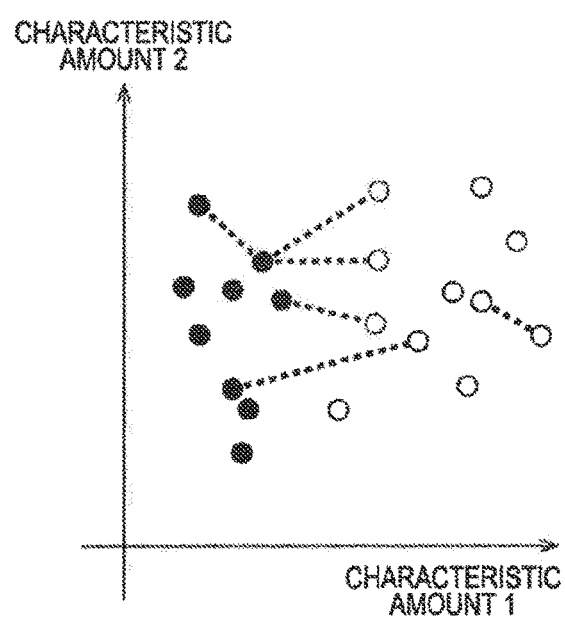
FIG. 53 is a diagram illustrating an example of calculation of an inter-item class frequency.

In FIG. 53, two types of items having different classes, which are represented by black circles and white circles, are distributed in the characteristic amount space including a characteristic amount 1 and a characteristic amount 2. Further, items connected by a dot line in the figure are link-extended items. In the characteristic amount space shown in FIG. 53, the number of all links is six and the number of links having different classes among all the links is four. At this time, the inter-class link frequency calculating unit 363 calculates inter-item class frequency as (the number of the links having the different classes among all the links)/(the number of all the links)=4/6=0.67.

In step S372, the inter-class link frequency calculating unit 363 sets, in the case where the calculated inter-item class frequency is larger than a predetermined threshold, classes of the respective items in the item pairs corresponding to the inter-item and inter-class frequency as the same. For example, the inter-class link frequency calculating unit 363 sets, in the case where the inter-item class frequency is larger than 0.5, the classes as the same. In the items shown in FIG. 53, since the inter-item class frequency is 0.67 which is larger than 0.5, the classes of two types indicated by the dark circles and white circles are set as the same classes.

According to the above described process, since classes link-extended with a high frequency by the user are set as the same classes even in the case of items having different classes, the items having different classes may be similarly retrieved, thereby retrieving the items with a new point of view. In addition, other users who set the items having different classes as the same classes in a similar way may be presented, thereby finding a new similarity with respect to the other users.

Hereinbefore, the process for calculating frequency of links which connect classes is described, but the items may be clustered for every partial space to calculate frequency of links which connect the clusters.

[Configuration Example of Information Processing Apparatus which Calculates Link Frequency Between Clusters]

Hereinafter, a configuration example of an information processing apparatus which calculates link frequency between clusters will be described with reference to FIG. 54.

Figure 54:
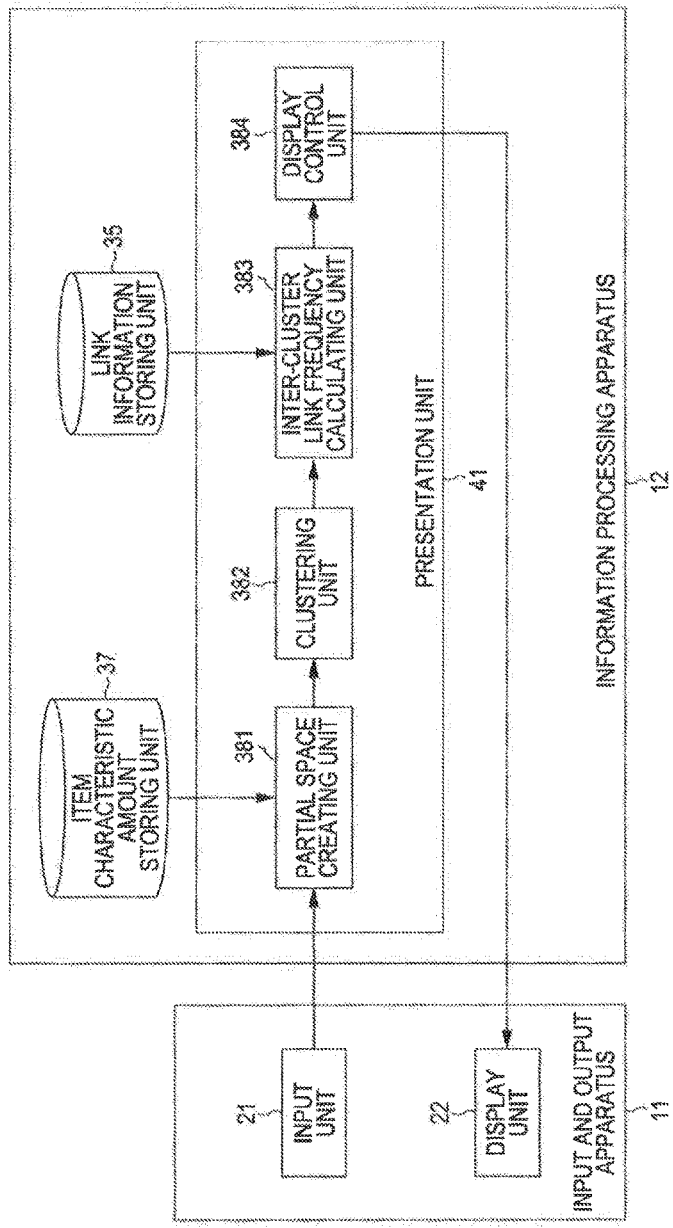
FIG. 54 is a block diagram illustrating a configuration example of an information processing apparatus.

The information processing apparatus 12 in FIG. 54 basically has the same function as the information processing apparatus 12 in FIG. 1. In FIG. 54, the components other than the link information storing unit 35, the item characteristic amount storing unit 37 and the presentation unit 41 are not described.

In the information processing apparatus 12 in FIG. 54, the presentation unit 41 includes a partial space creating unit 381, a clustering unit 382, an inter-cluster link frequency calculating unit 383 and a display control unit 384.

The partial space creating unit 381 creates a plurality of partial spaces including item characteristic amounts (spaces including several item characteristic amounts among all item characteristic amounts).

The clustering unit 382 clusters items (item characteristic amounts) in the respective partial spaces created by the partial space creating unit 381.

The inter-cluster link frequency calculating unit 383 calculates frequency (inter-cluster link frequency) of different clusters including each item, in corresponding (link-extended) item pairs in the link information, in each partial space created by the partial space creating unit 381.

The display control unit 384 displays in the display unit 22 a partial space where the inter-cluster link frequency is the smallest among the partial spaces where the inter-cluster link frequency is calculated by the inter-cluster link frequency calculating unit 383.

[Inter-Cluster Link Frequency Calculating Process of Information Processing Apparatus]

Figure 55:
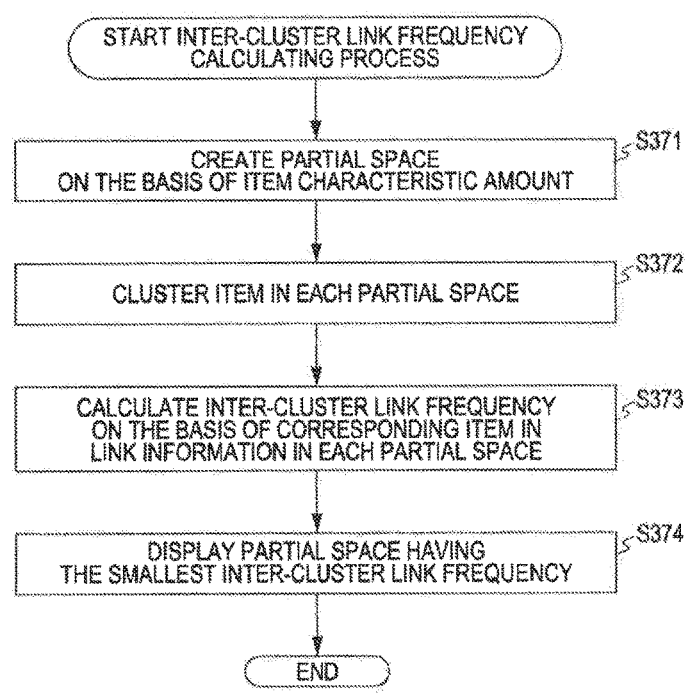
FIG. 55 is a flowchart illustrating an inter-class link frequency calculating process.

Hereinafter, a configuration example of an inter-cluster link frequency calculating process in an information processing apparatus in FIG. 54 will be described with reference to a flowchart in FIG. 55.

In step S371, the partial space creating unit 381 creates a plurality of partial spaces including, item characteristic amounts. For example, in the case where preference information is five and two-dimensional partial spaces are created, the partial space creating unit 381 creates partial spaces of $_5C_2=10$.

In step S372, the clustering unit 382 clusters the items using the k-means method or the like in each partial space created by the partial space creating unit 381.

In step S373, the inter-cluster link frequency calculating unit 383 calculates the inter-cluster link frequency in corresponding item pairs in the link information, in each partial space created by the partial space creating unit 381. More specifically, the inter-cluster link frequency calculating unit 383 calculates the number of links which connect clusters with respect to the number of all links for every partial space as the inter-cluster link frequency.

In step S374, the display control unit 384 displays in the display unit 22 a partial space where the inter-cluster link frequency is the smallest among the partial spaces in which the inter-cluster link frequency is calculated by the inter-cluster link frequency calculating unit 383.

According to the above described process, since the partial space where the inter-cluster link frequency is the smallest is displayed, the user can recognize a bundle of items suitable for user preferences among the bundles (clusters) of the items evaluated by the user.

However, the above described series of processes may be performed by hardware or may be performed by software. In the case where the series of processes is performed by the software, a program constituting the software is installed from a recording medium in a computer in which the program constituting the software is installed in exclusive hardware, or in a universal personal computer or the like which is installed with a variety of programs for performing a variety of functions.

FIG. 56 illustrates a configuration example of a universal personal computer. The personal computer is installed with a CPU (Central Processing Unit) 901. An input and output interface 905 is connected to the CPU 901 through a bus 904. A ROM (Read Only Memory) 902 and a RAM (Random Access Memory) 903 are connected to the bus 904.

An input unit 906 including an input device such as a keyboard or a mouse through which the user inputs manipulation commands; an output unit 907 which outputs processing manipulation screens or images of the processed results to the display device; a storage unit 908 including such as a hard disc drive which stores programs or various data; and a communication unit 909 which performs a communication process through a network such as the Internet, which includes a LAN (Local Area Network) adaptor or the like, are connected to the input and output interface 905. Further, a drive 910 which reads and writes data for a removable media 911 such as a magnetic disc (including a flexible disk), an optical disc (CD-ROM (Compact Disc-Read Only Memory), DVD (Digital Versatile Disc)), a magneto-optical disc (including MD (Mini Disc)), or a semiconductor memory is also connected to the input and output interface 905.

The CPU 901 performs a variety of processes according to programs recorded in the ROM 902, or programs which are read from the removable media 11 such as a magnetic disc, optical disc, magneto-optical disc or semiconductor memory, are installed in the storage unit 908, and then are loaded to the RAM 903 from the storage unit 908. Data or the like for performing the various processes by the CPU 901 is appropriately recorded in the RAM 903.

In the present description, the steps for describing programs recorded in the recording medium may include processes which are performed in a temporal sequence in the described order, or may include processes which are performed in parallel or individually.

The present application contains subject matter related to that disclosed in Japanese Priority Patent Application JP 2009-093622 filed in the Japan Patent Office on Apr. 8, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
circuitry configured to
extract evaluation information of an item from at least one user,
generate preference information indicating a preference of the at least one user based on the extracted evaluation information and metadata of the item, and
generate visual information of the preference information of the at least one user, the visual information displaying a plurality of image icons or circles having sizes corresponding to a user's behavior related to the item.

2. The information processing apparatus of claim 1, wherein the circuitry is further configured to display the visual information.

3. The information processing apparatus of claim 1, wherein the circuitry is further configured to calculate an item preference level based on the preference information and an item characteristic amount.

4. The information processing apparatus of claim 3, wherein the circuitry is further configured to obtain the item characteristic amount from an item characteristic amount storage.

5. The information processing apparatus of claim 3, wherein the item preference level corresponds to the level of preference for the item by the at least one user.

6. The information processing apparatus of claim 3, wherein the circuitry is configured to display the item preference level in the visual information.

7. The information processing apparatus of claim 3, wherein the circuitry is further configured to display the item characteristic amount in the visual information.

8. The information processing apparatus of claim 1, wherein the circuitry is further configured to receive the evaluation information as input from an input device.

9. An information processing method comprising:
   extracting evaluation information of an item from at least one user;
   generating preference information indicating a preference of the at least one user based on the extracted evaluation information and metadata of the item; and
   generating, by circuitry, visual information of the preference information of the at least one user, the visual information displaying a plurality of image icons or circles having sizes corresponding to a user's behavior related to the item.

10. The information processing method of claim 9, further comprising:
    displaying on a display panel, the generated visual information.

11. The information processing method of claim 10, further comprising:
    displaying the item characteristic amount in the visual information.

12. The information processing method of claim 9, further comprising:
    determining an item characteristic amount.

13. The information processing method of claim 12, further comprising:
    calculating, by the circuitry, an item preference level based on the preference information and the determined item characteristic amount.

14. The information processing method of claim 13, wherein the item preference level corresponds to the level of preference for the item by the at least one user.

15. The information processing method of claim 13, further comprising:
    displaying the calculated item preference level in the visual information.

16. The information processing method of claim 9, further comprising:
    receiving the evaluation information as input from an input device.

17. An information processing apparatus comprising:
    circuitry configured to
        receive user input regarding user evaluation information of a plurality of items that include a song, an artist, and a genre of music;
        extract the evaluation information of the plurality of items and store the evaluation information in association with respective of the plurality of items,
        generate preference information indicating a preference of the at least one user based on the extracted evaluation information and metadata of the item, and
        generate visual information of the preference information of the user for each of the plurality of items, wherein
    the visual information is configured to be presented on a display as image icons or circles for at least some of the plurality of items, each image icon or circle having a size corresponding to the user evaluation information representing a degree to which the user likes respective of the song, the artist, or the genre.

* * * * *